(12) United States Patent
Hokkyo

(10) Patent No.: US 6,462,916 B1
(45) Date of Patent: Oct. 8, 2002

(54) MAGNETIC DISC APPARATUS

(75) Inventor: Hirotaka Hokkyo, Tokyo (JP)

(73) Assignee: NEC Corporation, Tokyo (JP)

( * ) Notice: Subject to any disclaimer, the term of this patent is extended or adjusted under 35 U.S.C. 154(b) by 27 days.

(21) Appl. No.: 09/651,105

(22) Filed: Aug. 30, 2000

(30) Foreign Application Priority Data

Sep. 10, 1999 (JP) .......................................... 11-257138

(51) Int. Cl.$^7$ ............................ G11B 5/127; G11B 5/82
(52) U.S. Cl. ...................................... 360/317; 360/135
(58) Field of Search ................................ 360/135, 317, 360/318, 128

(56) References Cited

U.S. PATENT DOCUMENTS

| | | | |
|---|---|---|---|
| 5,486,967 A | * | 1/1996 | Tanaka et al. ............... 360/318 |
| 6,270,885 B1 | * | 8/2001 | Hokkyo et al. ............. 360/135 |

OTHER PUBLICATIONS

K. Ouichi et al., "Recording Performances and Preparation of Double Layer Medium for Perpendicular Magnetic Recording", Journal of Japan Applied Magnetism Society, vol. 8, No. 1, (1984), pp. 17–22 with English Abstract.

* cited by examiner

*Primary Examiner*—Allen Cao
(74) *Attorney, Agent, or Firm*—Sughrue Mion, PLLC

(57) ABSTRACT

The present invention improves the reproduction resolution in a magnetic disc apparatus of the double layered perpendicular magnetic recording method. A perpendicular magnetic recording medium 20 includes an undercoat soft a magnetic film 24 and a perpendicular magnetization film 28 formed on a substrate 22. An MR head 210 includes an MR element 213 arranged between magnetic shield layers 211 and 213 as soft magnetic bodies. By simulation of an MR head reproduction response of the double layered perpendicular magnetic recording method, the reproduction gap length g is defined to be not greater than 0.1 [micrometers], the magnetic spacing d is defined to be not greater than 20 [nm], the perpendicular magnetization film 28 is defined to have a thickness δ not greater than 50 [nm], and the undercoat soft magnetic film 24 is defined to have a thickness not greater than 20 [nm].

28 Claims, 76 Drawing Sheets

FIG. 4 (1) MFM IMAGE OF RECORDING PATTERN ON PERPENDICULAR MAGNETIC RECORDING MEDIUM BY COMPARATIVE APPARATUS AA1 (RECORDING DENSITY 600 kFRPI)
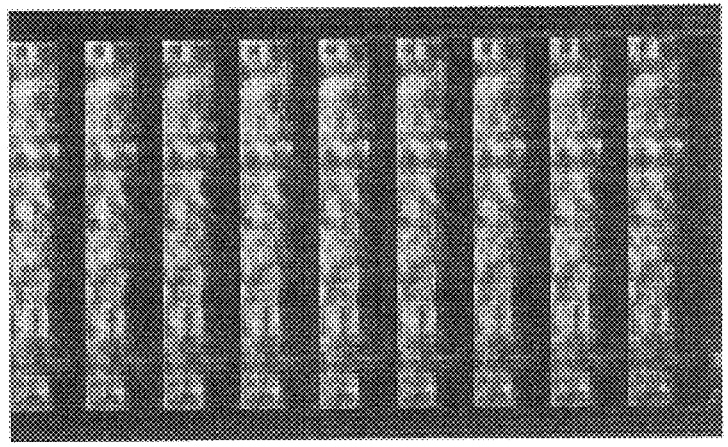
FIG. 4 (2) MFM IMAGE OF RECORDING PATTERN ON PERPENDICULAR MAGNETIC RECORDING MEDIUM BY COMPARATIVE APPARATUS AA2 (RECORDING DENSITY 600 kFRPI)
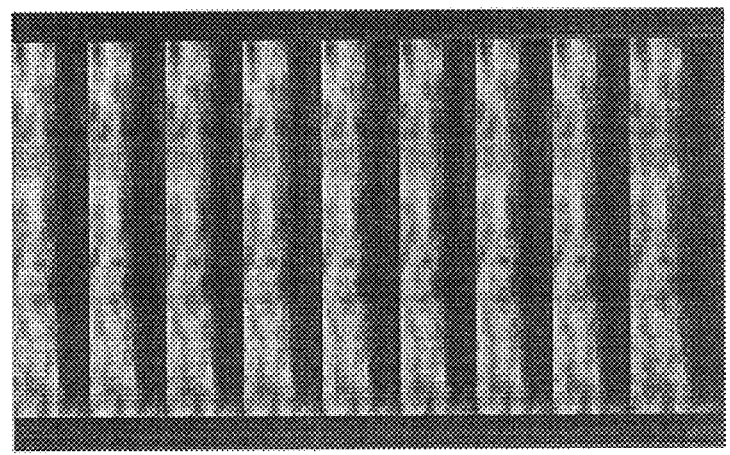

FIG.7 (1)  MFM IMAGE OF RECORDING PATTERN ON PERPENDICULAR MAGNETIC RECORDING MEDIUM BY COMPARATIVE APPARATUS BB1 (RECORDING DENSITY 600 kFRPI)
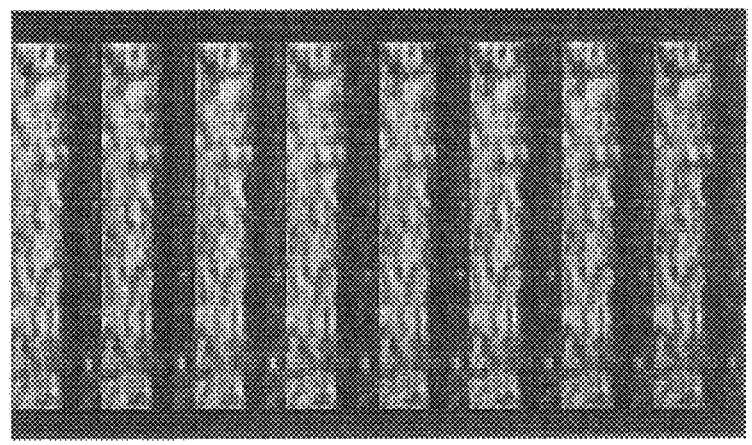
FIG.7 (2)  MFM IMAGE OF RECORDING PATTERN ON PERPENDICULAR MAGNETIC RECORDING MEDIUM BY COMPARATIVE APPARATUS BB2 (RECORDING DENSITY 600 kFRPI)
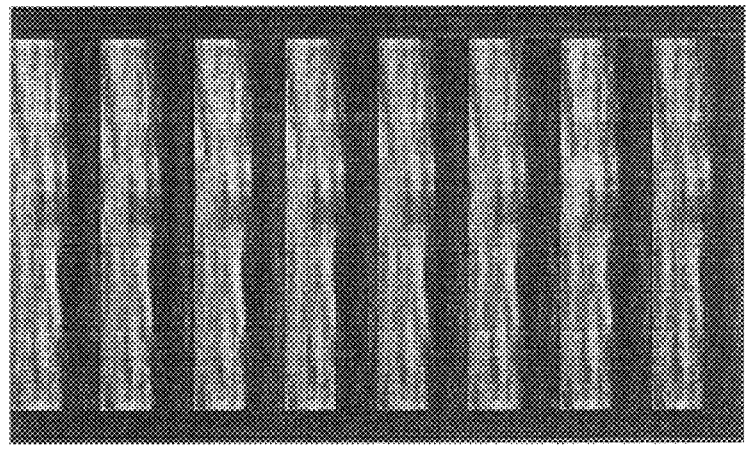

FIG.10 (1) MFM IMAGE OF RECORDING PATTERN ON PERPENDICULAR MAGNETIC RECORDING MEDIUM BY COMPARATIVE APPARATUS CC1 (RECORDING DENSITY 600 kFRPI)
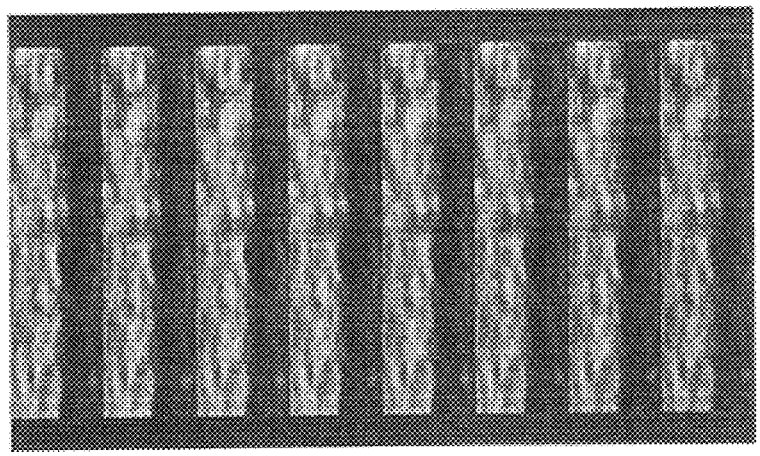
FIG.10 (2) MFM IMAGE OF RECORDING PATTERN ON PERPENDICULAR MAGNETIC RECORDING MEDIUM BY COMPARATIVE APPARATUS CC2 (RECORDING DENSITY 600 kFRPI)
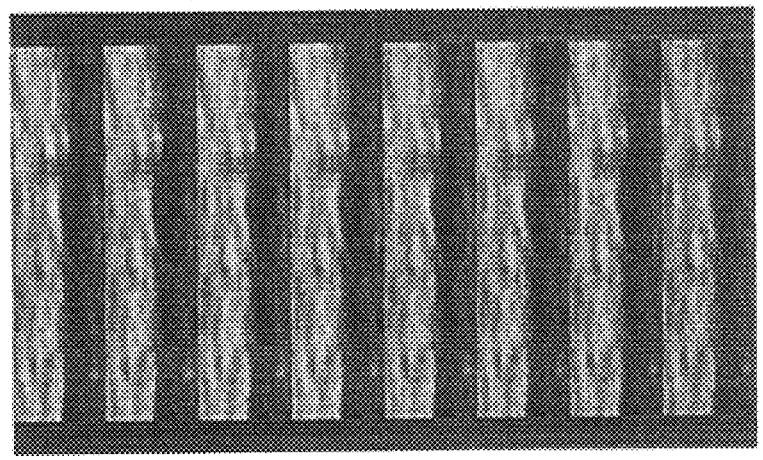

FIG.13 (1) MFM IMAGE OF RECORDING PATTERN ON PERPENDICULAR MAGNETIC RECORDING MEDIUM BY COMPARATIVE APPARATUS DD1 (RECORDING DENSITY 600 kFRPI)
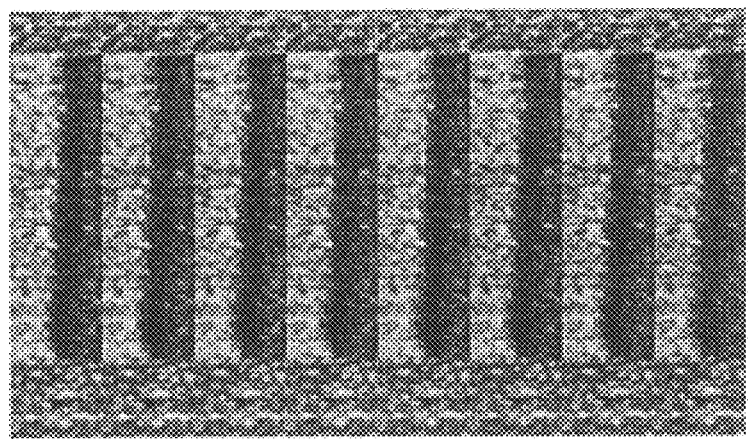
FIG.13 (2) MFM IMAGE OF RECORDING PATTERN ON PERPENDICULAR MAGNETIC RECORDING MEDIUM BY COMPARATIVE APPARATUS DD2 (RECORDING DENSITY 600 kFRPI)
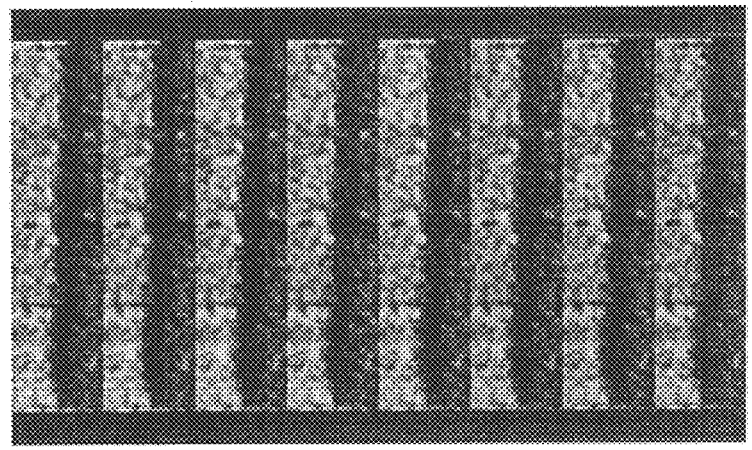

FIG.16 (1) MFM IMAGE OF RECORDING PATTERN ON PERPENDICULAR MAGNETIC RECORDING MEDIUM BY COMPARATIVE APPARATUS EE1 (RECORDING DENSITY 600 kFRPI)
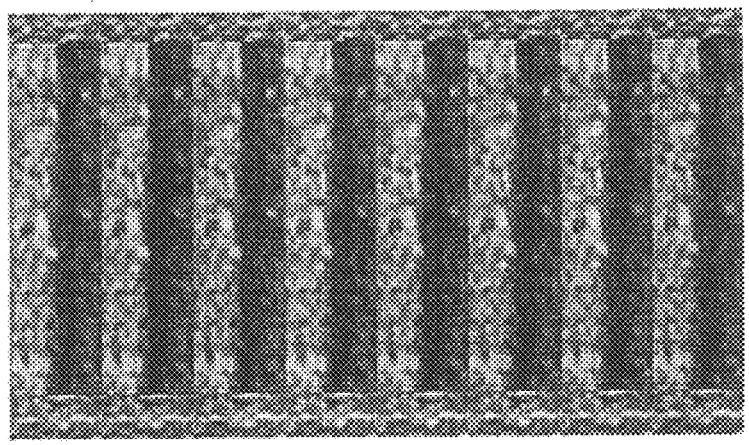
FIG.16 (2) MFM IMAGE OF RECORDING PATTERN ON PERPENDICULAR MAGNETIC RECORDING MEDIUM BY COMPARATIVE APPARATUS EE2 (RECORDING DENSITY 600 kFRPI)
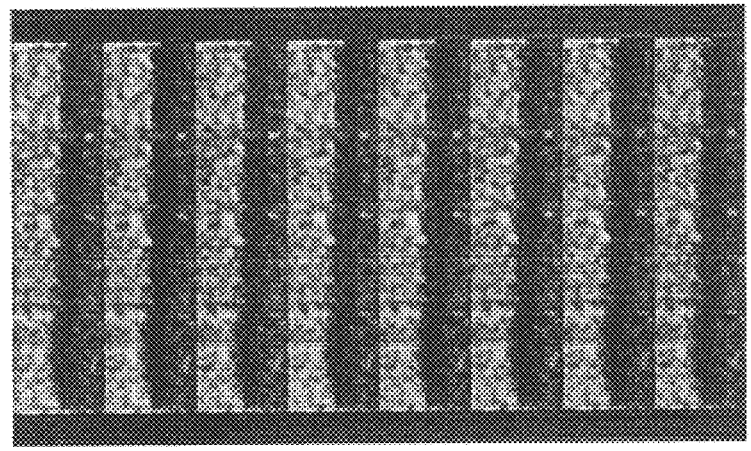

FIG.19 (1)
MFM IMAGE OF RECORDING PATTERN ON
PERPENDICULAR MAGNETIC RECORDING
MEDIUM BY COMPARATIVE APPARATUS FF1
(RECORDING DENSITY 600 kFRPI)
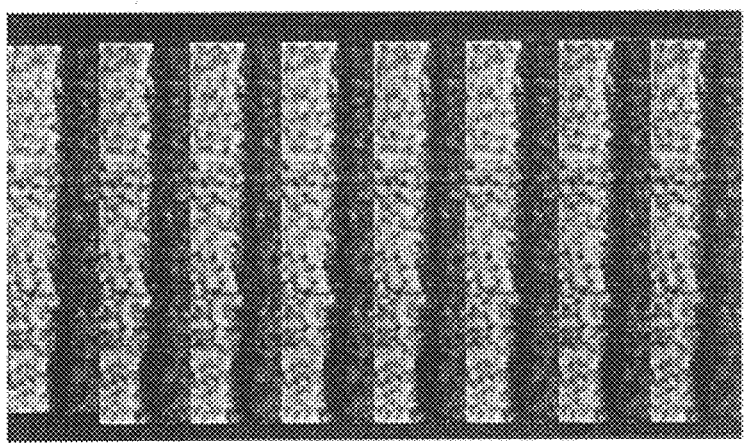
FIG.19 (2)
MFM IMAGE OF RECORDING PATTERN ON
PERPENDICULAR MAGNETIC RECORDING
MEDIUM BY COMPARATIVE APPARATUS FF2
(RECORDING DENSITY 600 kFRPI)
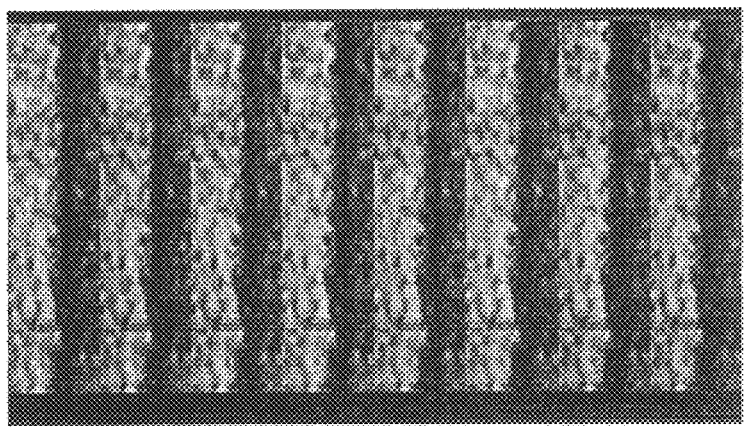

FIG.22 (1) MFM IMAGE OF RECORDING PATTERN ON PERPENDICULAR MAGNETIC RECORDING MEDIUM BY COMPARATIVE APPARATUS GG1 (RECORDING DENSITY 600 kFRPI)
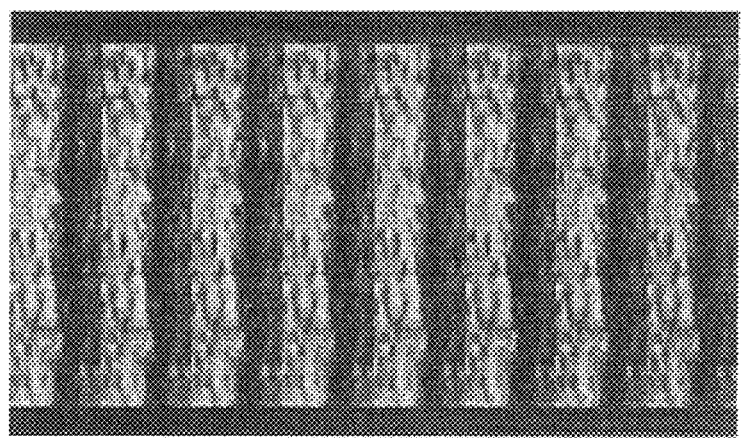
FIG.22 (2) MFM IMAGE OF RECORDING PATTERN ON PERPENDICULAR MAGNETIC RECORDING MEDIUM BY COMPARATIVE APPARATUS GG2 (RECORDING DENSITY 600 kFRPI)
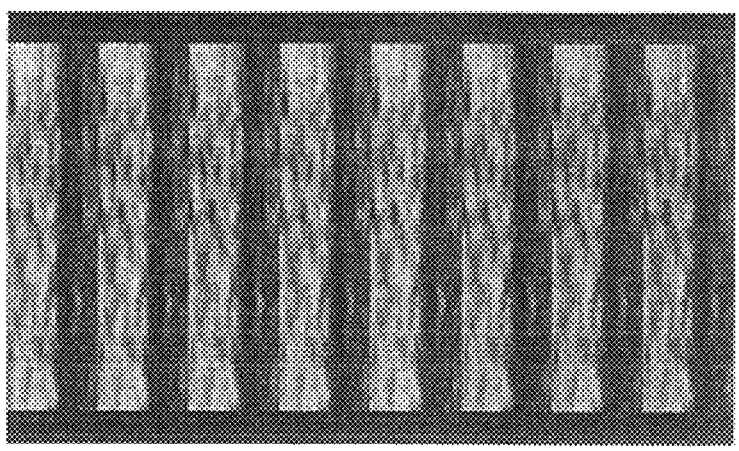

FIG.25 (1) MFM IMAGE OF RECORDING PATTERN ON PERPENDICULAR MAGNETIC RECORDING MEDIUM BY COMPARATIVE APPARATUS HH1 (RECORDING DENSITY 600 kFRPI)
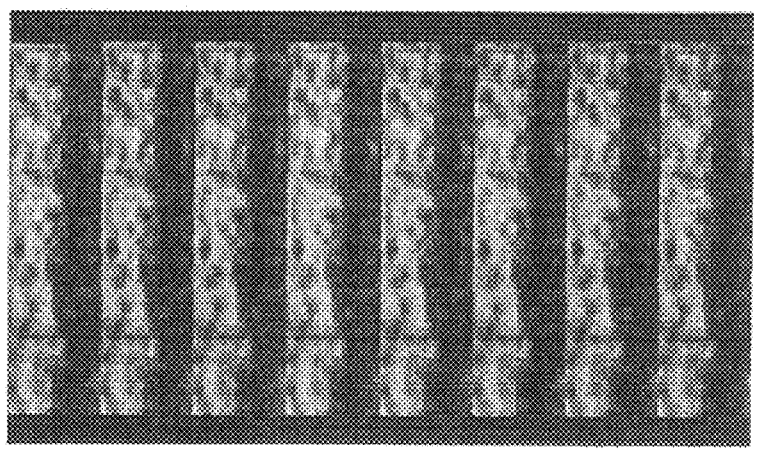
FIG.25 (2) MFM IMAGE OF RECORDING PATTERN ON PERPENDICULAR MAGNETIC RECORDING MEDIUM BY COMPARATIVE APPARATUS HH2 (RECORDING DENSITY 600 kFRPI)
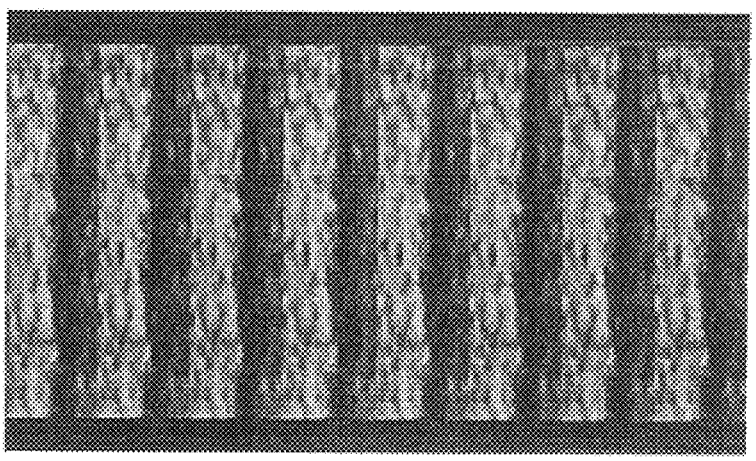

FIG.28 (1) MFM IMAGE OF RECORDING PATTERN ON PERPENDICULAR MAGNETIC RECORDING MEDIUM BY COMPARATIVE APPARATUS JJ1 (RECORDING DENSITY 600 kFRPI)
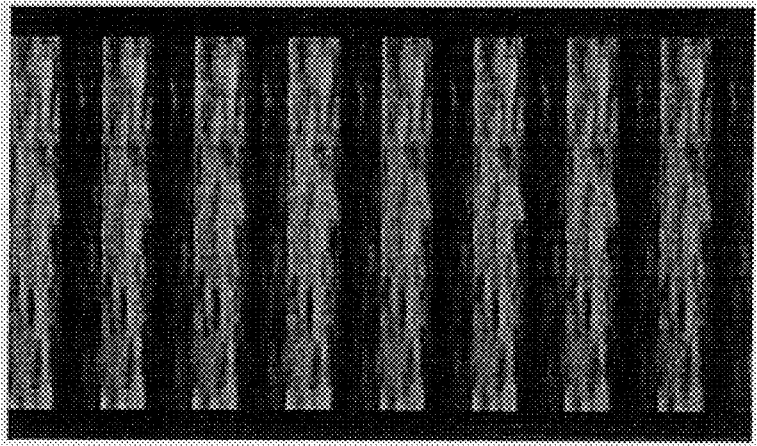
FIG.28 (2) MFM IMAGE OF RECORDING PATTERN ON PERPENDICULAR MAGNETIC RECORDING MEDIUM BY COMPARATIVE APPARATUS JJ2 (RECORDING DENSITY 600 kFRPI)
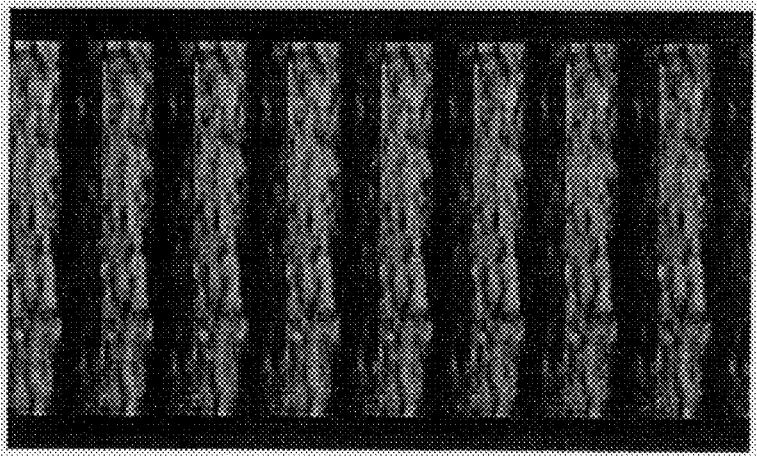

FIG.31 (1) MFM IMAGE OF RECORDING PATTERN ON PERPENDICULAR MAGNETIC RECORDING MEDIUM BY COMPARATIVE APPARATUS KK1 (RECORDING DENSITY 600 kFRPI)
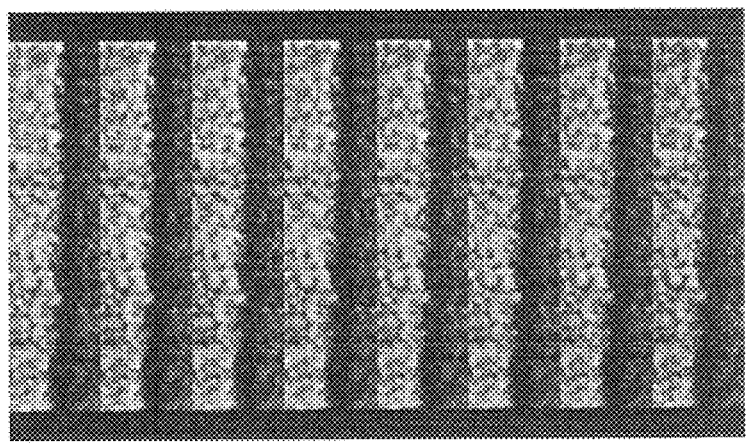
FIG.31 (2) MFM IMAGE OF RECORDING PATTERN ON PERPENDICULAR MAGNETIC RECORDING MEDIUM BY COMPARATIVE APPARATUS KK2 (RECORDING DENSITY 600 kFRPI)
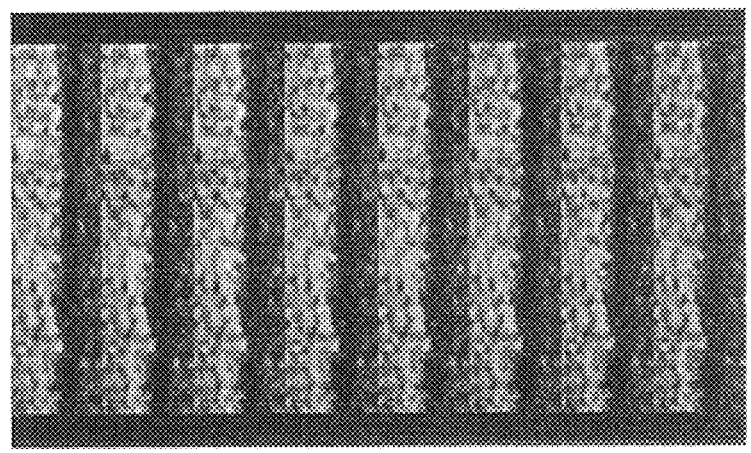

FIG. 34 (1) MFM IMAGE OF RECORDING PATTERN ON PERPENDICULAR MAGNETIC RECORDING MEDIUM BY COMPARATIVE APPARATUS LL1 (RECORDING DENSITY 600 kFRPI)
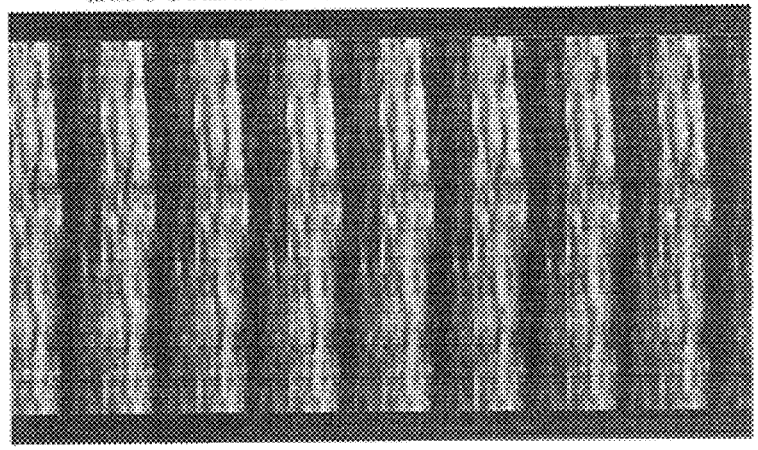
FIG. 34 (2) MFM IMAGE OF RECORDING PATTERN ON PERPENDICULAR MAGNETIC RECORDING MEDIUM BY COMPARATIVE APPARATUS LL2 (RECORDING DENSITY 600 kFRPI)
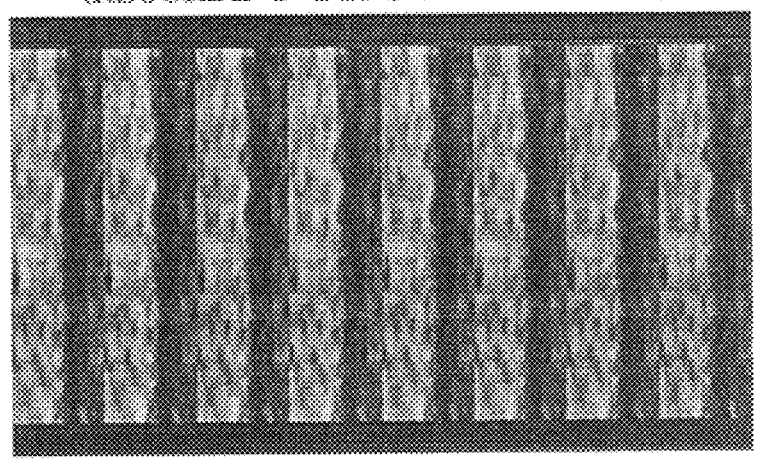

FIG.37 (1) MFM IMAGE OF RECORDING PATTERN ON PERPENDICULAR MAGNETIC RECORDING MEDIUM BY COMPARATIVE APPARATUS MM1 (RECORDING DENSITY 600 kFRPI)
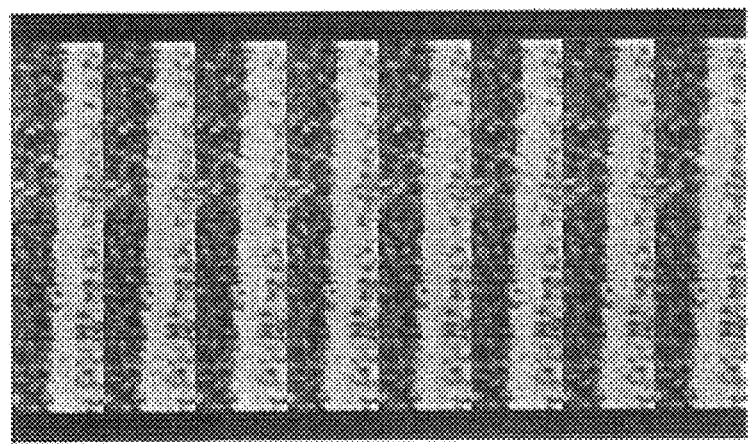
FIG.37 (2) MFM IMAGE OF RECORDING PATTERN ON PERPENDICULAR MAGNETIC RECORDING MEDIUM BY COMPARATIVE APPARATUS MM2 (RECORDING DENSITY 600 kFRPI)
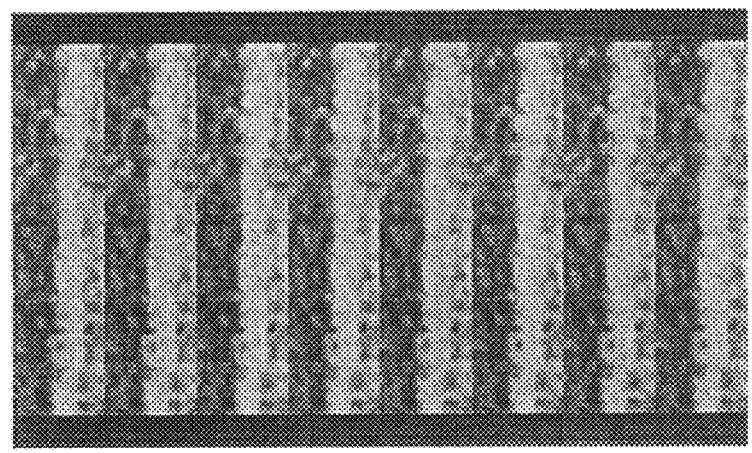

FIG.40 MFM IMAGE OF RECORDING PATTERN ON PERPENDICULAR MAGNETIC RECORDING MEDIUM BY COMPARATIVE APPARATUS NN1 (RECORDING DENSITY 600 kFRPI)
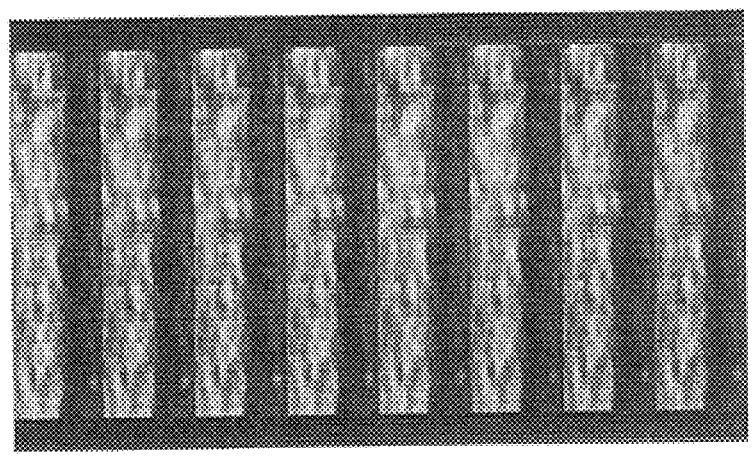
FIG.40 MFM IMAGE OF RECORDING PATTERN ON PERPENDICULAR MAGNETIC RECORDING MEDIUM BY COMPARATIVE APPARATUS NN2 (RECORDING DENSITY 600 kFRPI)
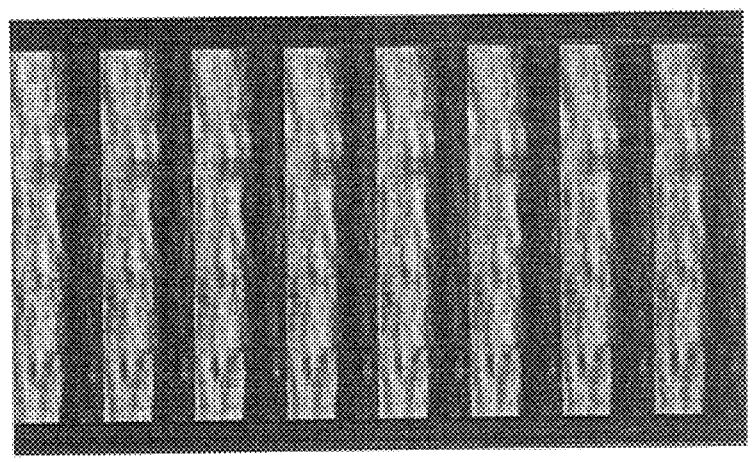

FIG. 43 (1) MFM IMAGE OF RECORDING PATTERN ON PERPENDICULAR MAGNETIC RECORDING MEDIUM BY COMPARATIVE APPARATUS PP1 (RECORDING DENSITY 600 kFRPI)
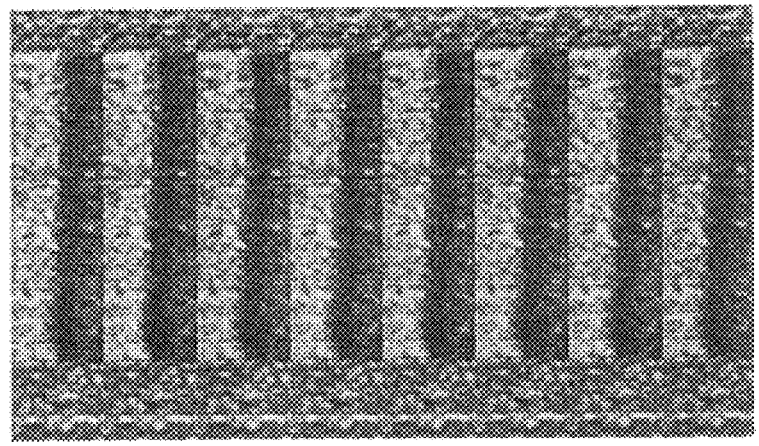
FIG. 43 (2) MFM IMAGE OF RECORDING PATTERN ON PERPENDICULAR MAGNETIC RECORDING MEDIUM BY COMPARATIVE APPARATUS PP2 (RECORDING DENSITY 600 kFRPI)
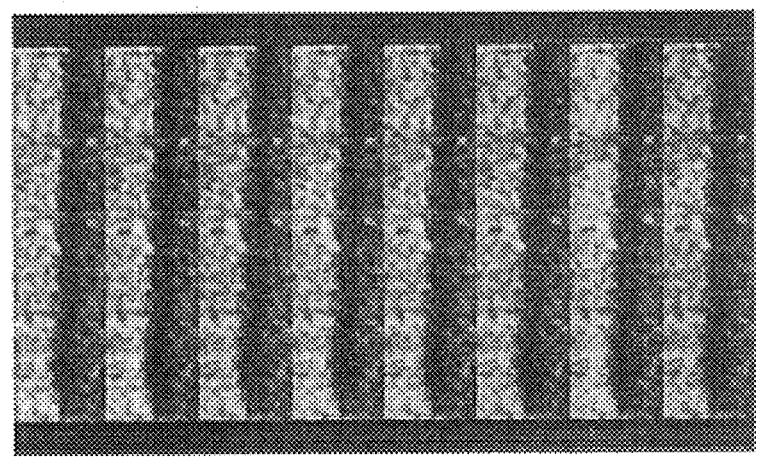

FIG.46 (1) MFM IMAGE OF RECORDING PATTERN ON PERPENDICULAR MAGNETIC RECORDING MEDIUM BY COMPARATIVE APPARATUS QQ1 (RECORDING DENSITY 600 kFRPI)
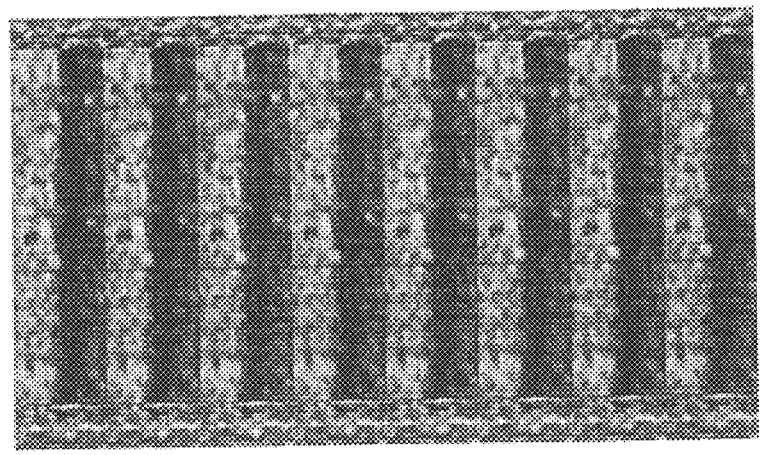
FIG.46 (2) MFM IMAGE OF RECORDING PATTERN ON PERPENDICULAR MAGNETIC RECORDING MEDIUM BY COMPARATIVE APPARATUS QQ2 (RECORDING DENSITY 600 kFRPI)
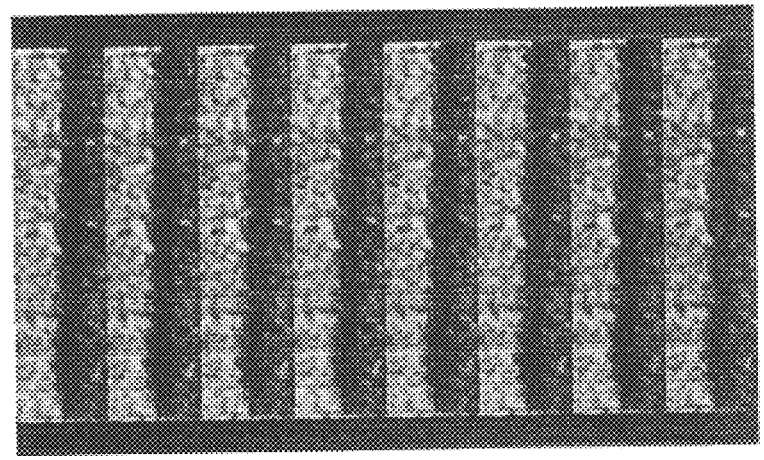

FIG.49   MFM IMAGE OF RECORDING PATTERN ON
PERPENDICULAR MAGNETIC RECORDING
MEDIUM BY COMPARATIVE APPARATUS RR1
(RECORDING DENSITY 600 kFRPI)
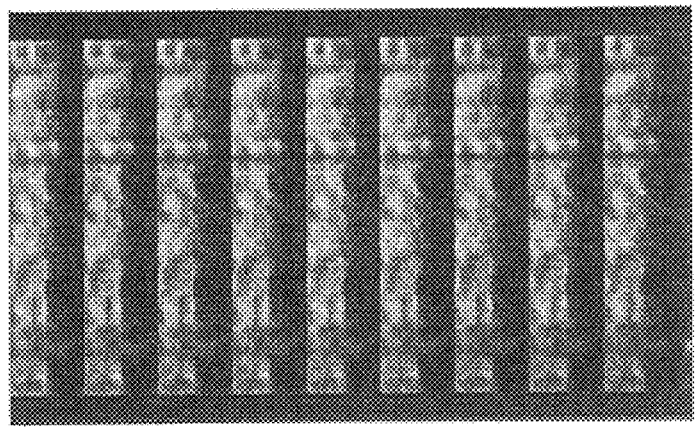
FIG.49   MFM IMAGE OF RECORDING PATTERN ON
PERPENDICULAR MAGNETIC RECORDING
MEDIUM BY COMPARATIVE APPARATUS RR2
(RECORDING DENSITY 600 kFRPI)
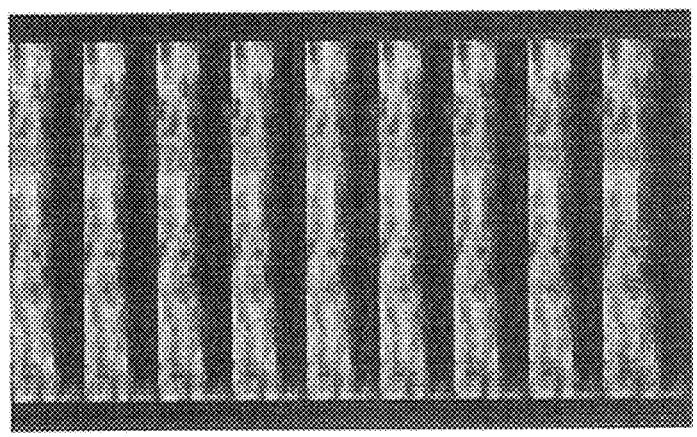

FIG.52 (1)
MFM IMAGE OF RECORDING PATTERN ON PERPENDICULAR MAGNETIC RECORDING MEDIUM BY COMPARATIVE APPARATUS SS1 (RECORDING DENSITY 600 kFRPI)
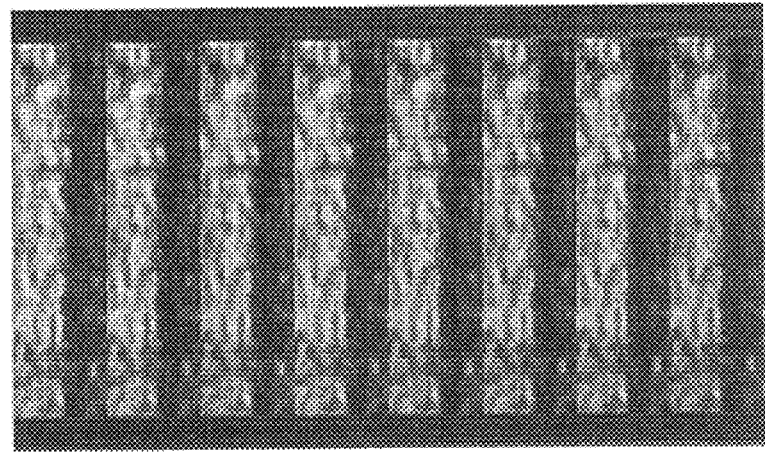
FIG.52 (2)
MFM IMAGE OF RECORDING PATTERN ON PERPENDICULAR MAGNETIC RECORDING MEDIUM BY COMPARATIVE APPARATUS SS2 (RECORDING DENSITY 600 kFRPI)
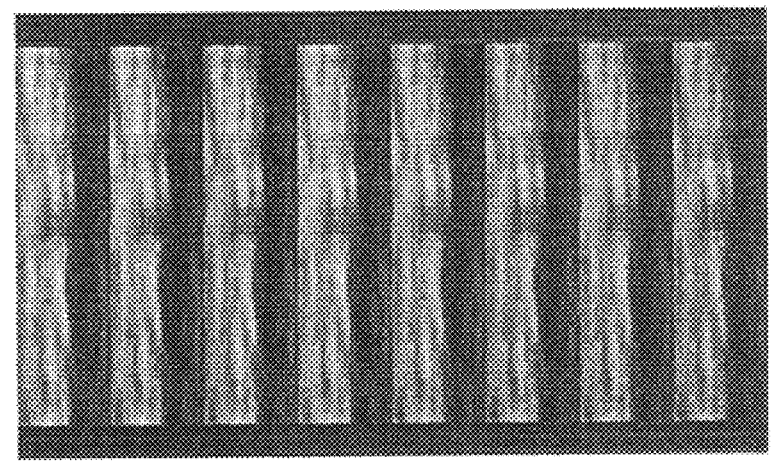

FIG. 55 (1) MFM IMAGE OF RECORDING PATTERN ON PERPENDICULAR MAGNETIC RECORDING MEDIUM BY COMPARATIVE APPARATUS TT1 (RECORDING DENSITY 600 kFRPI)
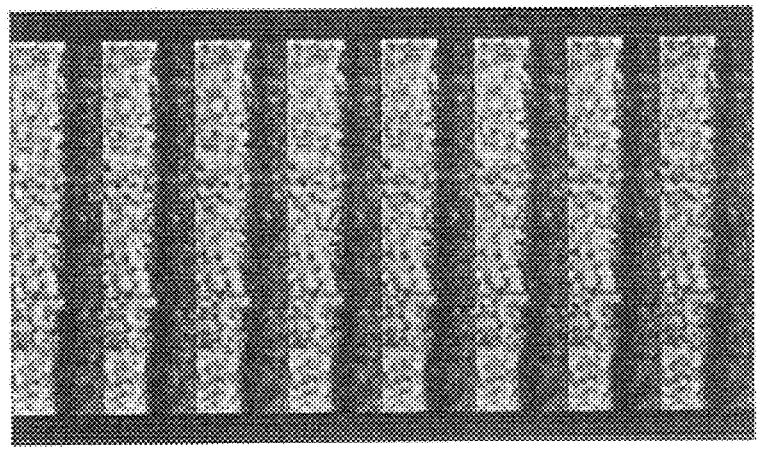
FIG. 55 (2) MFM IMAGE OF RECORDING PATTERN ON PERPENDICULAR MAGNETIC RECORDING MEDIUM BY COMPARATIVE APPARATUS TT2 (RECORDING DENSITY 600 kFRPI)
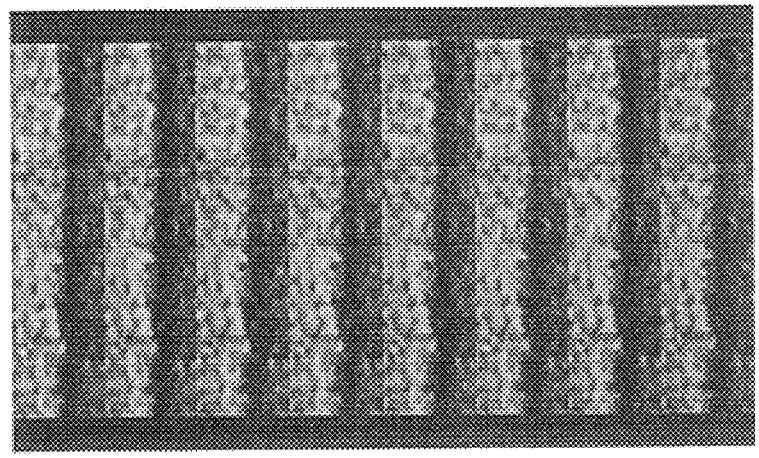

FIG.58 (1) MFM IMAGE OF RECORDING PATTERN ON PERPENDICULAR MAGNETIC RECORDING MEDIUM BY COMPARATIVE APPARATUS UU1 (RECORDING DENSITY 600 kFRPI)
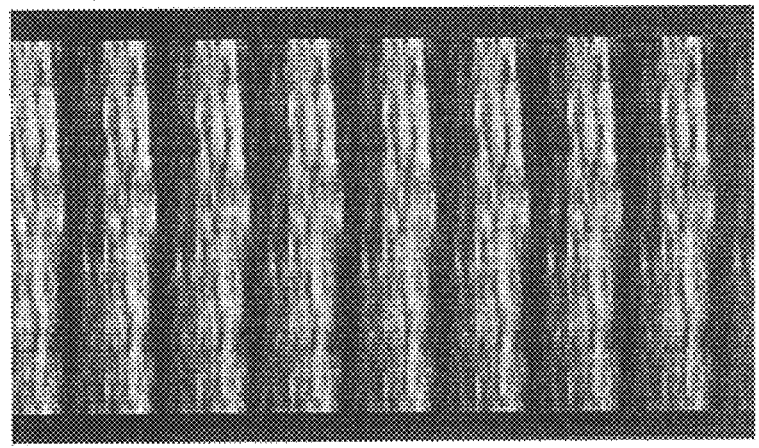
FIG.58 (2) MFM IMAGE OF RECORDING PATTERN ON PERPENDICULAR MAGNETIC RECORDING MEDIUM BY COMPARATIVE APPARATUS UU2 (RECORDING DENSITY 600 kFRPI)
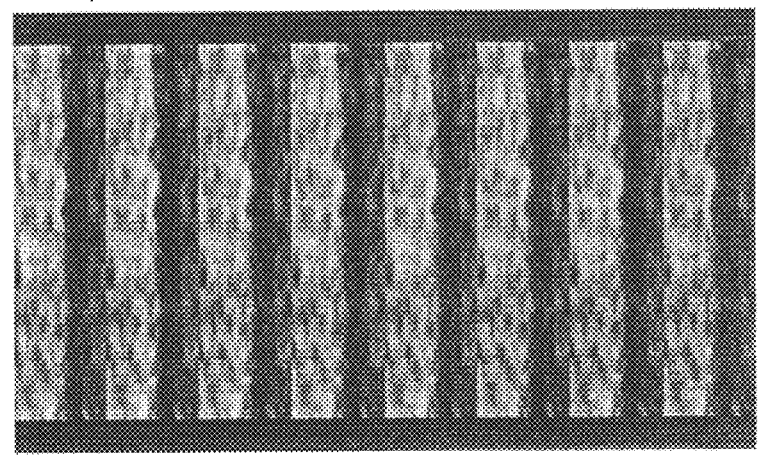

FIG. 61 (1) MFM IMAGE OF RECORDING PATTERN ON PERPENDICULAR MAGNETIC RECORDING MEDIUM BY COMPARATIVE APPARATUS VV1 (RECORDING DENSITY 600 kFRPI)
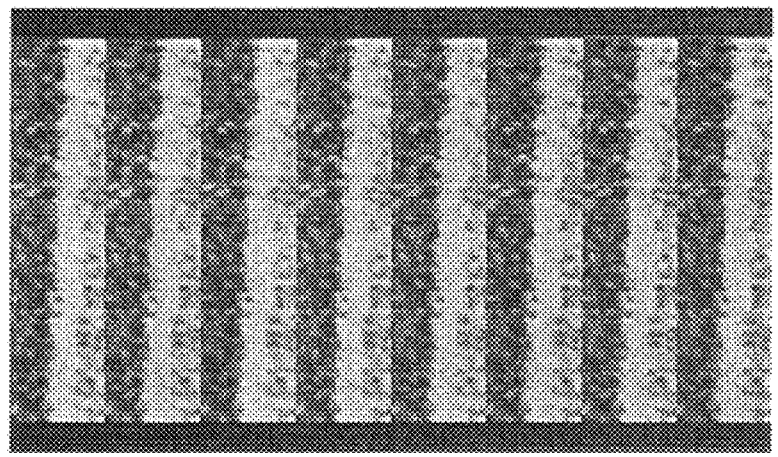
FIG. 61 (2) MFM IMAGE OF RECORDING PATTERN ON PERPENDICULAR MAGNETIC RECORDING MEDIUM BY COMPARATIVE APPARATUS VV2 (RECORDING DENSITY 600 kFRPI)
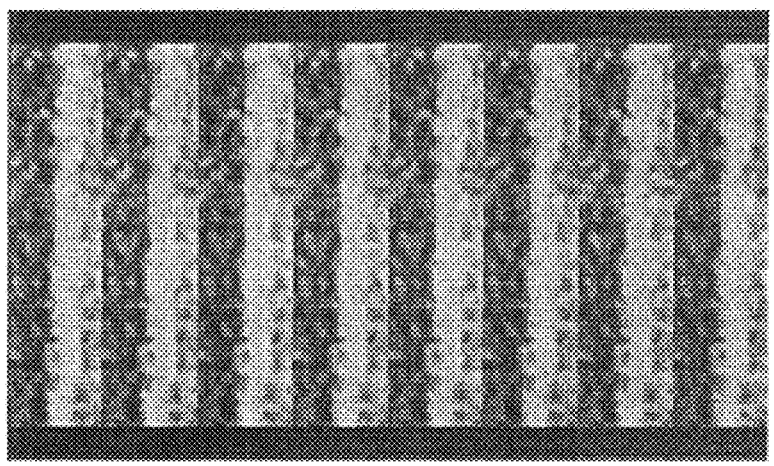

FIG.64 (1) MFM IMAGE OF RECORDING PATTERN ON PERPENDICULAR MAGNETIC RECORDING MEDIUM BY COMPARATIVE APPARATUS WW1 (RECORDING DENSITY 600 kFRPI)
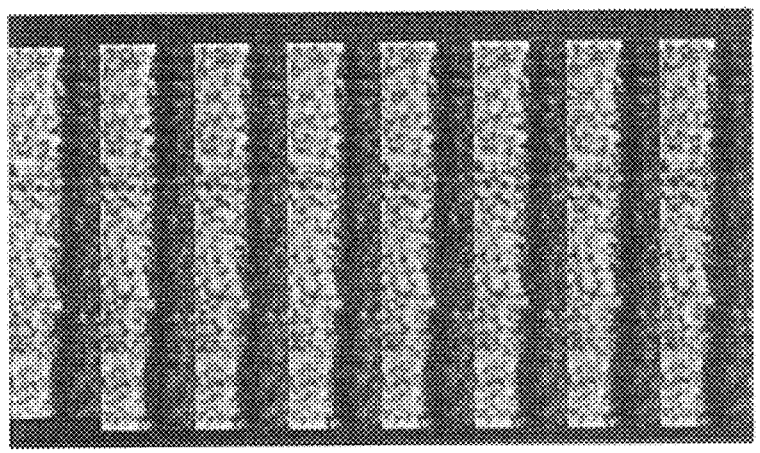
FIG.64 (2) MFM IMAGE OF RECORDING PATTERN ON PERPENDICULAR MAGNETIC RECORDING MEDIUM BY COMPARATIVE APPARATUS WW2 (RECORDING DENSITY 600 kFRPI)
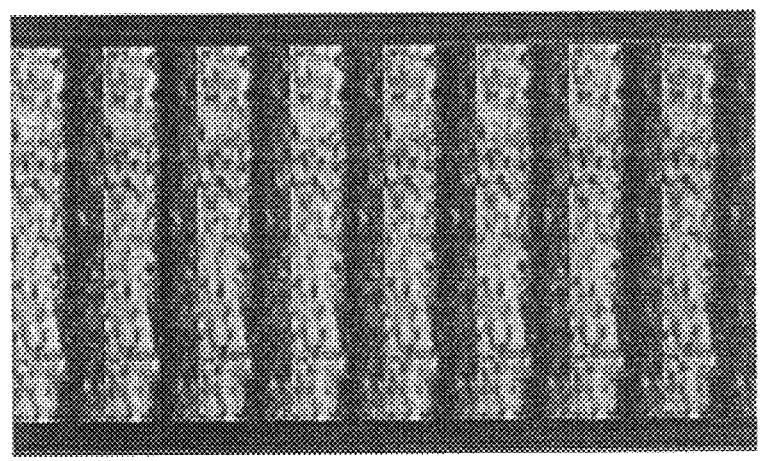

FIG.67 (1) MFM IMAGE OF RECORDING PATTERN ON PERPENDICULAR MAGNETIC RECORDING MEDIUM BY COMPARATIVE APPARATUS XX1 (RECORDING DENSITY 600 kFRPI)
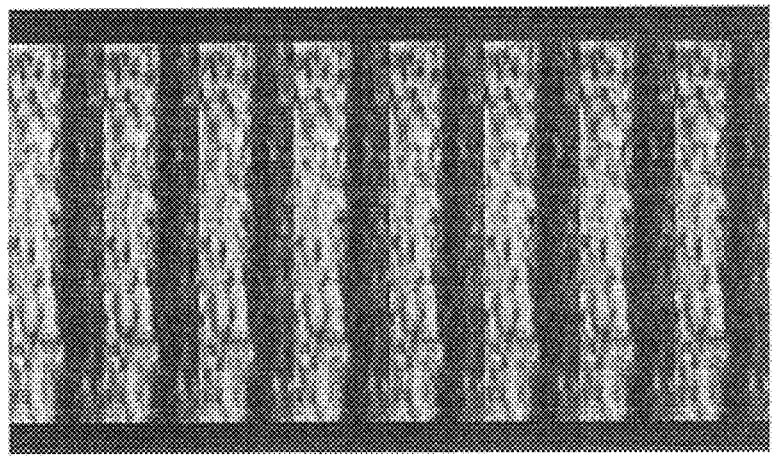
FIG.67 (2) MFM IMAGE OF RECORDING PATTERN ON PERPENDICULAR MAGNETIC RECORDING MEDIUM BY COMPARATIVE APPARATUS XX2 (RECORDING DENSITY 600 kFRPI)
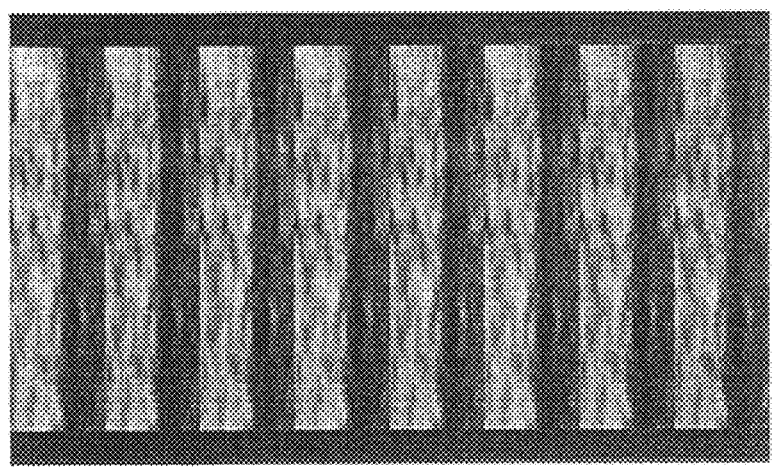

FIG. 70 (1) MFM IMAGE OF RECORDING PATTERN ON PERPENDICULAR MAGNETIC RECORDING MEDIUM BY COMPARATIVE APPARATUS YY1 (RECORDING DENSITY 600 kFRPI)
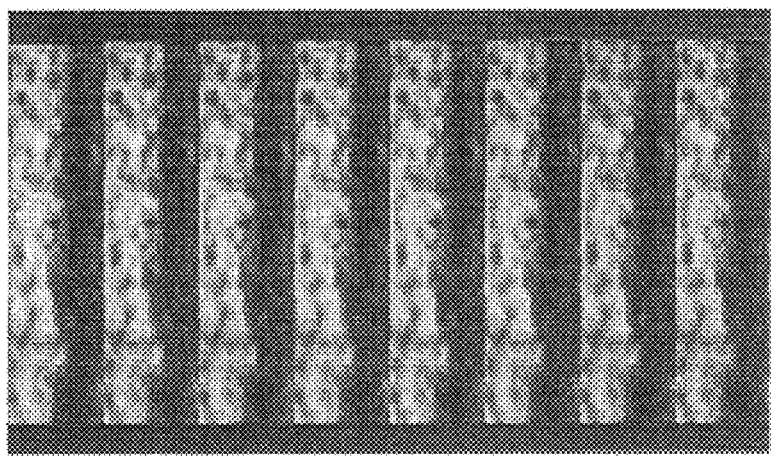
FIG. 70 (2) MFM IMAGE OF RECORDING PATTERN ON PERPENDICULAR MAGNETIC RECORDING MEDIUM BY COMPARATIVE APPARATUS YY2 (RECORDING DENSITY 600 kFRPI)
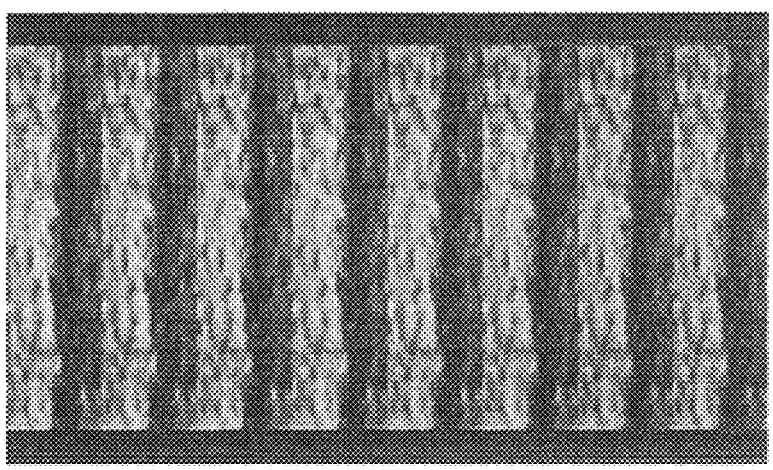

FIG.73 (1) MFM IMAGE OF RECORDING PATTERN ON PERPENDICULAR MAGNETIC RECORDING MEDIUM BY COMPARATIVE APPARATUS ZZ1 (RECORDING DENSITY 600 kFRPI)
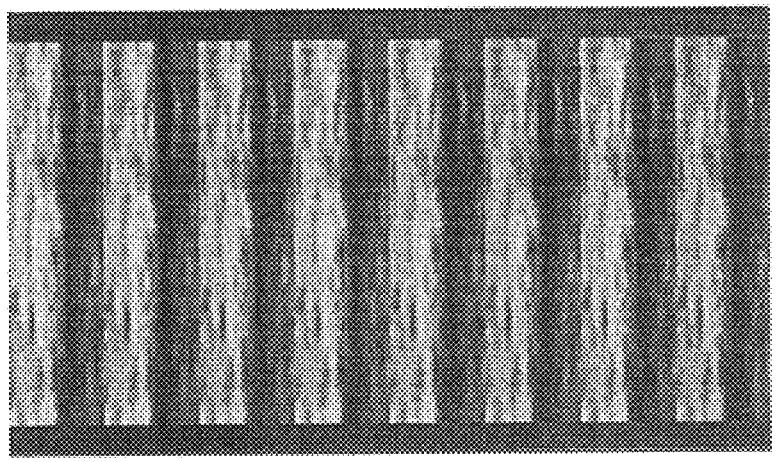
FIG.73 (2) MFM IMAGE OF RECORDING PATTERN ON PERPENDICULAR MAGNETIC RECORDING MEDIUM BY COMPARATIVE APPARATUS ZZ2 (RECORDING DENSITY 600 kFRPI)
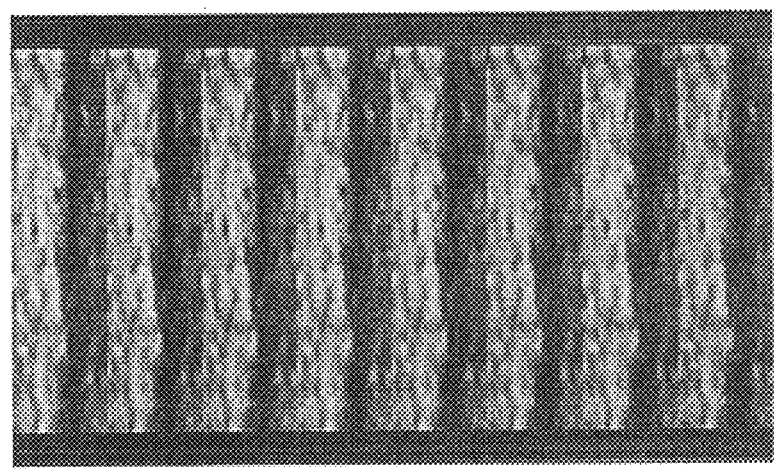

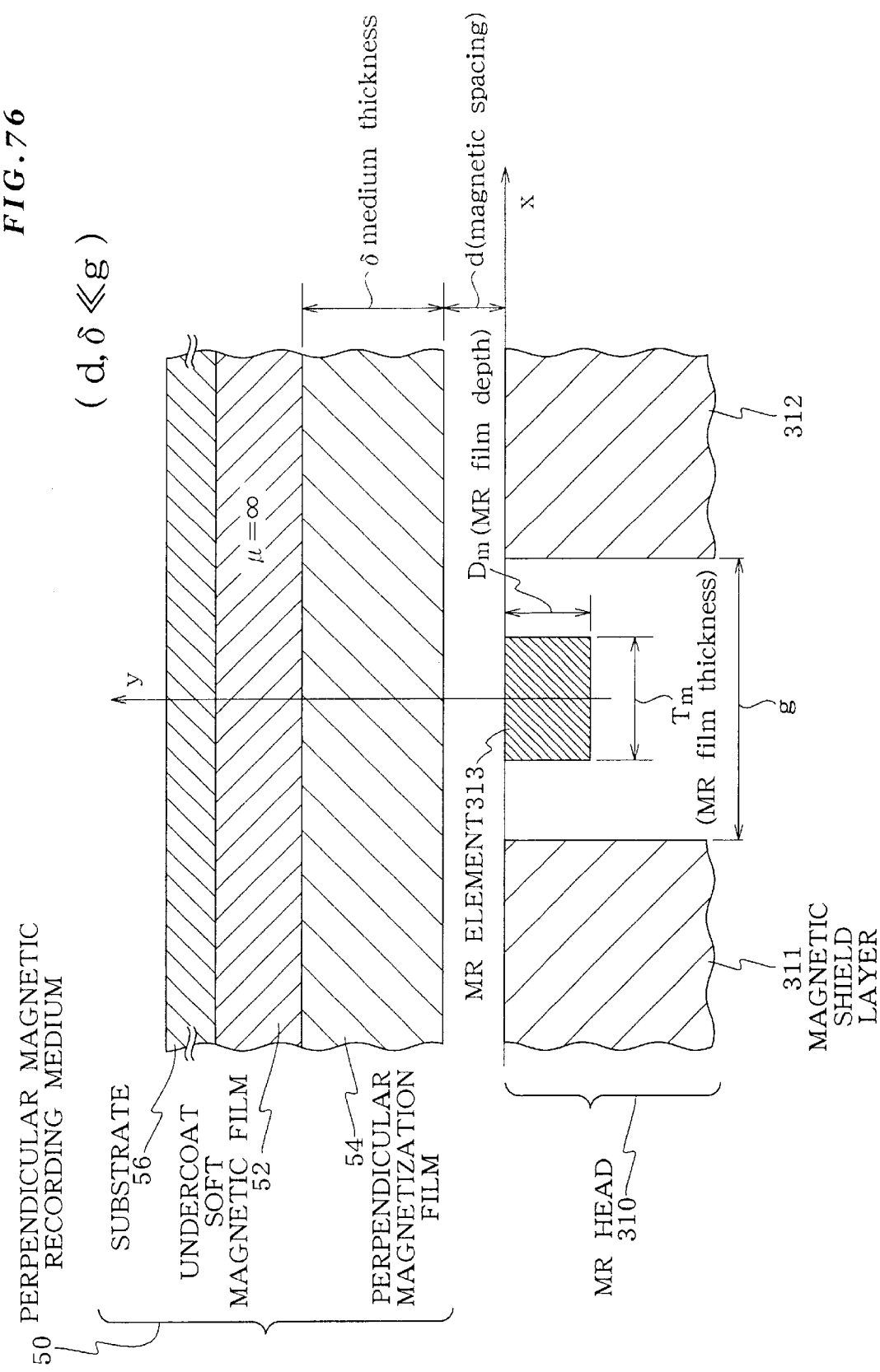

MAGNETIC DISC APPARATUS

BACKGROUND OF THE INVENTION

1. Field of the Invention

The present invention relates to a magnetic disc apparatus used as an information storage and in particular, to a magnetic disc apparatus including at least a vertical magnetic recording medium and a magnetoresistive (MR) head.

2. Description of the Related Art

Recently, with a progress of personal computers and workstations, a further higher density is required in the magnetic apparatus such as a hard disc drive. However, in the magnetic disc apparatus using the longitudinal magnetic recording method widely spread currently, a high recording density brings about various problems such as a problem of thermal decay of recording magnetization due to the reduced size of the recording bit and a problem of a high coercive force which may exceed the recording capability of the recording head. As means for significantly increasing the areal density while solving these problems, a study has been made on a magnetic disc apparatus using the perpendicular recording method.

FIG. 75 is a perspective view showing a conventional example of such a magnetic disc apparatus. This conventional magnetic disc apparatus includes: a perpendicular magnetic recording medium 50 supported by a rotary spindle 33; and a slider 32 having a single pole type MR composite head or an inductive (ID) MR composite head 31 positioned on a recording track 33 of the perpendicular recording media 50 and supported by an actuator 34.

FIG. 76 is a cross sectional view showing a reproduction system used in the conventional magnetic disc apparatus. This reproduction system includes a perpendicular magnetic recording medium 50 and an MR head 310. The perpendicular magnetic recording medium 50 has an undercoat soft magnetic film 52 and a perpendicular magnetization film 54 formed on a substrate 56. For example, the undercoat soft magnetic film 52 is formed using a NiFe alloy and the perpendicular magnetization film is formed using a CoCr alloy (Journal of Japan Applied Magnetism Society, Vol. 8, No. 1, 1984, p17). The magnetic recording method using the perpendicular magnetic recording medium 50 having the undercoat soft magnetic film 52 and the perpendicular magnetization film 54 is called a "double layered perpendicular recording method". The MR head 310 includes an MR element 313 arranged between magnetic shield layers 311 and 312 formed from a soft magnetic body. For example, the magnetic spacing d, the medium film thickness (film thickness of the perpendicular magnetization film 54) δ, and the reproduction gap length g are: 40 [nm], 100 [nm], and 0.2 [μm], respectively.

However, the reproduction system shown in FIG. 76 is designed based on the balance relationship between the reproduction gap length, the magnetic spacing, the medium film thickness, and the like in the longitudinal recording method, not realizing the optimal specification for reproduction of the double layered perpendicular recording method. Accordingly, the reproduction resolution is not sufficient and it is difficult to perform a reproduction of a high density.

SUMMARY OF THE INVENTION

It is therefore an object of the present invention to provide a magnetic disc apparatus capable of improving a reproduction resolution at a high recording density.

The inventors of the present invention have created a simulation program associated with an MR head reproduction response in the double layered perpendicular recording method. By using this simulation program, we have designed a reproduction system of the double layered perpendicular magnetic recording method within a range of optimal values of specifications. As a result, it has been found that the conventional design value are appropriate for the longitudinal magnetic recording method but no appropriate for the double layered perpendicular magnetic recording method. For example, the reproduction gap length g has been too large for the magnetic spacing d and the medium thickness δ. According to the magnetic disc apparatus of the present invention, it is possible to use optimal design values obtained by simulation and by far improve the reproduction resolution as compared to the magnetic disc apparatus of the conventional double layered perpendicular magnetic recording method.

That is, the magnetic disc apparatus of the present invention includes a perpendicular magnetic recording medium and a magnetic recording/reproduction system for recording or reproducing an information onto/from the perpendicular magnetic recording medium. The perpendicular magnetic recording medium has an undercoat soft magnetic film and a vertical magnetization film. The magnetic recording/reproduction system has a single pole MR composite head consisting of a single pole head for recording and an MR head for reproduction or an inductive MR composite head consisting of an inductive head for recording and an MR head for reproduction. The magnetic disc apparatus of the present invention is characterized as follows.

In one embodiment of the invention, in the magnetic disc apparatus, a reproduction gap length as a space between a pair of magnetic shield layers sandwiching the MR head is not greater than 0.1 micrometers. In another embodiment of the invention, in the magnetic disc apparatus, when an information is reproduced with respect to the perpendicular magnetic recording medium using the single pole MR composite head or the inductive MR composite head, the magnetic spacing as a space between the single pole MR composite head or the inductive MR composite head and the perpendicular magnetic recording medium is not greater than 20 nm. In another embodiment of the invention, in the magnetic disc apparatus, the perpendicular magnetization film has a film thickness not greater than 50. In another embodiment of the invention, in the magnetic disc apparatus, the undercoat soft magnetic film has a film thickness not greater than 200 nm.

In general, the reproduction resolution is improved as the values of the reproduction gap length, the magnetic spacing, the perpendicular magnetization film thickness, and the undercoat soft magnetic film thickness are reduced below the aforementioned upper limit values. This has been confirmed by the aforementioned simulation. However, lower limit values can be set as follows. The reproduction gap length is, for example, not smaller than 0.05 [micrometers] as the limit of the current fine processing technique. The magnetic spacing is defined by the head floating amount added by a medium protection film thickness and a medium lubrication film thickness and is, for example, not less than 12 [nm]. The perpendicular magnetization film thickness is, for example, not less than 20 [nm] because when the film thickness is too small, the reproduction output is decreased, deteriorating the SN ratio. The undercoat soft magnetic film thickness is, for example, not less than 100 [nm] because when the film thickness is too small, the reproduction output is deteriorated.

Moreover, the undercoat soft magnetic film is preferably formed from FeSiAl or FeSiAl-containing alloy, CoNiFe or CoNiFe-containing alloy, CoZrTa, CoZrNb alloy, or the like. The perpendicular magnetization film is preferably formed from CoCrM alloy (wherein M is Tb, Dy, Ho, Er, or Tm), FePt alloy or FePt-containing alloy, $RCo_5$ (wherein R is Y, Ce, Sm, La, or Pr), $R_2Co_{17}$ (wherein R is Y, Ce, Sm, La, or Pr)

BRIEF DESCRIPTION OF THE DRAWINGS

FIG. 4 and [2] are magnetic force microscope (MFM) photos showing recording magnetization patterns in Example 1 of the present invention: FIG. 4 is a recording magnetization pattern obtained by a comparative apparatus AA1 and FIG. 4 is a recording magnetization pattern obtained by a comparative apparatus AA2.

FIG. 7 and [2] are magnetic force microscope (MFM) photos showing recording magnetization patterns in Example 2 of the present invention: FIG. 7 is a recording magnetization pattern obtained by a comparative apparatus BB1 and FIG. 7 is a recording magnetization pattern obtained by a comparative apparatus BB2.

FIG. 10 and [2] are magnetic force microscope (MFM) photos showing recording magnetization patterns in Example 3 of the present invention: FIG. 10 is a recording magnetization pattern obtained by a comparative apparatus CC1 and FIG. 10 is a recording magnetization pattern obtained by a comparative apparatus CC2.

FIG. 13 and [2] are magnetic force microscope (MFM) photos showing recording magnetization patterns in Example 4 of the present invention: FIG. 13 is a recording magnetization pattern obtained by a comparative apparatus DD1 and FIG. 13 is a recording magnetization pattern obtained by a comparative apparatus DD2.

FIG. 16 and [2] are magnetic force microscope (MFM) photos showing recording magnetization patterns in Example 5 of the present invention: FIG. 16 is a recording magnetization pattern obtained by a comparative apparatus EE1 and FIG. 16 is a recording magnetization pattern obtained by a comparative apparatus EE2.

FIG. 19 and [2] are magnetic force microscope (MFM) photos showing recording magnetization patterns in Example 6 of the present invention: FIG. 19 is a recording magnetization pattern obtained by a comparative apparatus FF1 and FIG. 19 is a recording magnetization pattern obtained by a comparative apparatus FF2.

FIG. 22 and [2] are magnetic force microscope (MFM) photos showing recording magnetization patterns in Example 7 of the present invention: FIG. 22 is a recording magnetization pattern obtained by a comparative apparatus GG1 and FIG. 22 is a recording magnetization pattern obtained by a comparative apparatus GG2.

FIG. 25 and [2] are magnetic force microscope MFM) photos showing recording magnetization patterns n Example 8 of the present invention: FIG. 25 is recording magnetization pattern obtained by a comparative apparatus HH1 and FIG. 25 is a recording magnetization pattern obtained by a comparative apparatus HH2.

FIG. 28 and [2] are magnetic force microscope (MFM) photos showing recording magnetization patterns in Example 9 of the present invention: FIG. 28 is a recording magnetization pattern obtained by a comparative apparatus JJ1 and FIG. 28 is a recording magnetization pattern obtained by a comparative apparatus JJ2.

FIG. 31 and [2] are magnetic force microscope (MFM) photos showing recording magnetization patterns in Example 10 of the present invention: FIG. 31 is a recording magnetization pattern obtained by a comparative apparatus KK1 and FIG. 31 is a recording magnetization pattern obtained by a comparative apparatus KK2.

FIG. 34 and [23] are magnetic force microscope (MFM) photos showing recording magnetization patterns in Example 11 of the present invention: FIG. 34 is a recording magnetization pattern obtained by a comparative apparatus LL1 and FIG. 34 is a recording magnetization pattern obtained by a comparative apparatus LL2.

FIG. 37 and [2] are magnetic force microscope (MFM) photos showing recording magnetization patterns in Example 12 of the present invention: FIG. 37 is a recording magnetization pattern obtained by a comparative apparatus MM1 and FIG. 37 is a recording magnetization pattern obtained by a comparative apparatus MM2.

FIG. 40 and [2] are magnetic force microscope (MFM) photos showing recording magnetization patterns in Example 13 of the present invention: FIG. 40 is a recording magnetization pattern obtained by a comparative apparatus NN1 and FIG. 40 is a recording magnetization pattern obtained by a comparative apparatus NN2.

FIG. 43 and [2] are magnetic force microscope (MFM) photos showing recording magnetization patterns in Example 14 of the present invention: FIG. 43 is a recording magnetization pattern obtained by a comparative apparatus PP1 and FIG. 43 is a recording magnetization pattern obtained by a comparative apparatus PP2.

FIG. 46 and [2] are magnetic force microscope (MFM) photos showing recording magnetization patterns in Example 15 of the present invention: FIG. 46 is a recording magnetization pattern obtained by a comparative apparatus QQ1 and FIG. 46 is a recording magnetization pattern obtained by a comparative apparatus QQ2.

FIG. 49 and [2] are magnetic force microscope (MFM) photos showing recording magnetization patterns in Example 16 of the present invention: FIG. 49 is a recording magnetization pattern obtained by a comparative apparatus RR1 and FIG. 49 is a recording magnetization pattern obtained by a comparative apparatus RR2.

FIG. 52 and [21] are magnetic force microscope (MFM) photos showing recording magnetization patterns in Example 17 of the present invention: FIG. 52 is a recording magnetization pattern obtained by a comparative apparatus SS1 and FIG. 52 is a recording magnetization pattern obtained by a comparative apparatus SS2.

FIG. 55 and [2]) are magnetic force microscope (MFM) photos showing recording magnetization patterns in Example 18 of the present invention: FIG. 55 is a recording magnetization pattern obtained by a comparative apparatus TT1 and FIG. 55 is a recording magnetization pattern obtained by a comparative apparatus TT2.

FIG. 58 and [2] are magnetic force microscope (MFM) photos showing recording magnetization patterns in Example 19 of the present invention: FIG. 58 is a recording magnetization pattern obtained by a comparative apparatus UU1 and FIG. 58 is a recording magnetization pattern obtained by a comparative apparatus UU2.

FIG. 61 and [2] are magnetic force microscope (MFM) photos showing recording magnetization patterns in Example 20 of the present invention: FIG. 61 is a recording magnetization pattern obtained by a comparative apparatus VV1 and FIG. 61 is a recording magnetization pattern obtained by a comparative apparatus VV2.

FIG. 64 and [2] are magnetic force microscope (MFM) photos showing recording magnetization patterns in Example 21 of the present invention: FIG. 64 is a recording magnetization pattern obtained by a comparative apparatus WW1 and FIG. 64 is a recording magnetization pattern obtained by a comparative apparatus WW2.

FIG. 67 and [2] are magnetic force microscope (MFM) photos showing recording magnetization patterns in Example 22 of the present invention: FIG. 67 is a recording magnetization pattern obtained by a comparative apparatus XX1 and FIG. 67 is a recording magnetization pattern obtained by a comparative apparatus XX2.

FIG. 70 and [2] are magnetic force microscope (MFM) photos showing recording magnetization patterns in Example 23 of the present invention: FIG. 70 is a recording magnetization pattern obtained by a comparative apparatus YY1 and FIG. 70 is a recording magnetization pattern obtained by a comparative apparatus YY2.

FIG. 73 and [2] are magnetic force microscope (MFM) photos showing recording magnetization patterns in Example 24 of the present invention: FIG. 73 is a recording magnetization pattern obtained by a comparative apparatus ZZ1 and FIG. 73 is a recording magnetization pattern obtained by a comparative apparatus ZZ2.

FIG. 76 is a cross sectional view of a reproduction system in the magnetic disc apparatus of FIG. 75.

DESCRIPTION OF THE PREFERRED EMBODIMENTS

Figure 1:
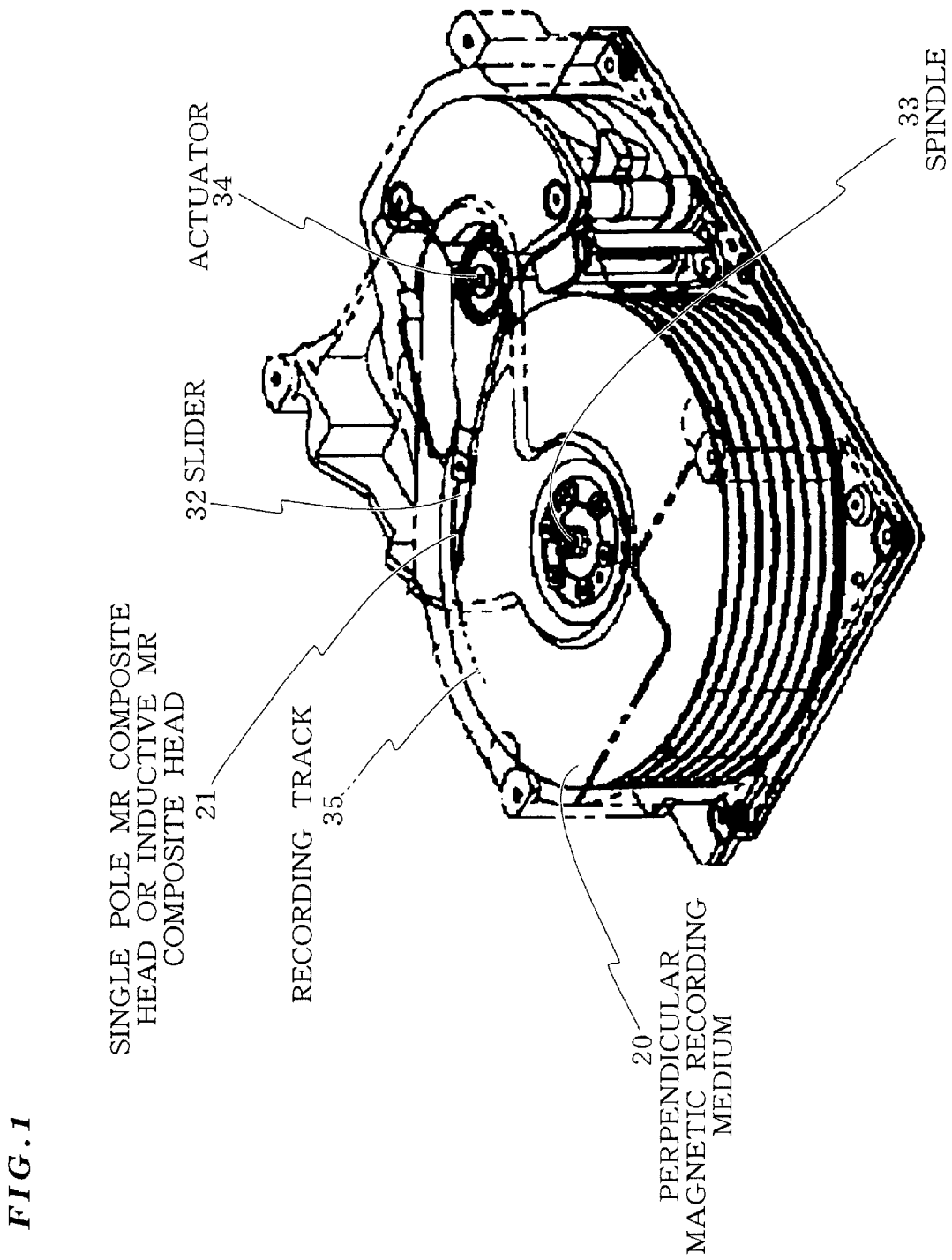
FIG. 1 is an external perspective view of a magnetic disc apparatus according to an embodiment of the present invention.
Figure 2:
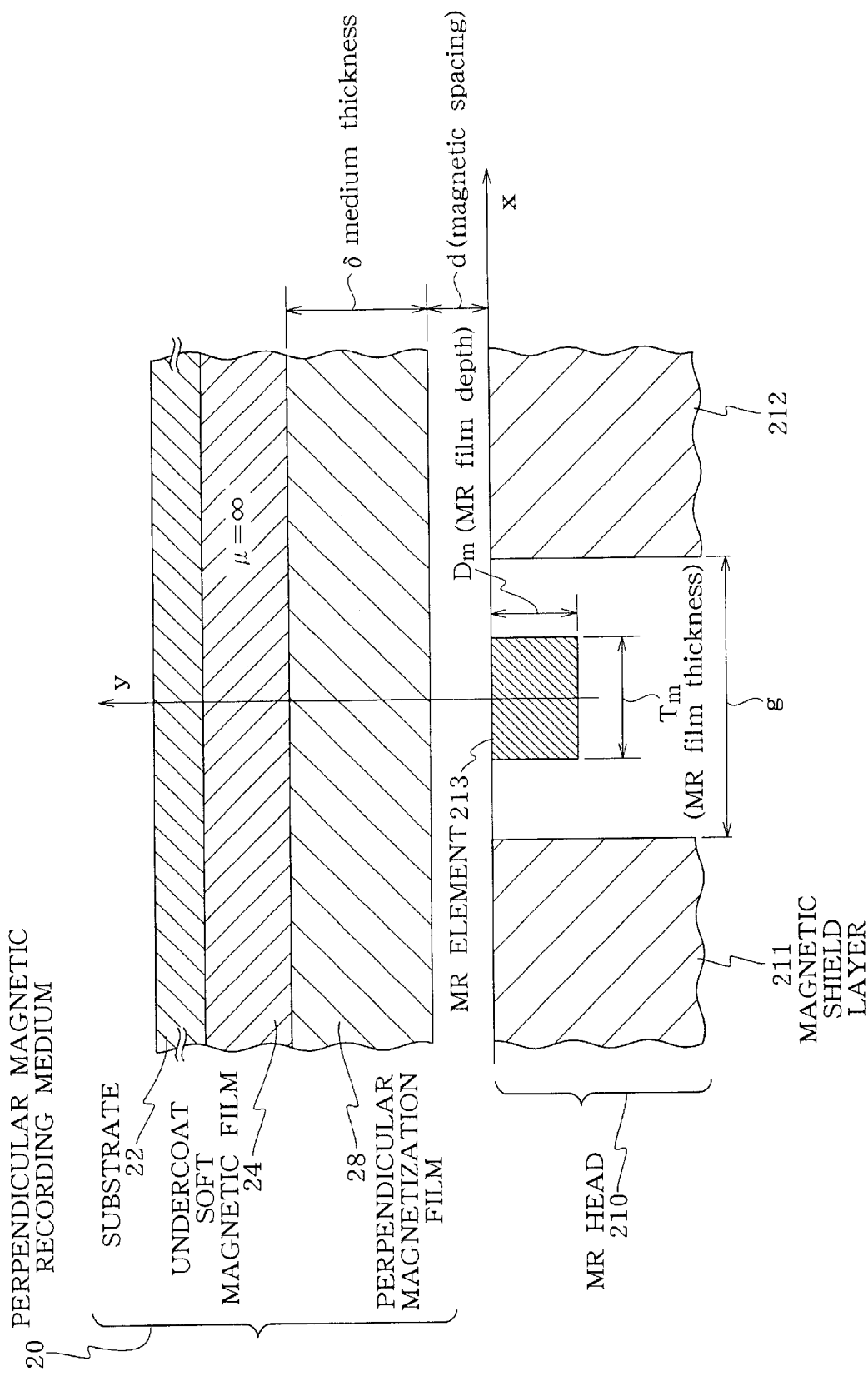
FIG. 2 is a cross sectional view of a reproduction system in the magnetic disc apparatus of FIG. 1.

FIG. 1 is an external perspective view of a magnetic disc apparatus according to an embodiment of the present invention. FIG. 2 is a cross sectional view of a reproduction system in the magnetic disc apparatus of FIG. 1. Hereinafter, explanation will be given with reference to these figures.

The magnetic disc apparatus according to the present embodiment includes: a perpendicular magnetic recording medium 20 supported by a rotary spindle 33; and a slider 32 having a single pole type MR composite head or inductive MR composite head 21 positioned on a recording track 35 on the perpendicular magnetic recording medium 20 and supported by an actuator 34. The perpendicular magnetic recording medium 20 has an undercoat magnetic film 24 and a perpendicular magnetization film 28 formed on a substrate 22. The MR head 210 has an ME element 213 arranged between magnetic shield layers 211 and 212 formed from a soft magnetic body.

In this embodiment, the head-perpendicular magnetic recording medium reproduction system is designed within a range of optimal values of specification obtained by simulation of the MR head reproduction response of the double-layered perpendicular recording method. This enables to provide a magnetic disc apparatus having a by far improved reproduction resolution than a conventional magnetic apparatus of the double layered perpendicular recording method and capable of easily performing reproduction in the case of a high recording density. Hereinafter, the present embodiment will be explained further specifically through Examples 1 to 24. It should be noted that a "comparative apparatus" in each of the Examples is a novel apparatus to be compared to the apparatus of the present invention and not a conventional apparatus.

EXAMPLE 1

A perpendicular magnetic recording medium was produced as follows. Firstly, using a 6-inch FeSiAl target, an undercoat film of 20 nm thickness was formed on a 2.5-inch substrate by the sputtering method. The film formation condition was as follows: the initial vacuum degree was $5 \times 10^{-7}$ mTorr or below; power was 0.5 kw; argon gas pressure was 4 mTorr; and the film formation speed was 3 nm/sec. Then, using a $Co_{77}Cr_{19}Tb_4$ (at %) target and setting the temperature of the substrate at 400 degrees C., a perpendicular magnetization film of 50 nm thickness was formed on the undercoat soft magnetic film by the sputtering method. Furthermore, a carbon protection film of 5 nm thickness was formed thereon.

A magnetic disc apparatus was produced by using this perpendicular magnetic recording medium and a single pole type MR composite head or inductive MR composite head. The MR head reproduction gap length was varied in a range from 0.08 to 0.15 micrometers. Here, the inductive MR composite head recording track width was 4 micrometers, the reproduction track width was 3 micrometers, and the recording gap length was 0.4 micrometers. Moreover, the single pole type head had a recording track width of 4 micrometers and a main pole film thickness of 0.4 micrometers. It should be noted that the recording current was set to 10 mAop, the sense current was 12 mA, the circumferential speed was 12.7 m/s, and the magnetic spacing was 20 nm.

A magnetic disc apparatus having an undercoat soft magnetic film of 200 nm, a perpendicular magnetization film of 50 nm, a reproduction gap length of 0.10 micrometers, and a magnetic spacing of 20 nm, and using a single pole type MR composite head will be referred to as an apparatus of the present invention AA3, and an identical apparatus using the inductive MR composite head instead of the single pole type MR composite head will be referred to as an apparatus of the present invention AA4. Moreover, apparatuses produced in the same way as the AA3 and AA4 except for that the reproduction gap length is 0.12 micrometers will be referred to as comparative apparatuses AA1 and AA2, respectively.

Figure 3:
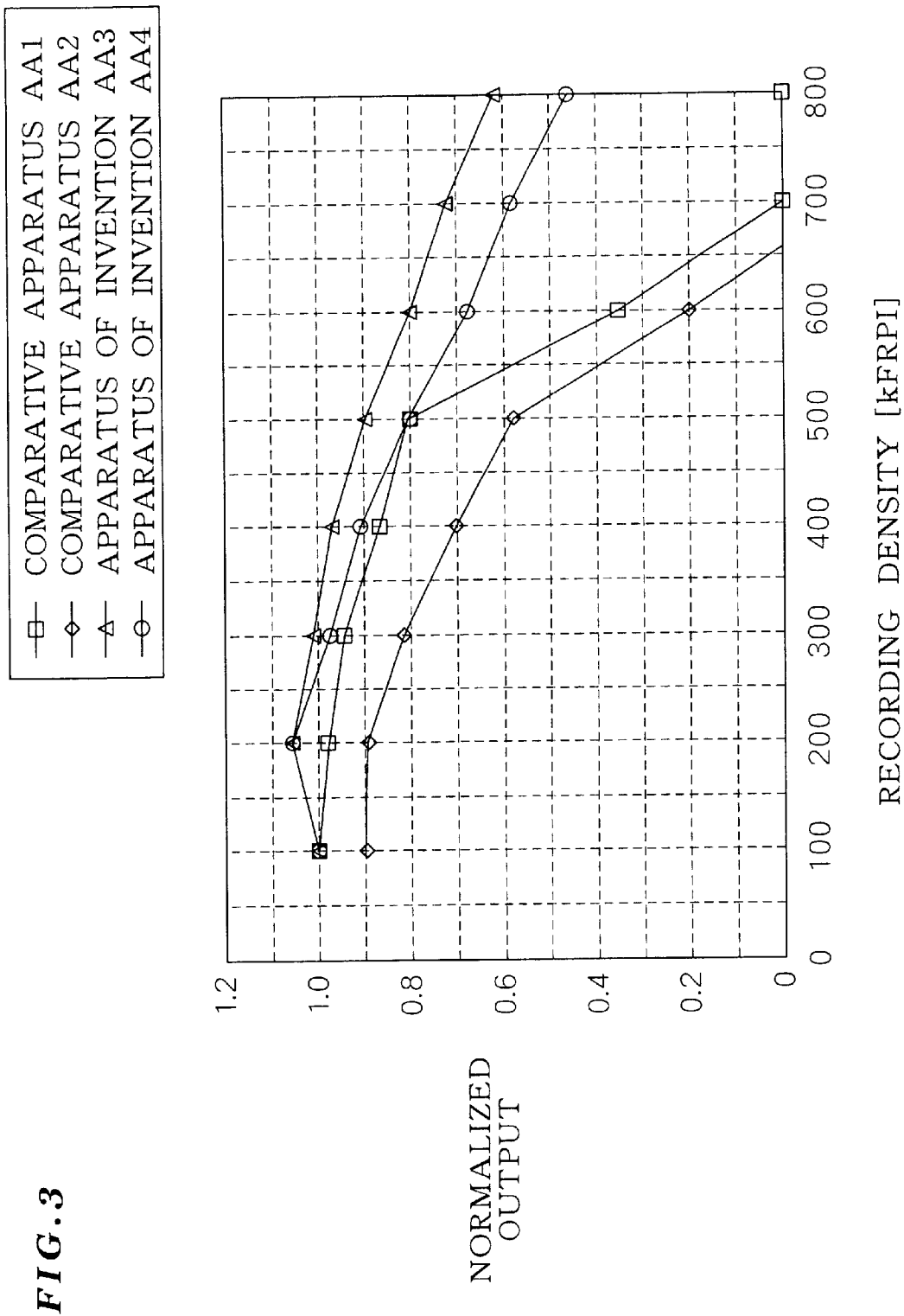
FIG. 3 is a graph showing output dependency on the recording density in Example 1 of the present invention.

An experiment on recording/reproduction was performed using the comparative apparatuses AA1 and AA2. FIG. 3 shows output dependency on the recording density. As can be seen from this figure, it is possible to obtain a reasonable reproduction output up to the recording density of 500 kFRPI but after the 500 kFRPI the reproduction output is abruptly decreased. FIG. 4 and [2] show recording magnetization patterns of recording states obtained at the recording density 600 kFRPI by the comparative apparatuses AA1 and AA2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses AA1 and AA2 are not caused by a recording state defect but by a reproduction resolution defect.

Figure 5:
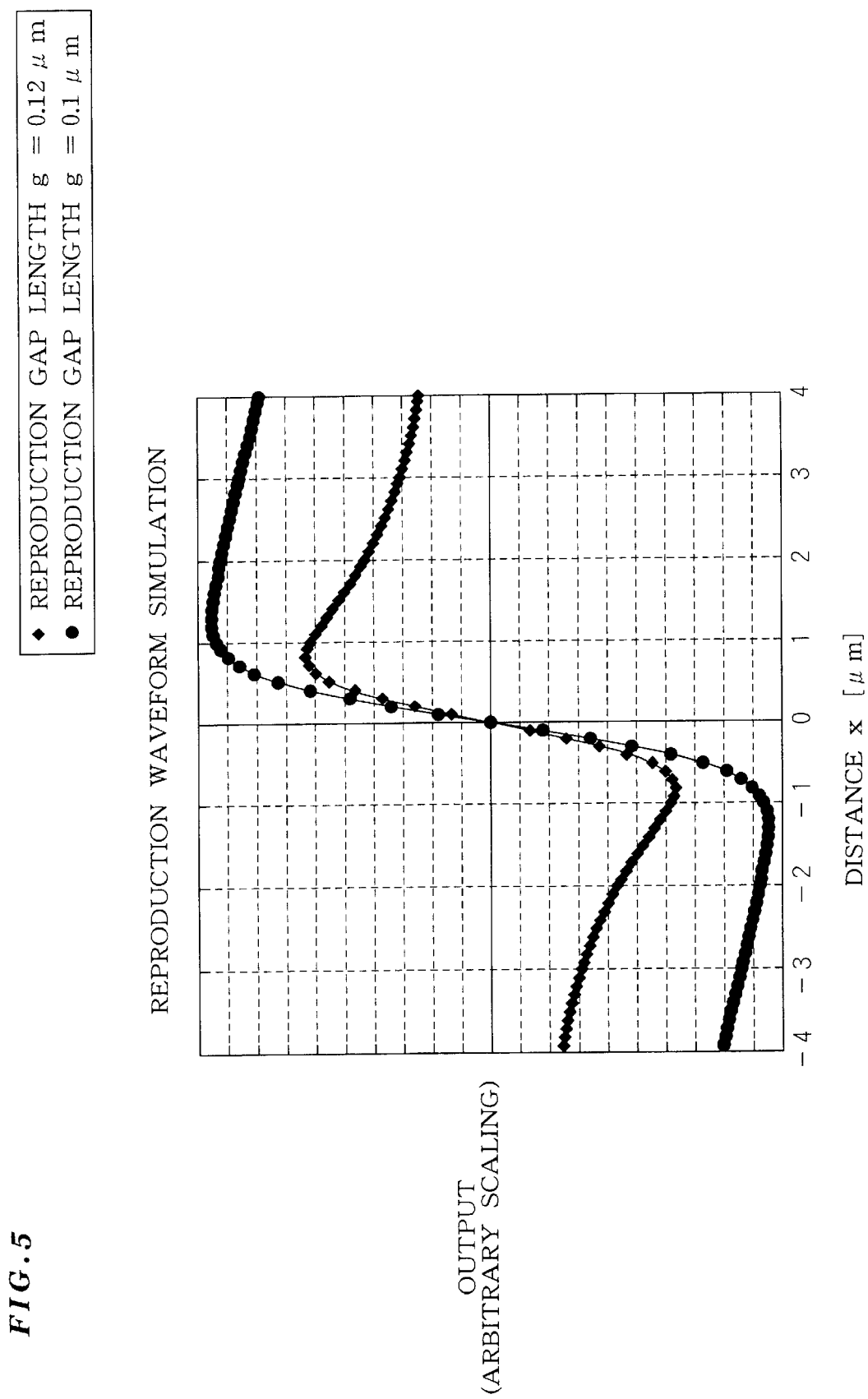
FIG. 5 is a graph showing a reproduction response simulation result in Example 1 of the present invention.

By simulation of the reproduction response of the double layered perpendicular magnetic recording medium, it has been expected that it is possible to improve the reproduction resolution by reducing the reproduction gap by about 10% for the reproduction specifications of the comparative apparatuses. This is shown in FIG. 5. An experiment on recording and reproduction was performed using the apparatuses of the present invention AA3 and AA4 constructed according to this expectation. The output dependence on the recording density is shown in FIG. 3. As is clear from this figure, when using the apparatuses of the present invention AA3 and AA4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.10 micrometers or below. Furthermore, a similar effect can be obtained when the third element Tb of the perpendicular magnetization film is replaced by Dy, Ho, Er, or Tm.

Thus, by using the apparatuses of the present invention AA3 and AA4, it is possible to realize an information storage based on the double layered perpendicular magnetic recording method of a super high recording density enabling reproduction at super high recording density.

EXAMPLE 2

A perpendicular magnetic recording medium was prepared in the same way as Example 1 except for that the FeSiAl target was replaced by a FeSiAlTi target, and the $Co_{77}Cr_{19}Tb_4$ (at %) target was replaced by $Co_{77}Cr_{19}Dy_4$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied in a range from 15 to 25 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention BB3, and an identical apparatus using the inductive MR composite head instead of the single pole type MR composite head will be referred to as an apparatus of the present invention BB4. Moreover, apparatuses produced in the same way as the BB3 and BB4 except for that the magnetic spacing is 23 nm will be referred to as comparative apparatuses BB1 and BB2, respectively.

Figure 6:
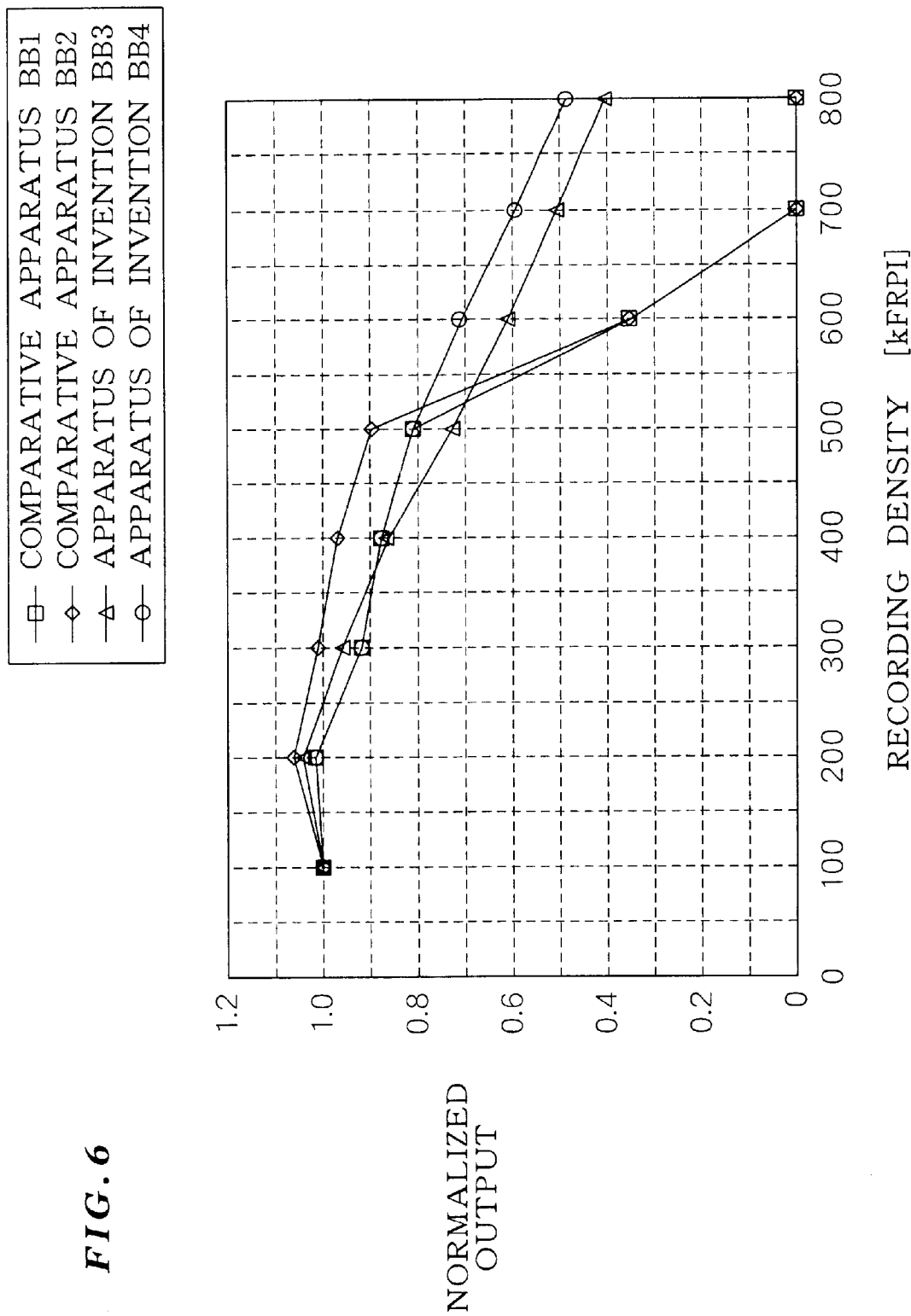
FIG. 6 is a graph showing output dependency on the recording density in Example 2 of the present invention.

An experiment of recording and reproduction was performed using the comparative apparatuses BB1 and BB2. FIG. 6 shows output dependency on the recording density. As can be seen from this figure, it is possible to obtain a reasonable reproduction output up to the recording density of 500 kFRPI but after the 500 kFRPI the reproduction output is abruptly decreased.

FIG. 7 and [2] show recording magnetization patterns of recording states obtained at the recording density 600 kFRPI by the comparative apparatuses BB1 and BB2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses BB1 and BB2 are not caused by a recording state defect but by a reproduction resolution defect.

Figure 8:
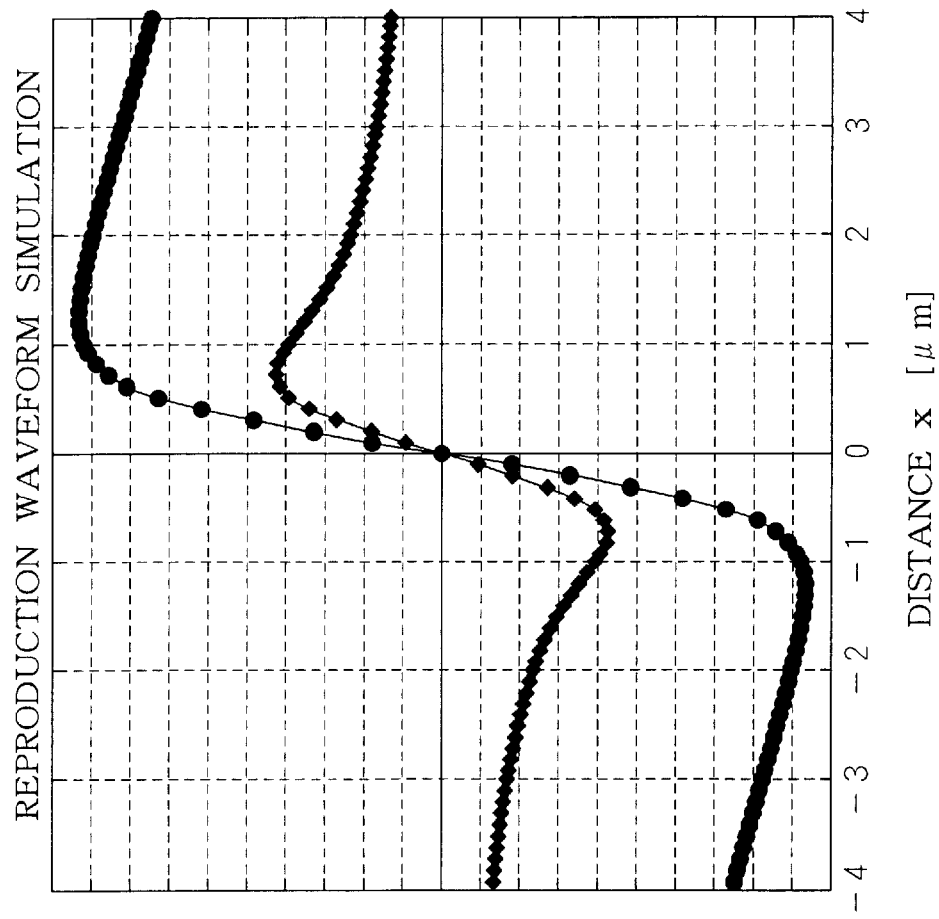
FIG. 8 is a graph showing a reproduction response simulation result in Example 2 of the present invention.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 8. An experiment on recording and reproduction was performed using the apparatuses of the present invention BB3 and BB4 constructed according to this expectation. The output dependence on the recording density is shown in FIG. 6. As is clear from this figure, when using the apparatuses of the present invention BB3 and BB4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved. Accordingly, a similar effect can be obtained when the magnetic spacing is 20 nm or below. Furthermore, a similar effect can be obtained when the third element Dy of the perpendicular magnetization film is replaced by Tb, Ho, Er, or Tm.

Thus, by using the apparatuses of the present invention BB3 and BB4, it is possible to realize an information storage based on the double layered perpendicular magnetic recording method of a super high recording density enabling reproduction at a super high recording density.

EXAMPLE 3

A perpendicular magnetic recording medium was prepared in the same way as Example 1 except for that the FeSiAl target was replaced by a CoNiFe target, and the $Co_{77}Cr_{19}Tb_4$ (at %) target was replaced by $Co_{77}Cr_{19}Ho_4$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied in a range from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention CC3, and an identical apparatus using the inductive MR composite head instead of the single pole type MR composite head will be referred to as an apparatus of the present invention CC4. Moreover, apparatuses produced in the same way as CC3 and CC4 except for that the reproduction gap length is 0.12 micrometers will be referred to as comparative apparatuses CC1 and CC2, respectively.

Figure 9:
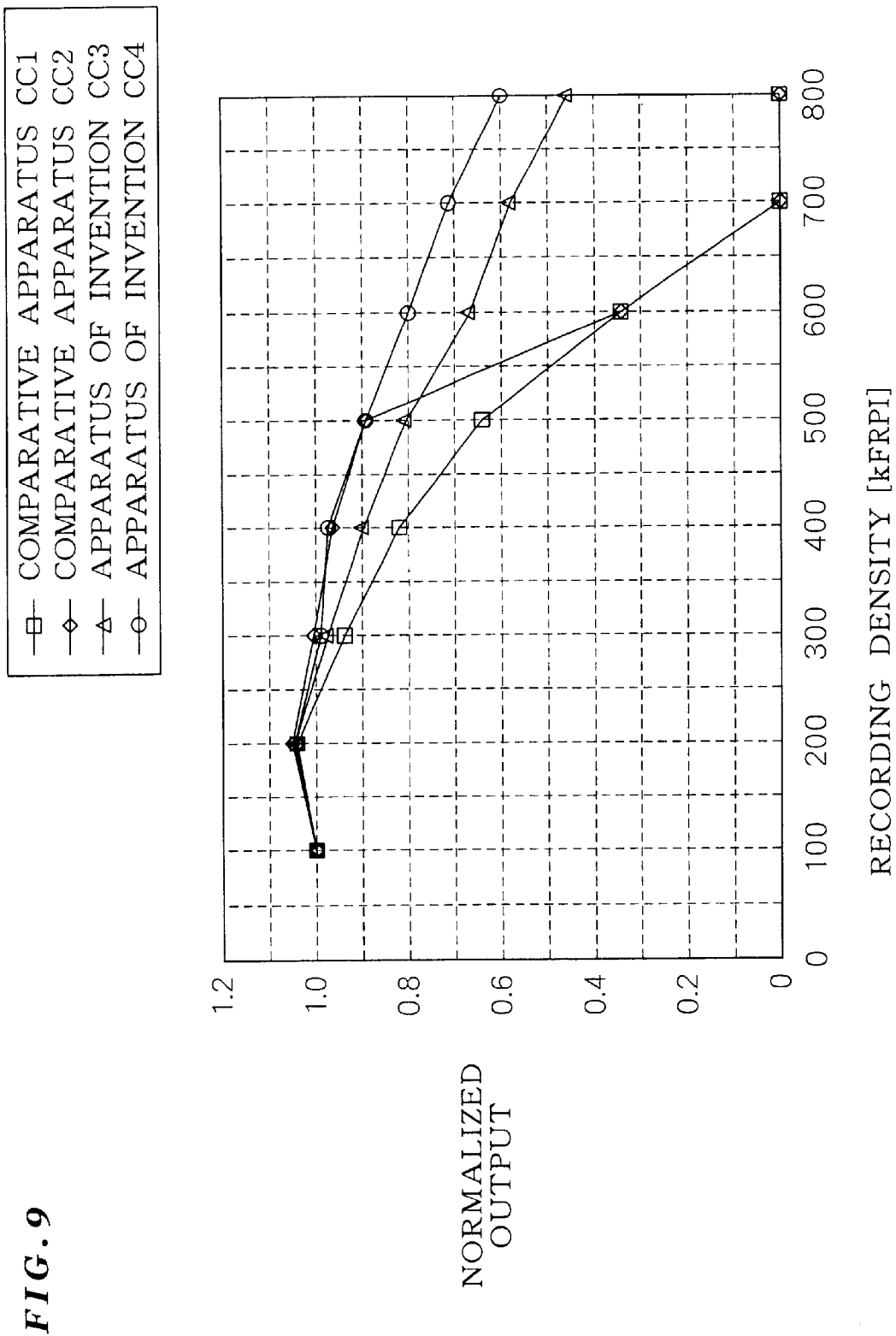
FIG. 9 is a graph showing output dependency on the recording density in Example 3 of the present invention.

An experiment on recording/reproduction was performed using the comparative apparatuses CC1 and CC2. FIG. 9 shows output dependency on the recording density. As can be seen from this figure, it is possible to obtain a reasonable reproduction output up to the recording density of 500 kFRPI but after the 500 kFRPI the reproduction output is abruptly decreased. FIG. 10 and [2] show recording magnetization patterns of recording states obtained at the recording density 600 kFRPI by the comparative apparatuses CC1 and CC2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses CC1 and CC2 are not caused by a recording state defect but by a reproduction resolution defect.

Figure 11:
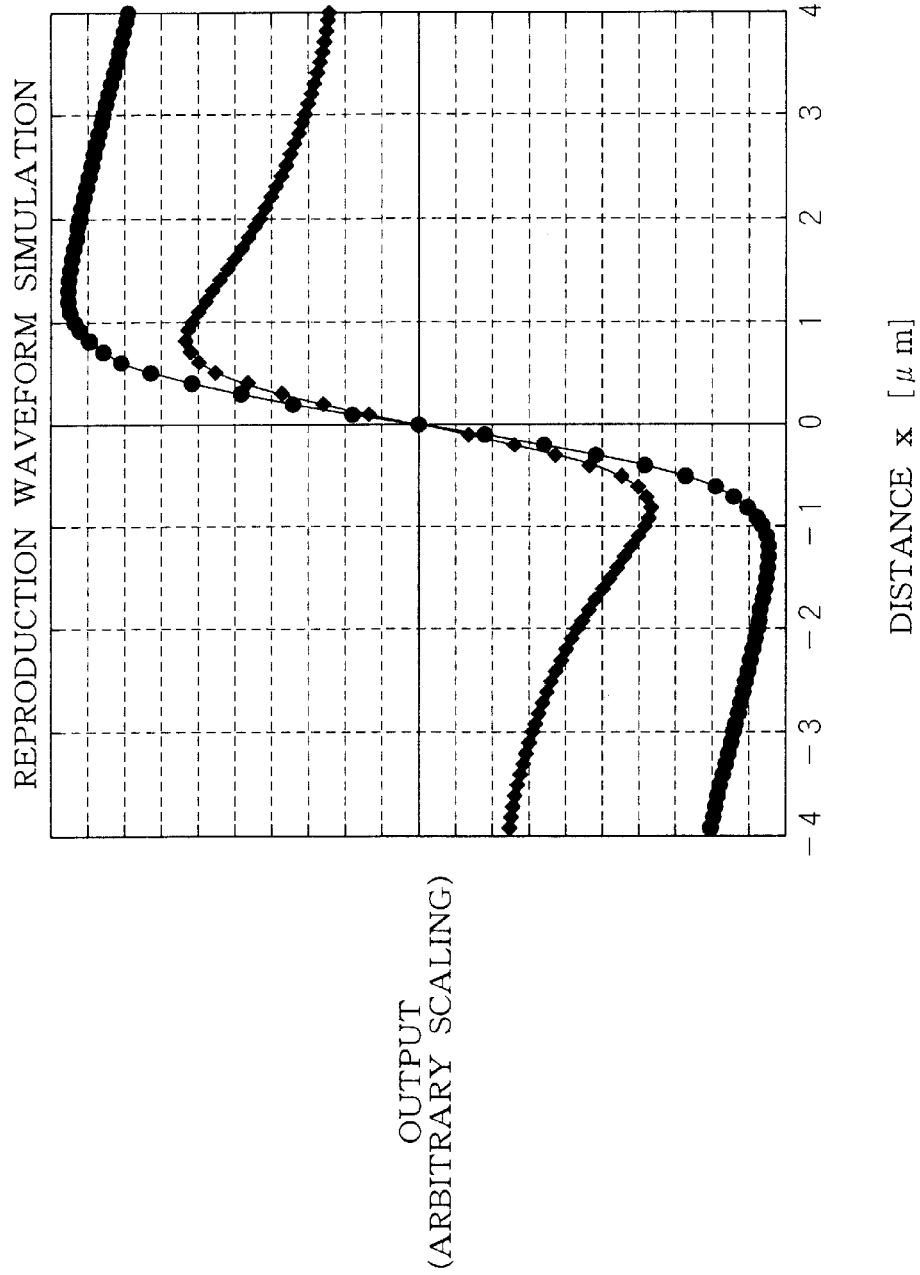
FIG. 11 is a graph showing a reproduction response simulation result in Example 3 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 11. An experiment on recording and reproduction was performed using the apparatuses of the present invention CC3 and CC4 constructed according to this expectation. The output dependence on the recording density is shown in FIG. 9. As is clear from this figure, when using the apparatuses of the present invention CC3 and CC4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.1 micrometers or below. Furthermore, a similar effect can be obtained when the third element Ho of the perpendicular magnetization film is replaced by Tb, Dy, Er, or Tm.

Thus, by using the apparatuses of the present invention CC3 and CC4, it is possible to realize an information storage based on the double layered perpendicular magnetic recording method of a super high recording density enabling reproduction at a super high recording density.

EXAMPLE 4

A perpendicular magnetic recording medium was prepared in the same way as Example 1 except for that the FeSiAl target was replaced by a CoNiFeTi target, and the $Co_{77}Cr_{19}Tb_4$ (at %) target was replaced by $Co_{77}Cr_{19}Er_4$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied in a range from 15 to 25 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention DD3, and an identical apparatus using the inductive MR composite head instead of the single pole type MR composite head will be referred to as an apparatus of the present invention DD4. Moreover, apparatuses produced in the same way as DD3 and DD4 except for that the magnetic spacing is 23 nm will be referred to as comparative apparatuses DD1 and DD2, respectively.

Figure 12:
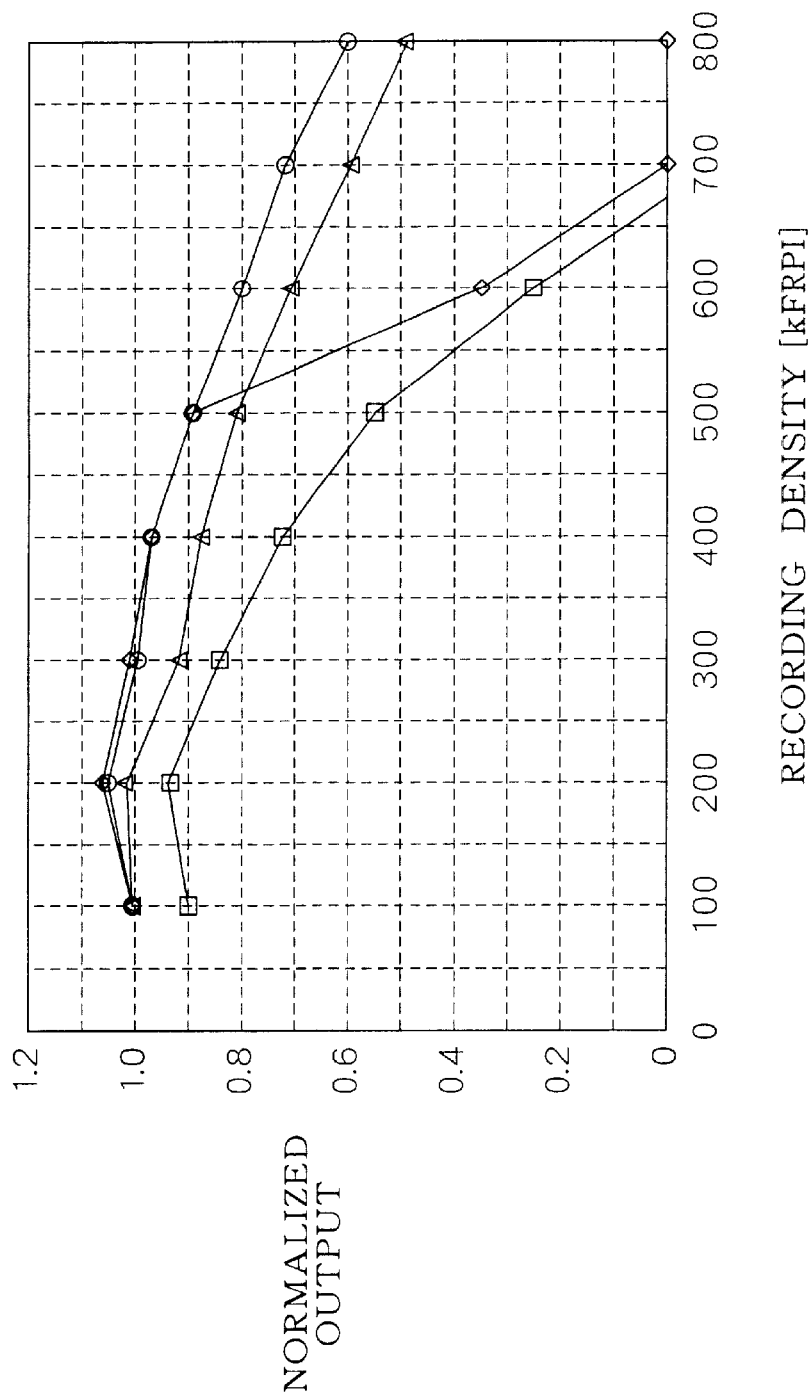
FIG. 12 is a graph showing output dependency on the recording density in Example 4 of the present invention.

An experiment on recording/reproduction was performed using the comparative apparatuses DD1 and DD2. FIG. 12 shows output dependency on the recording density. As can be seen from this figure, it is possible to obtain a reasonable reproduction output up to the recording density of 500 kFRPI but after the 500 kFRPI the reproduction output is abruptly decreased. FIG. 13 and [2] show recording magnetization patterns of recording states obtained at the recording density 600 kFRPI by the comparative apparatuses DD1 and DD2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses DD1 and DD2 are not caused by a recording state defect but by a reproduction resolution defect.

Figure 14:
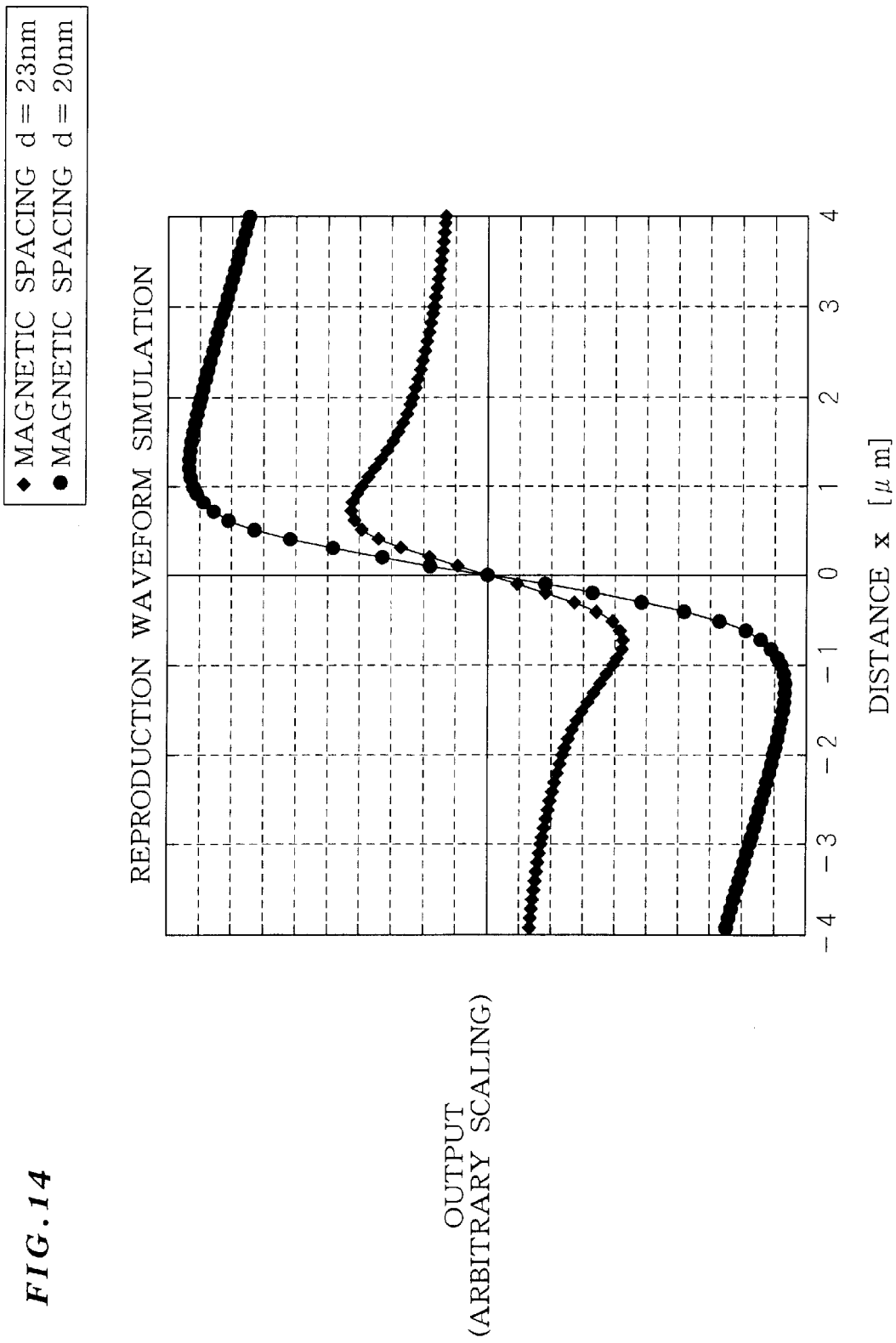
FIG. 14 is a graph showing a reproduction response simulation result in Example 4 of the present invention.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 14. An experiment on recording and reproduction was performed using the apparatuses of the present invention DD3 and DD4 constructed according to this expectation. The output dependence on the recording density is shown in FIG. 12. As is clear from this figure, when using the apparatuses of the present invention DD3 and DD4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved. Accordingly, a similar effect can be obtained when the magnetic spacing is 20 nm or below. Furthermore, a similar effect can be obtained when the third element Er of the perpendicular magnetization film is replaced by Tb, Dy, Ho, or Tm.

Thus, by using the apparatuses of the present invention DD3 and DD4, it is possible to realize an information storage based on the double layered perpendicular magnetic recording method of a super high recording density enabling reproduction at a super high recording density.

EXAMPLE 5

A perpendicular magnetic recording medium was prepared in the same way as Example 1 except for that the FeSiAl target was replaced by a CoZrTa target, and the $Co_{77}Cr_{19}Tb_4$ (at %) target was replaced by $Co_{77}Cr_{19}Tm_4$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the undercoat soft magnetic film was varied in a range from 150 to 250 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention EE3, and an identical apparatus using the inductive MR composite head instead of the single pole type MR composite head will be referred to as an apparatus of the present invention EE4. Moreover, apparatuses produced in the same way as EE3 and EE4 except for that the undercoat soft magnetic film is 250 nm will be referred to as comparative apparatuses EE1 and EE2, respectively.

Figure 15:
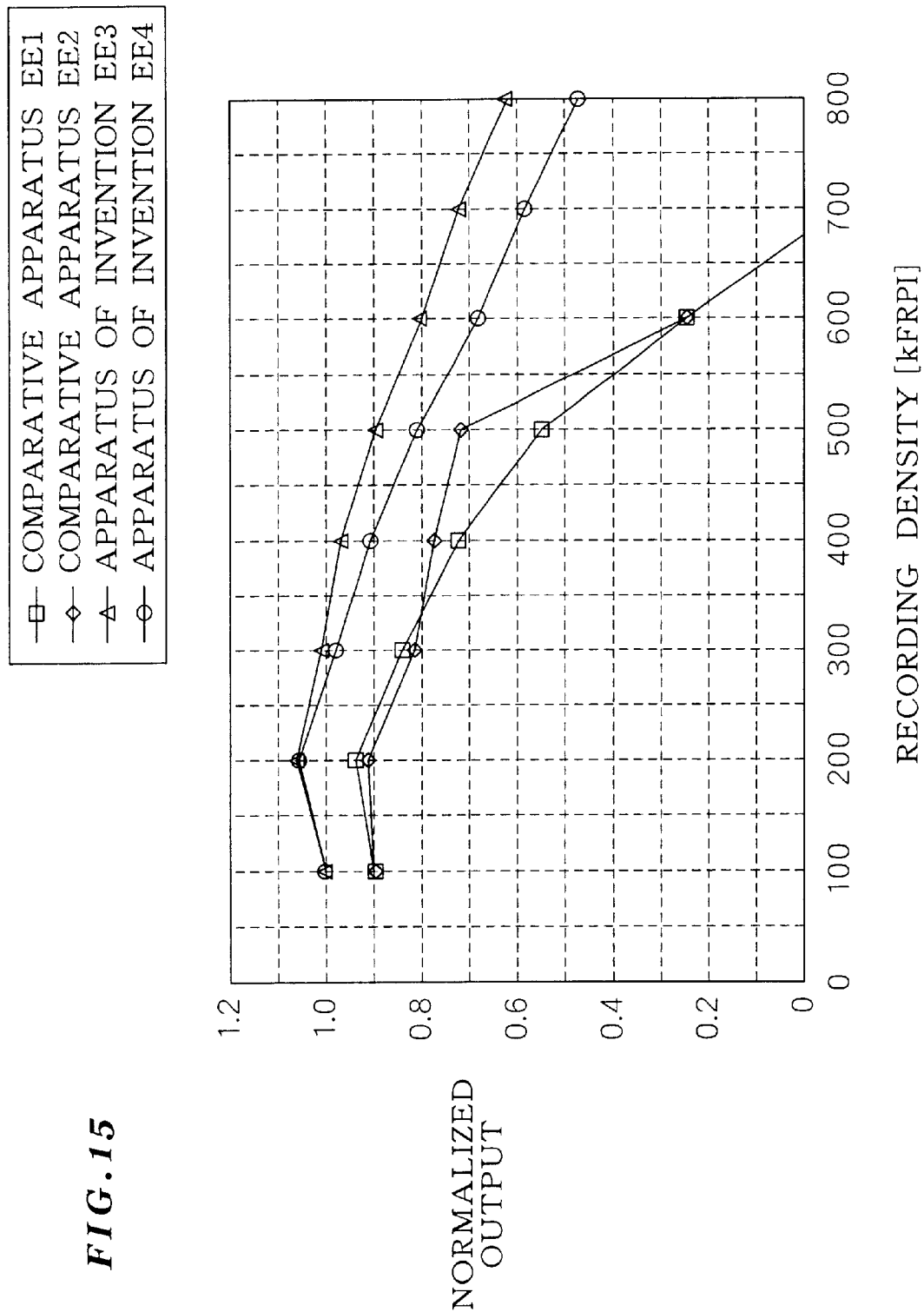
FIG. 15 is a graph showing output dependency on the recording density in Example 5 of the present invention.

An experiment on recording/reproduction was performed using the comparative apparatuses EE1 and EE2. FIG. 15 shows output dependency on the recording density. As can be seen from this figure, it is possible to obtain a reasonable reproduction output up to the recording density of 500 kFRPI but after the 500 kFRPI the reproduction output is abruptly decreased. FIG. 16 and [2] show recording magnetization patterns of recording states obtained at the recording density 600 kFRPI by the comparative apparatuses EE1 and EE2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses EE1 and EE2 are not caused by a recording state defect but by a reproduction resolution defect.

Figure 17:
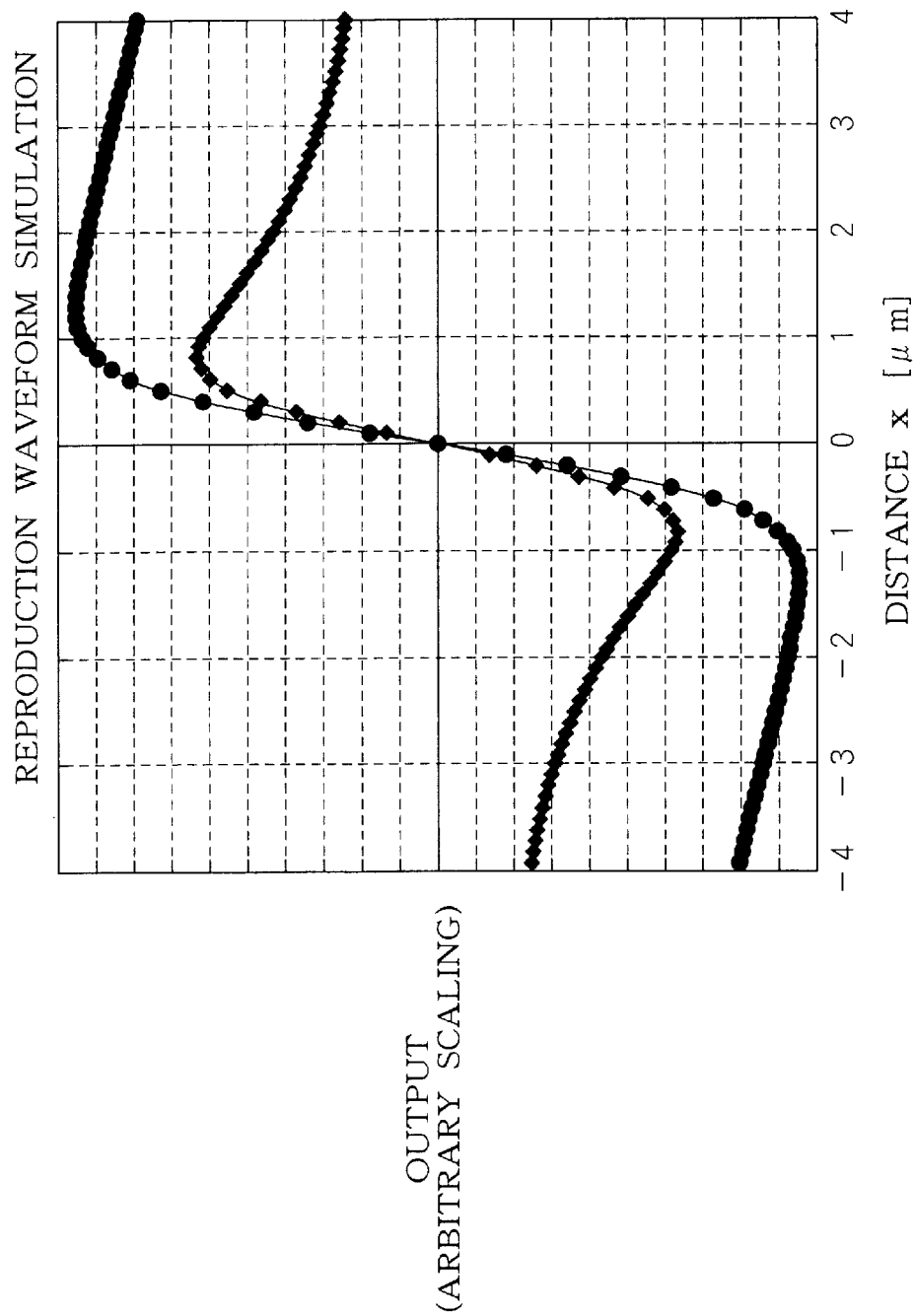
FIG. 17 is a graph showing a reproduction response simulation result in Example 5 of the present invention.

By simulation of the reproduction response of the double layered perpendicular magnetic recording medium, it has been expected that it is possible to improve the reproduction resolution by reducing the undercoat soft magnetic film thickness by about 10% for the reproduction specifications of the comparative apparatuses. This is shown in FIG. 17. An experiment on recording and reproduction was performed using the apparatuses of the present invention EE3 and EE4 constructed according to this expectation. The output dependence on the recording density is shown in FIG. 15. As is clear from this figure, when using the apparatuses of the present invention EE3 and EE4, it is possible to obtain a sufficient reproduction output even when the recording density exceeds 500 kFRPI. This is because in the apparatuses of the present invention, the undercoat soft magnetic film is smaller than that of the comparative apparatuses and the reproduction resolution is improved. Accordingly, a similar effect can be obtained when the undercoat soft magnetic film thickness is 200 nm or below. Furthermore, a similar effect can be obtained when the third element Tm of the perpendicular magnetization film is replaced by Tb, Dy, Ho, or Er.

Thus, by using the apparatuses of the present invention EE3 and EE4, it is possible to realize an information storage based on the double layered perpendicular magnetic recording method of a super high recording density enabling reproduction at a super high recording density.

EXAMPLE 6

A perpendicular magnetic recording medium was prepared in the same way as Example 1 except for that the FeSiAl target was replaced by a CoZrNb target, and the $Co_{77}Cr_{19}Tb_4$ (at %) target was replaced by $Co_{77}Cr_{19}Tm_4$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the perpendicular magnetization film thickness was varied in a range from 30 to 70 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention FF3, and an identical apparatus using the inductive MR composite head instead of the single pole type MR composite head will be referred to as an apparatus of the present invention FF4. Moreover, apparatuses produced in the same way as FF3 and FF4 except for that the perpendicular magnetization film is 60 nm will be referred to as comparative apparatuses FF1 and FF2, respectively.

Figure 18:
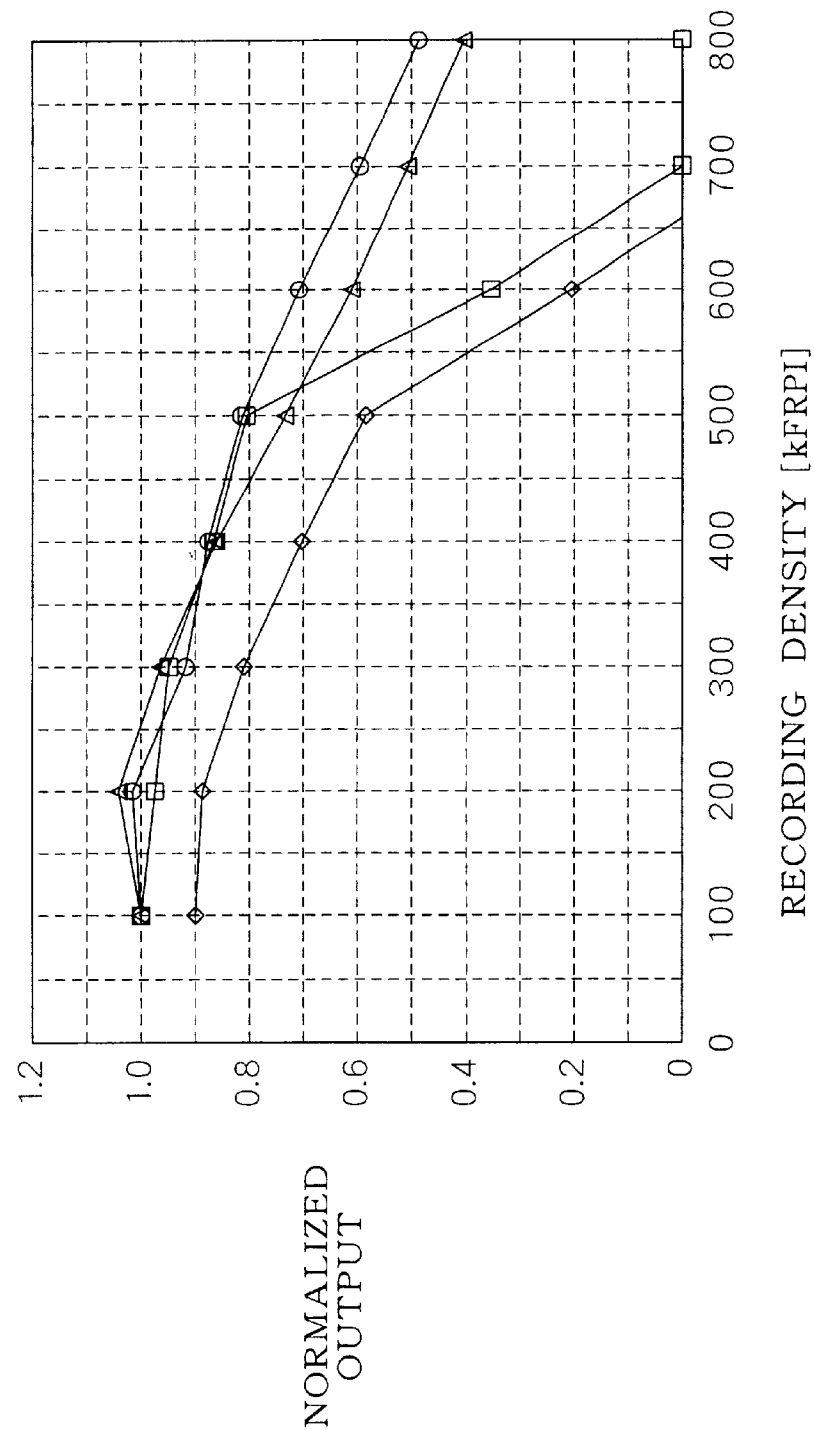
FIG. 18 is a graph showing output dependency on the recording density in Example 6 of the present invention.

An experiment on recording/reproduction was performed using the comparative apparatuses FF1 and FF2. FIG. 18 shows output dependency on the recording density. As can be seen from this figure, it is possible to obtain a reasonable reproduction output up to the recording density of 500 kFRPI but after the 500 kFRPI the reproduction output is abruptly decreased. FIG. 19 and [2] show recording magnetization patterns of recording states obtained at the recording density 600 kFRPI by the comparative apparatuses FF1 and FF2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses FF1 and FF2 are not caused by a recording state defect but by a reproduction resolution defect.

Figure 20:
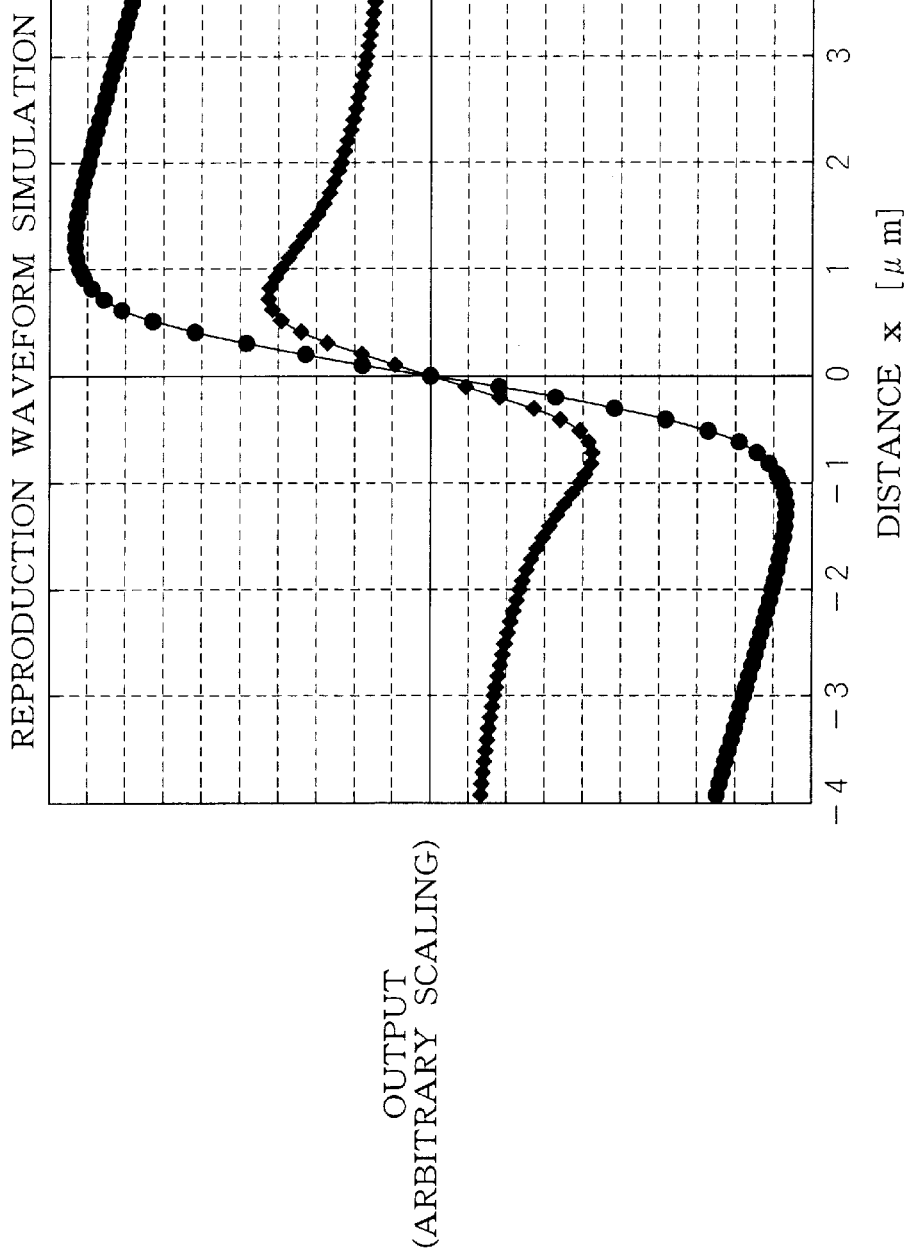
FIG. 20 is a graph showing a reproduction response simulation result in Example 6 of the present invention.

By simulation of the reproduction response of the double layered perpendicular magnetic recording medium, it has been expected that it is possible to improve the reproduction resolution by reducing the perpendicular magnetization film thickness by about 10% for the reproduction specifications of the comparative apparatuses. This is shown in FIG. 20. An experiment on recording and reproduction was performed using the apparatuses of the present invention FF3 and FF4 constructed according to this expectation. The output dependence on the recording density is shown in FIG. 18. As is clear from this figure, when using the apparatuses of the present invention FF3 and FF4, it is possible to obtain a sufficient reproduction output even when the recording density exceeds 500 kFRPI. This is because in the apparatuses of the present invention, the perpendicular magnetization film is smaller than that of the comparative apparatuses and the reproduction resolution is improved. Accordingly, a similar effect can be obtained when the perpendicular magnetization film thickness is 50 nm or below. Furthermore, a similar effect can be obtained when the third element Tm of the perpendicular magnetization film is replaced by Tb, Dy, Ho, or Er.

Thus, by using the apparatuses of the present invention FF3 and FF4, it is possible to realize an information storage based on the double layered perpendicular magnetic recording method of a super high recording density enabling reproduction at a super high recording density.

EXAMPLE 7

A perpendicular magnetic recording medium was prepared in the same way as Example 1 except for that the $Co_{77}Cr_{19}Tb_4$ (at %) target was replaced by $Fe_{50}Pt_{50}$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied in a range from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention GG3, and an identical apparatus using the inductive MR composite head instead of the single pole type MR composite head will be referred to as an apparatus of the present invention GG4. Moreover, apparatuses produced in the same way as GG3 and GG4 except for that the reproduction gap length is 0.12 micrometers will be referred to as comparative apparatuses GG1 and GG2, respectively.

Figure 21:
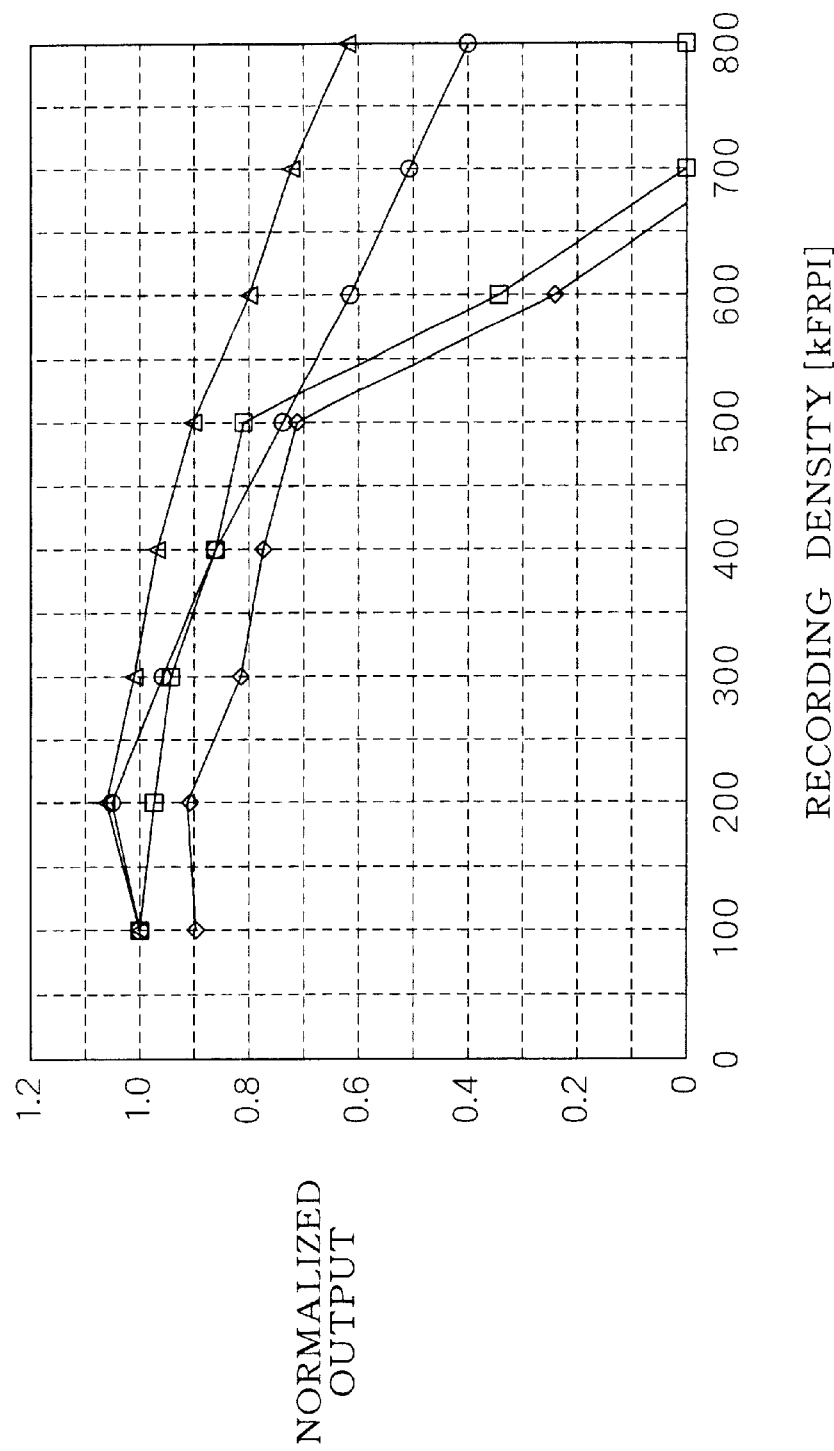
FIG. 21 is a graph showing output dependency on the recording density in Example 7 of the present invention.

An experiment on recording/reproduction was performed using the comparative apparatuses GG1 and GG2. FIG. 21 shows output dependency on the recording density. As can be seen from this figure, it is possible to obtain a reasonable reproduction output up to the recording density of 500 kFRPI but after the 500 kFRPI the reproduction output is abruptly decreased.

FIG. 22 and [2] show recording magnetization patterns of recording states obtained at the recording density 600 kFRPI by the comparative apparatuses GG1 and GG2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses GG1 and GG2 are not caused by a recording state defect but by a reproduction resolution defect.

Figure 23:
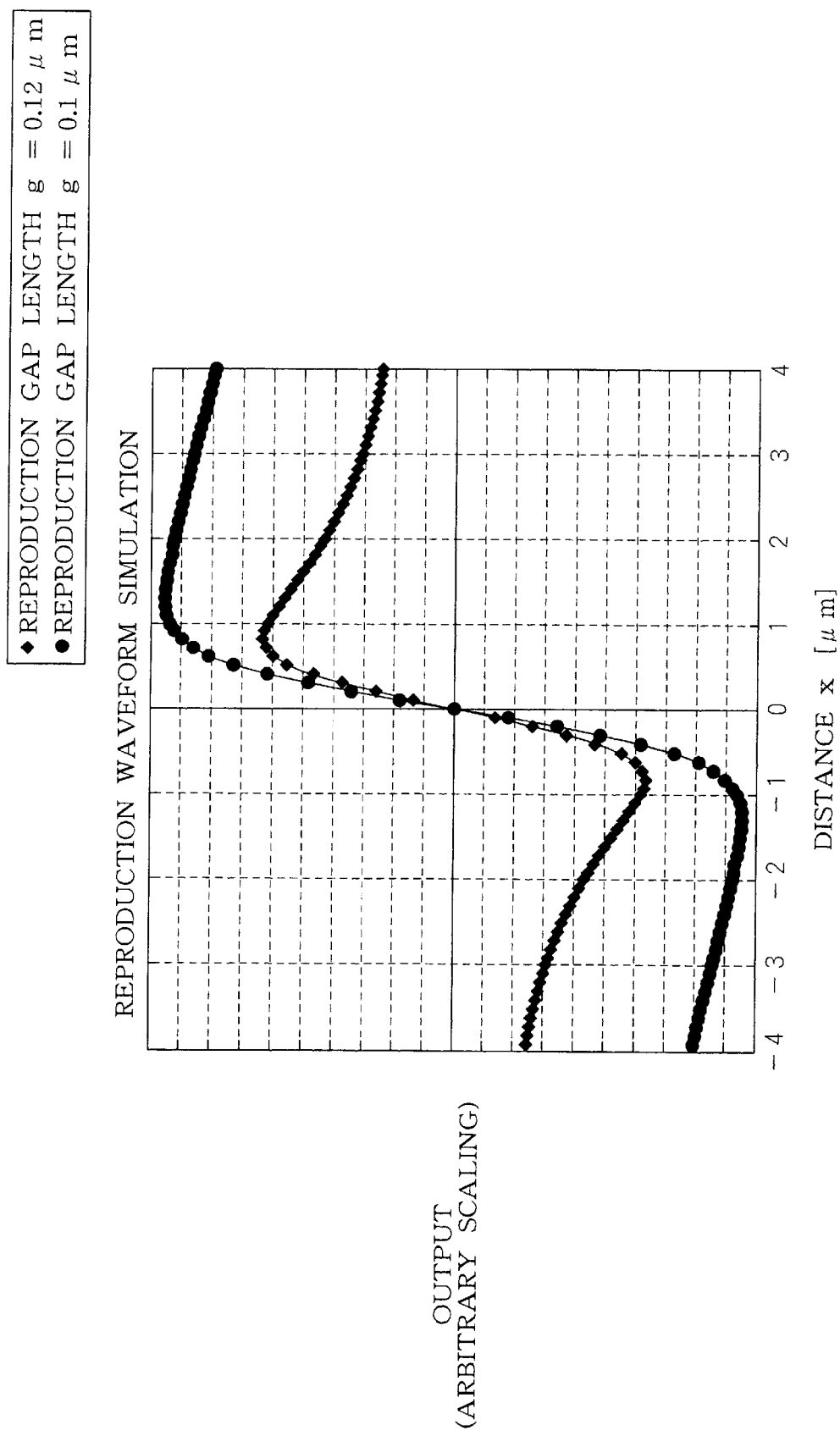
FIG. 23 is a graph showing a reproduction response simulation result in Example 7 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 23. An experiment on recording and reproduction was performed using the apparatuses of the present invention GG3 and GG4 constructed according to this expectation. The output dependence on the recording density is shown in FIG. 21. As is clear from this figure, when using the apparatuses of the present invention GG3 and GG4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.1 micrometers or below.

Thus, by using the apparatuses of the present invention GG3 and GG4, it is possible to realize an information storage based on the double layered perpendicular magnetic recording method of a super high recording density enabling reproduction at a super high recording density.

EXAMPLE 8

A perpendicular magnetic recording medium was prepared in the same way as Example 7 except for that the FeSiAl target was replaced by a FeSiAlTi target and the $Fe_{50}Pt_{50}$ (at %) target was replaced by a $Fe_{50}Pt_{40}Ta_{10}$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied in a range from 15 to 25 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention HH3, and an identical apparatus using the inductive MR composite head instead of the single pole type MR composite head will be referred to as an apparatus of the present invention HH4. Moreover, apparatuses produced in the same way as HH3 and HH4 except for that the magnetic spacing is 23 nm will be referred to as comparative apparatuses HH1 and HH2, respectively.

Figure 24:
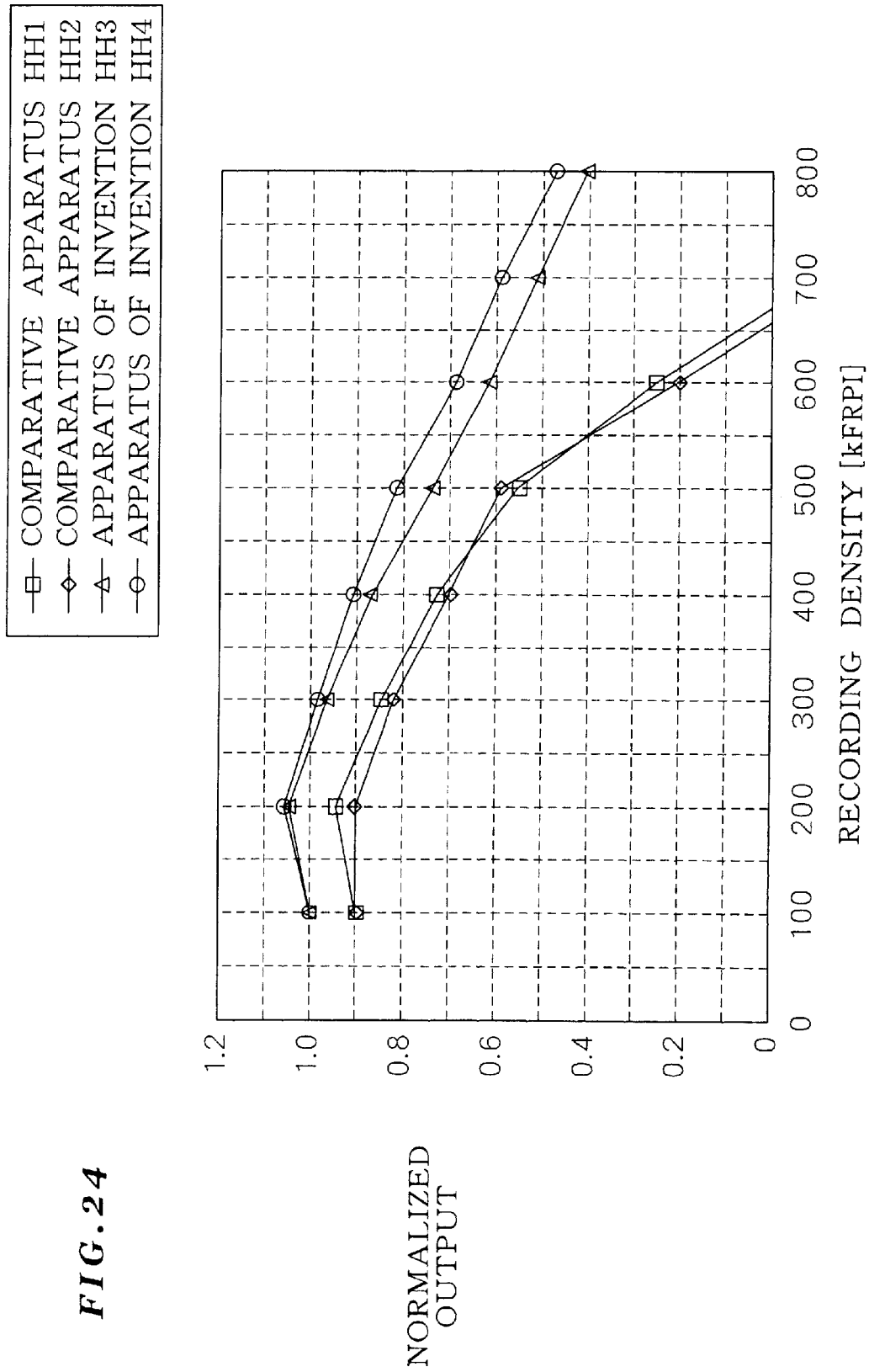
FIG. 24 is a graph showing output dependency on the recording density in Example 8 of the present invention.

An experiment on recording/reproduction was performed using the comparative apparatuses HH1 and HH2. FIG. 24 shows output dependency on the recording density. As can be seen from this figure, it is possible to obtain a reasonable reproduction output up to the recording density of 500 kFRPI but after the 500 kFRPI the reproduction output is abruptly decreased. FIG. 25 and [2] show recording magnetization patterns of recording states obtained at the recording density 600 kFRPI by the comparative apparatuses HH1 and HH2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses HH1 and HH2 are not caused by a recording state defect but by a reproduction resolution defect.

Figure 26:
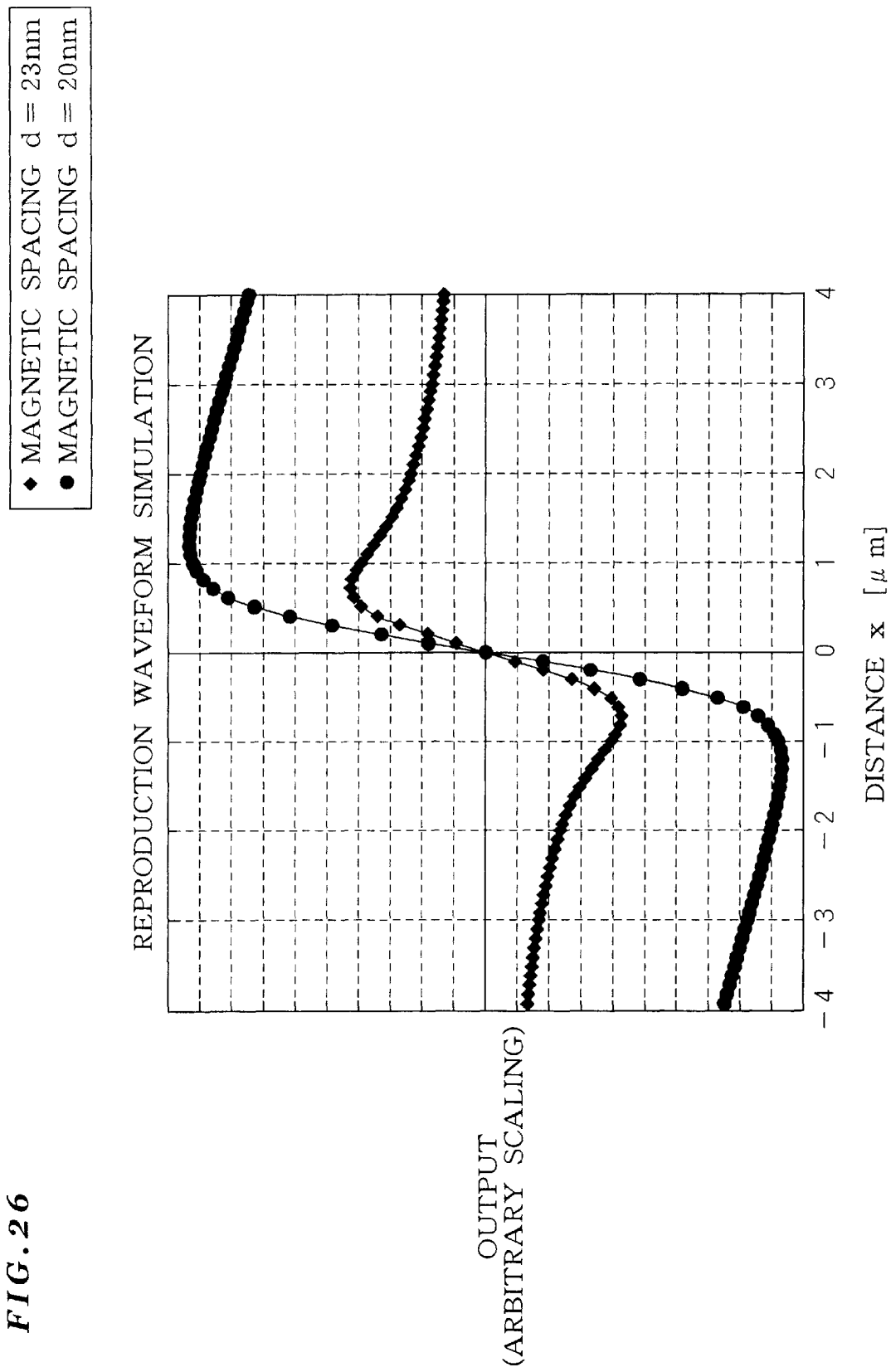
FIG. 26 is a graph showing a reproduction response simulation result in Example 8 of the present invention.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 26. An experiment on recording and reproduction was performed using the apparatuses of the present invention HH3 and HH4 constructed according to this expectation. The output dependence on the recording density is shown in FIG. 24. As is clear from this figure, when using the apparatuses of the present invention HH3 and HH4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved. Accordingly, a similar effect can be obtained when the magnetic spacing is 20 nm or below.

Thus, by using the apparatuses of the present invention HH3 and HH4, it is possible to realize an information storage based on the double layered perpendicular magnetic recording method of a super high recording density enabling reproduction at a super high recording density.

EXAMPLE 9

A perpendicular magnetic recording medium was prepared in the same way as Example 7 except for that the FeSiAl target was replaced by a CoNiFe target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied in a range from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention JJ3, and an identical apparatus using the inductive MR composite head instead of the single pole type MR composite head will be referred to as an apparatus of the present invention JJ4. Moreover, apparatuses produced in the same way as JJ3 and JJ4 except for that the reproduction gap length is 0.12 micrometers will be referred to as comparative apparatuses JJ1 and JJ2, respectively.

Figure 27:
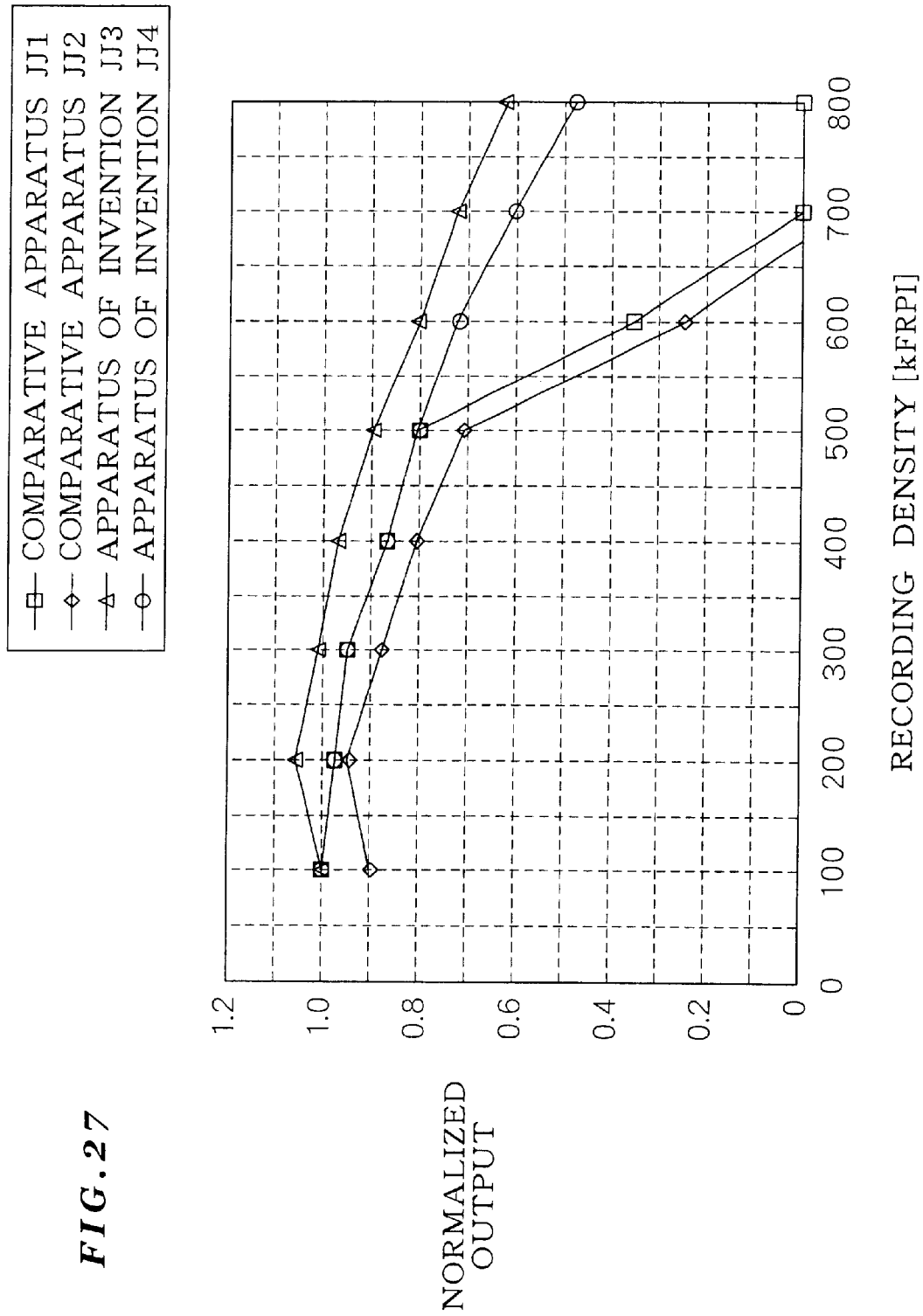
FIG. 27 is a graph showing output dependency on the recording density in Example 9 of the present invention.

An experiment on recording/reproduction was performed using the comparative apparatuses JJ1 and JJ2. FIG. 27 shows output dependency on the recording density. As can be seen from this figure, it is possible to obtain a reasonable reproduction output up to the recording density of 500 kFRPI but after the 500 kFRPI the reproduction output is abruptly decreased. FIG. 28 and [2] show recording magnetization patterns of recording states obtained at the recording density 600 kFRPI by the comparative apparatuses JJ1 and JJ2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses JJ1 and JJ2 are not caused by a recording state defect but by a reproduction resolution defect.

Figure 29:
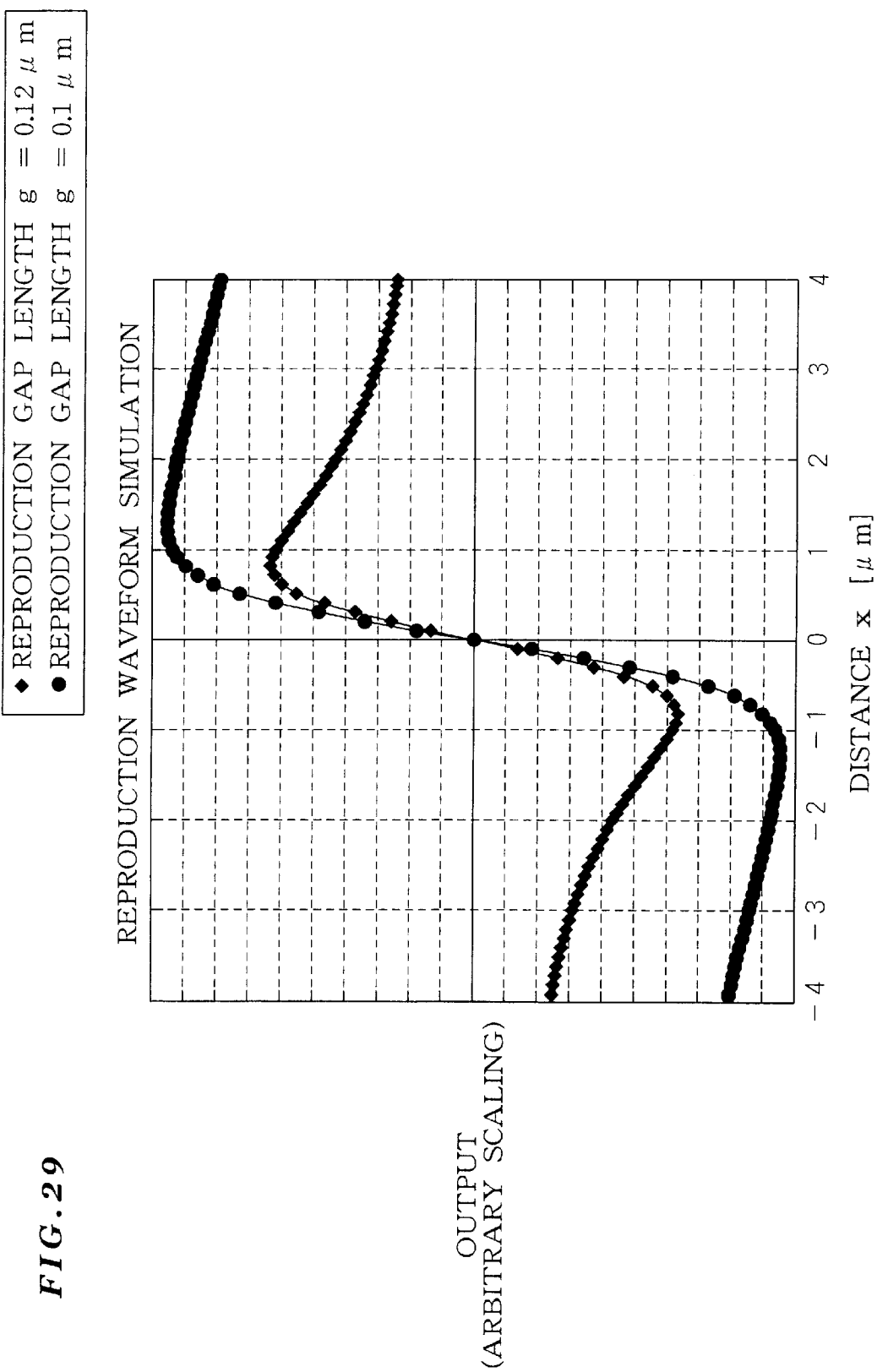
FIG. 29 is a graph showing a reproduction response simulation result in Example 9 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 29. An experiment on recording and reproduction was performed using the apparatuses of the present invention JJ3 and JJ4 constructed according to this expectation. The output dependence on the recording density is shown in FIG. 27. As is clear from this figure, when using the apparatuses of the present invention JJ3 and JJ4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.10 micrometers or below.

Thus, by using the apparatuses of the present invention JJ3 and JJ4, it is possible to realize an information storage based on the double layered perpendicular magnetic recording method of a super high recording density enabling reproduction at a super high recording density.

EXAMPLE 10

A perpendicular magnetic recording medium was prepared in the same way as Example 7 except for that the FeSiAl target was replaced by a CoNiFeTi target and the $Fe_{50}Pt_{50}$ (at %) target was replaced by a $Fe_{50}Pt_{40}Ta_{10}$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied in a range from 15 to 25 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention KK3, and an identical apparatus using the inductive MR composite head instead of the single pole type MR composite head will be referred to as an apparatus of the present invention KK4. Moreover, apparatuses produced in the same way as KK3 and KK4 except for that the magnetic spacing is 23 nm will be referred to as comparative apparatuses KK1 and KK2, respectively.

Figure 30:
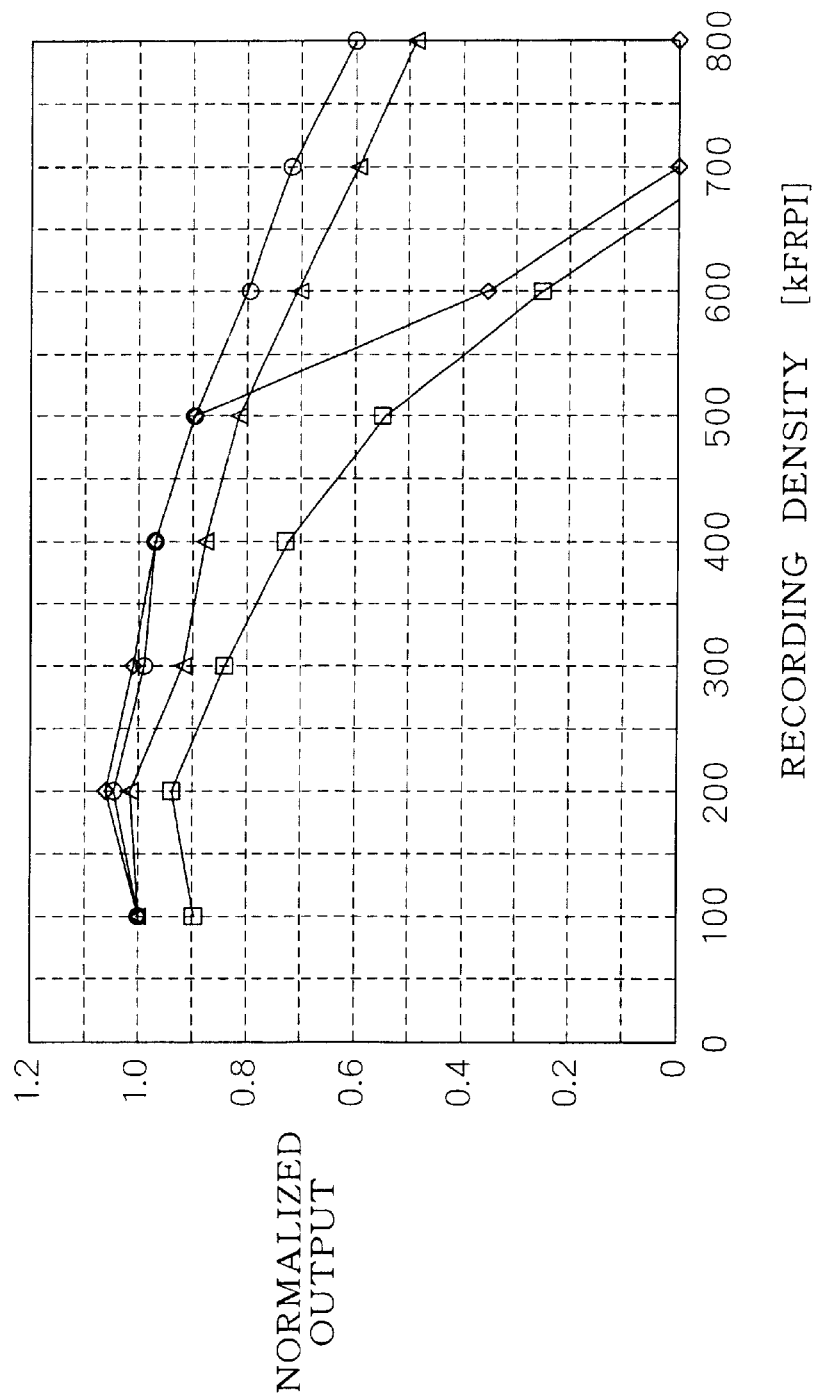
FIG. 30 is a graph showing output dependency on the recording density in Example 10 of the present invention.

An experiment on recording/reproduction was performed using the comparative apparatuses KK1 and KK2. FIG. 30 shows output dependency on the recording density. As can be seen from this figure, it is possible to obtain a reasonable reproduction output up to the recording density of 500 kFRPI but after the 500 kFRPI the reproduction output is abruptly decreased. FIG. 31 and [2] show recording magnetization patterns of recording states obtained at the recording density 600 kFRPI by the comparative apparatuses KK1 and KK2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses KK1 and KK2 are not caused by a recording state defect but by a reproduction resolution defect.

Figure 32:
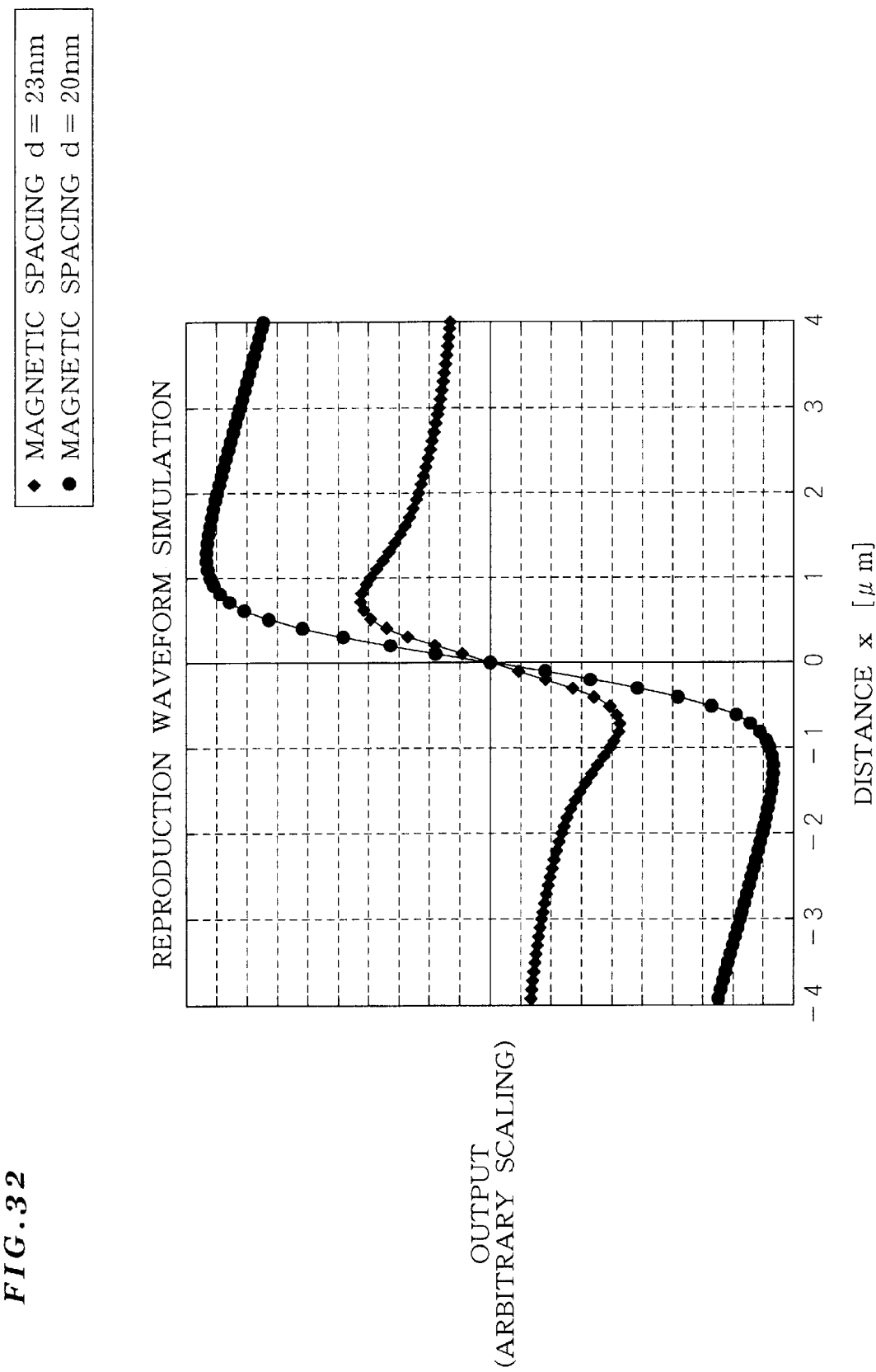
FIG. 32 is a graph showing a reproduction response simulation result in Example 10 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 32. An experiment on recording and reproduction was performed using the apparatuses of the present invention KK3 and KK4 constructed according to this expectation. The output dependence on the recording density is shown in FIG. 30. As is clear from this figure, when using the apparatuses of the present invention KK3 and KK4, it is possible to obtain a sufficient reproduction output even when the recording density exceeds 500 kFRPI. This is because in the apparatuses of the present invention, the magnetic spaciang is smaller than that of the comparative apparatuses and the reproduction resolution is improved. Accordingly, a similar effect can be obtained when the magnetic spacing is 20 nm or below.

Thus, by using the apparatuses of the present invention KK3 and KK4, it is possible to realize an information storage based on the double layered perpendicular magnetic recording method of a super high recording density enabling reproduction at a super high recording density.

EXAMPLE 11

A perpendicular magnetic recording medium was prepared in the same way as Example 7 except for that the FeSiAl target was replaced by a CoZrTa target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the thickness of the undercoat soft magnetic film of the perpendicular magnetic recording medium was varied in a range from 150 to 250 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention LL3, and an identical apparatus using the inductive MR composite head instead of the single pole type MR composite head will be referred to as an apparatus of the present invention LL4. Moreover, apparatuses produced in the same way as LL3 and LL4 except for that the undercoat soft magnetic film is 250 nm will be referred to as comparative apparatuses LL1 and LL2, respectively.

Figure 33:
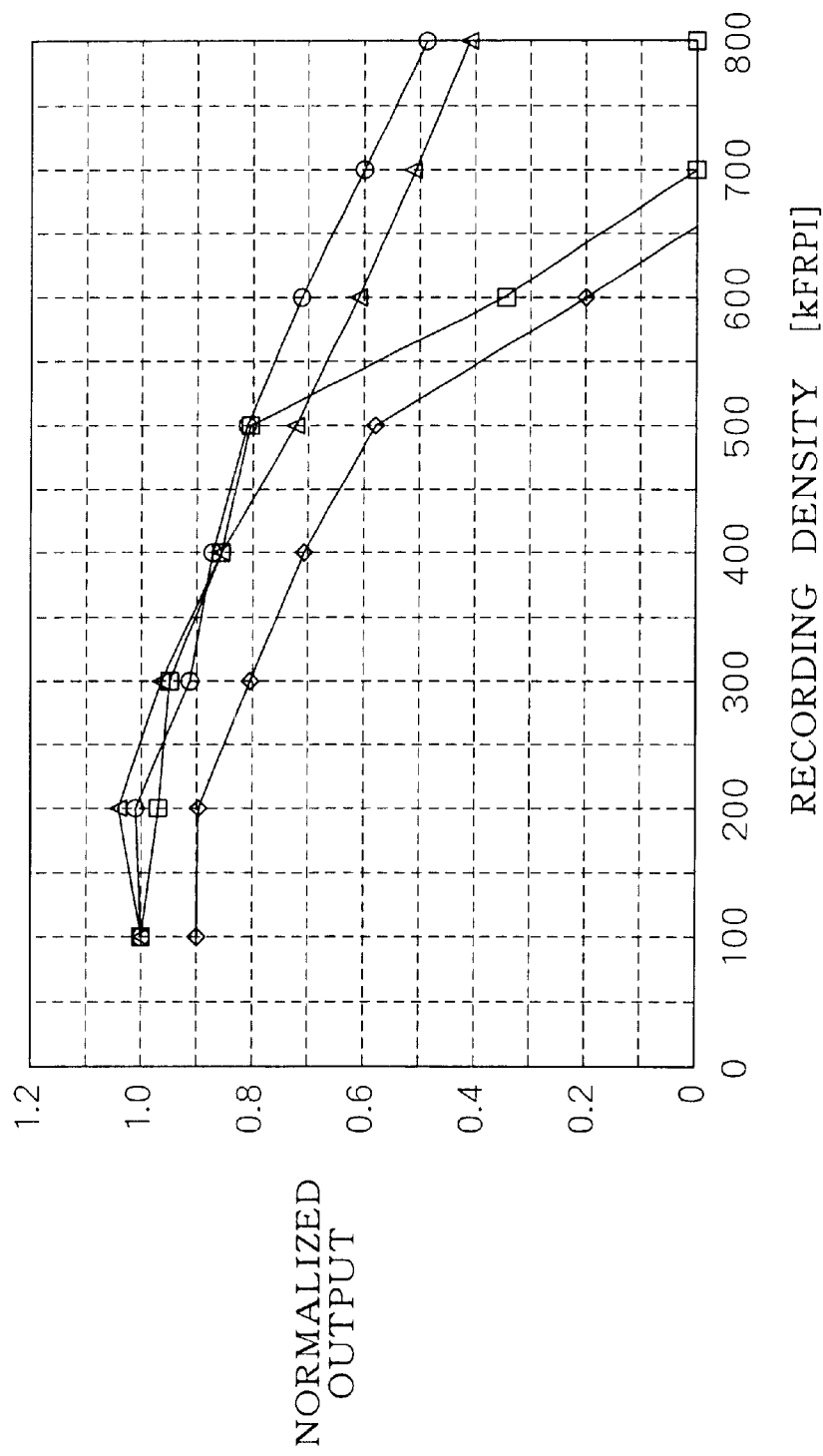
FIG. 33 is a graph showing output dependency on the recording density in Example 11 of the present invention.

An experiment on recording/reproduction was performed using the comparative apparatuses LL1 and LL2. FIG. 33 shows output dependency on the recording density. As can be seen from this figure, it is possible to obtain a reasonable reproduction output up to the recording density of 500 kFRPI but after the 500 kFRPI the reproduction output is abruptly decreased. FIG. 34 and [2] show recording magnetization patterns of recording states obtained at the recording density 600 kFRPI by the comparative apparatuses LL1 and LL2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses KK1 and KK2 are not caused by a recording state defect but by a reproduction resolution defect.

Figure 35:
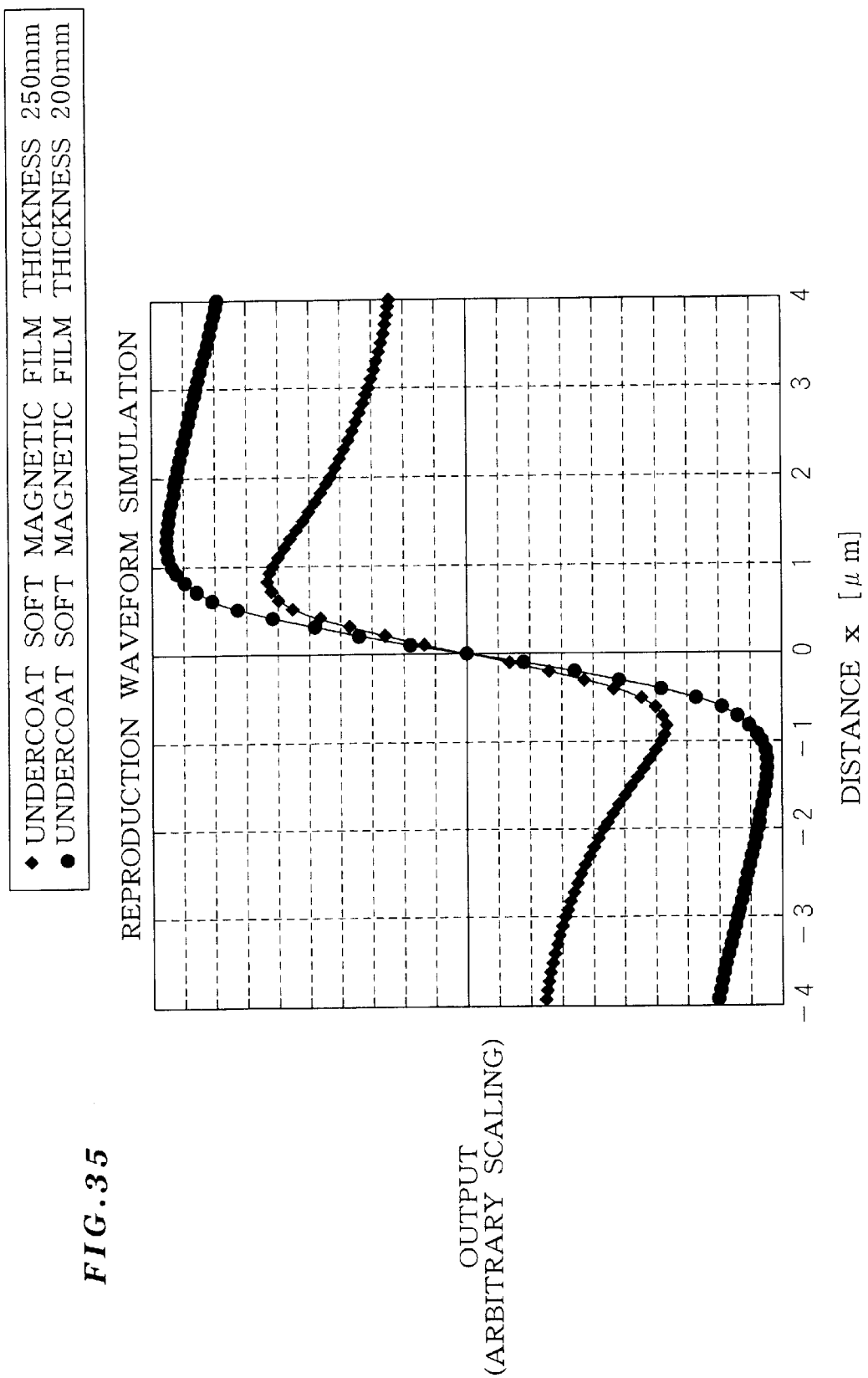
FIG. 35 is a graph showing a reproduction response simulation result in Example 11 of the present invention.

By simulation of the reproduction response of the double layered perpendicular magnetic recording medium, it has been expected that it is possible to improve the reproduction resolution by reducing the undercoat soft magnetic film thickness by about 10% for the reproduction specifications of the comparative apparatuses. This is shown in FIG. 35. An experiment on recording and reproduction was performed using the apparatuses of the present invention LL3 and LL4 constructed according to this expectation. The output dependence on the recording density is shown in FIG. 33. As is clear from this figure, when using the apparatuses of the present invention LL3 and LL4, it is possible to obtain a sufficient reproduction output even when the recording density exceeds 500 kFRPI. This is because in the apparatuses of the present invention, the undercoat soft magnetic film thickness is smaller than that of the comparative apparatuses and the reproduction resolution is improved. Accordingly, a similar effect can be obtained when the undercoat soft magnetic film thickness is 200 nm or below.

Thus, by using the apparatuses of the present invention LL3 and LL4, it is possible to realize an information storage

EXAMPLE 12

A perpendicular magnetic recording medium was prepared in the same way as Example 7 except for that the FeSiAl target was replaced by a CoZrTa target and the $Fe_{50}Pt_{50}$ (at %) target was replaced by a $Fe_{50}Pt_{50}Ta_{10}$ (at %) target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the perpendicular magnetization film thickness was varied in a range from 30 to 70 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention MM3, and an identical apparatus using the inductive MR composite head instead of the single pole type MR composite head will be referred to as an apparatus of the present invention MM4. Moreover, apparatuses produced in the same way as MM3 and MM4 except for that the perpendicular magnetization film thickness is 60 nm will be referred to as comparative apparatuses MM1 and MM2, respectively.

Figure 36:
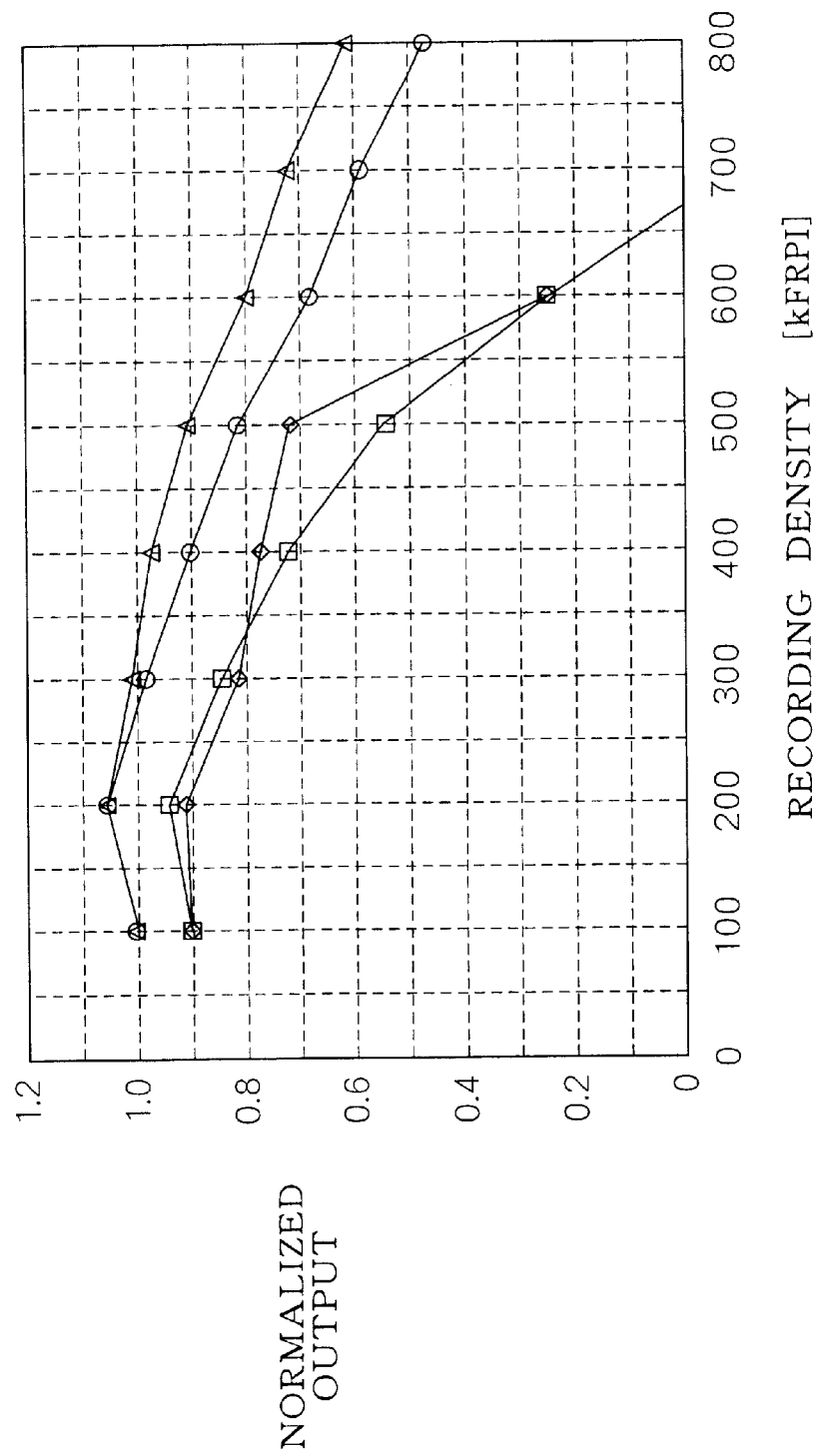
FIG. 36 is a graph showing output dependency on the recording density in Example 12 of the present invention.

An experiment on recording/reproduction was performed using the comparative apparatuses MM1 and MM2. FIG. 36 shows output dependency on the recording density. As can be seen from this figure, it is possible to obtain a reasonable reproduction output up to the recording density of 500 kFRPI but after the 500 kFRPI the reproduction output is abruptly decreased. FIG. 37 and [2] show recording magnetization patterns of recording states obtained at the recording density 600 kFRPI by the comparative apparatuses MM1 and MM2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses KK1 and KK2 are not caused by a recording state defect but by a reproduction resolution defect.

Figure 38:
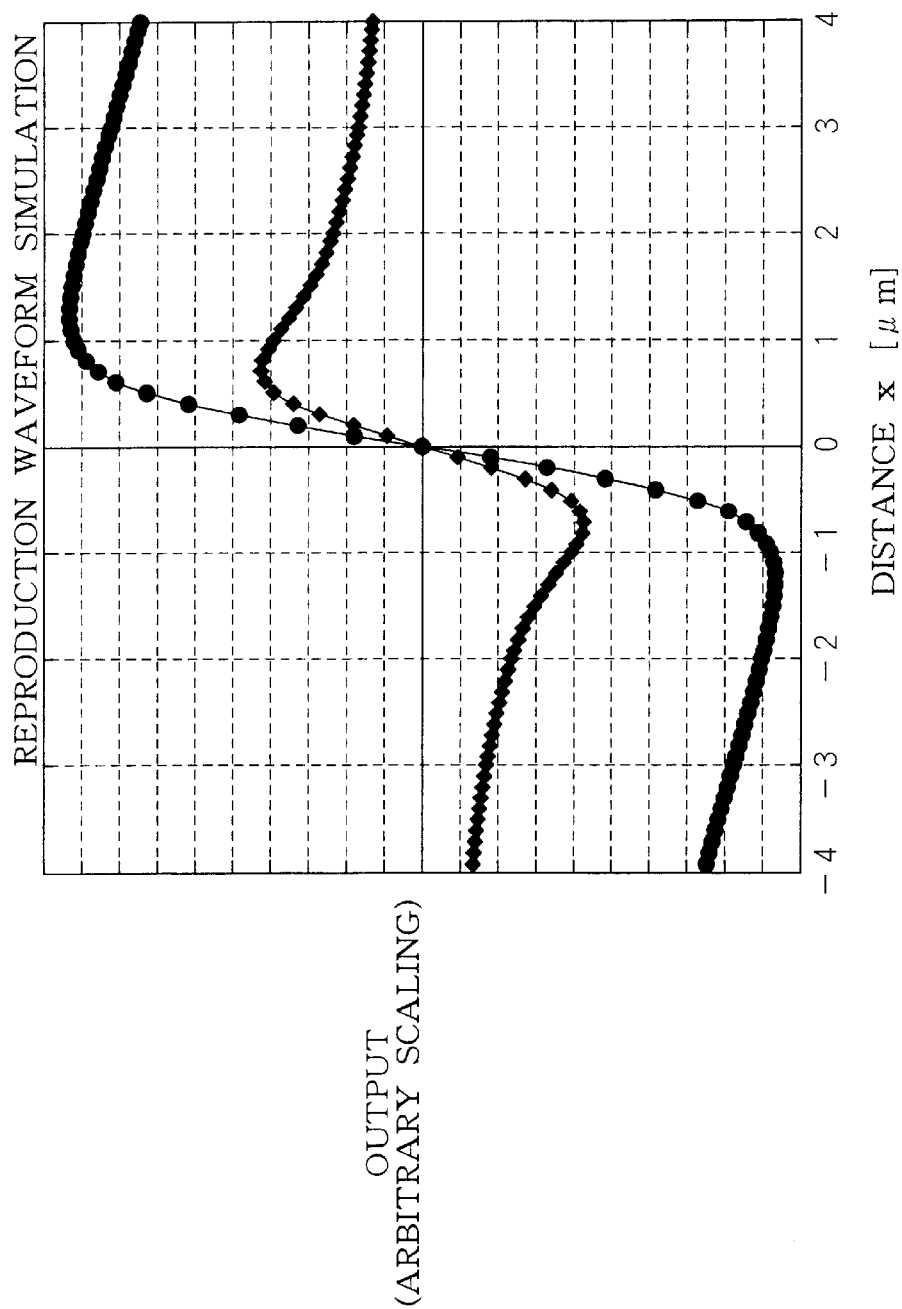
FIG. 38 is a graph showing a reproduction response simulation result in Example 12 of the present invention.

By simulation of the reproduction response of the double layered perpendicular magnetic recording medium, it has been expected that it is possible to improve the reproduction resolution by reducing the perpendicular magnetization film thickness by about 10% for the reproduction specifications of the comparative apparatuses. This is shown in FIG. 38. An experiment on recording and reproduction was performed using the apparatuses of the present invention MM3 and MM4 constructed according to this expectation. The output dependence on the recording density is shown in FIG. 36. As is clear from this figure, when using the apparatuses of the present invention MM3 and MM4, it is possible to obtain a sufficient reproduction output even when the recording density exceeds 500 kFRPI. This is because in the apparatuses of the present invention, the perpendicular magnetization film thickness is smaller than that of the comparative apparatuses and the reproduction resolution is improved. Accordingly, a similar effect can be obtained when the perpendicular magnetization film thickness is 50 nm or below.

Thus, by using the apparatuses of the present invention MM3 and MM4, it is possible to realize an information storage based on the double layered perpendicular magnetic recording method of a super high recording density enabling reproduction at a super high recording density.

EXAMPLE 13

A perpendicular magnetic recording medium was prepared in the same way as Example 1 except for that the $Co_{77}Cr_{19}Tb_4$ (at %) target was replaced by a $YCO_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention NN3, and an identical apparatus using the inductive MR composite head instead of the single pole type MR composite head will be referred to as an apparatus of the present invention NN4. Moreover, apparatuses produced in the same way as NN3 and NN4 except for that the reproduction gap length is 0.12 micrometers will be referred to as comparative apparatuses NN1 and NN2, respectively.

Figure 39:
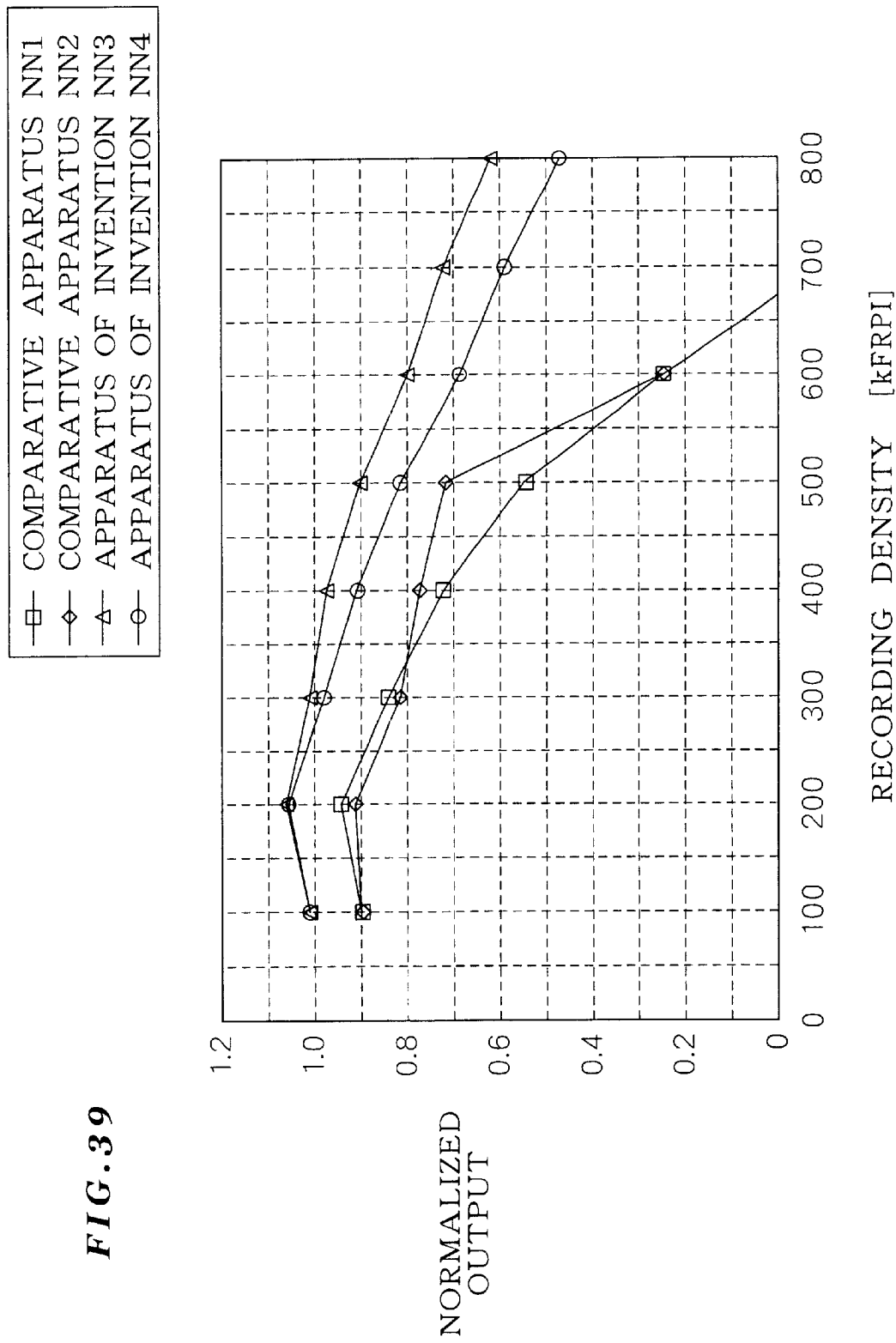
FIG. 39 is a graph showing output dependency on the recording density in Example 13 of the present invention.

An experiment on recording/reproduction was performed using the comparative apparatuses NN1 and NN2. FIG. 39 shows output dependency on the recording density. As can be seen from this figure, it is possible to obtain a reasonable reproduction output up to the recording density of 500 kFRPI but after the 500 kFRPI the reproduction output is abruptly decreased.

FIG. 40 and [2] show recording magnetization patterns of recording states obtained at the recording density 600 kFRPI by the comparative apparatuses NN1 and NN2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses KK1 and KK2 are not caused by a recording state defect but by a reproduction resolution defect.

Figure 41:
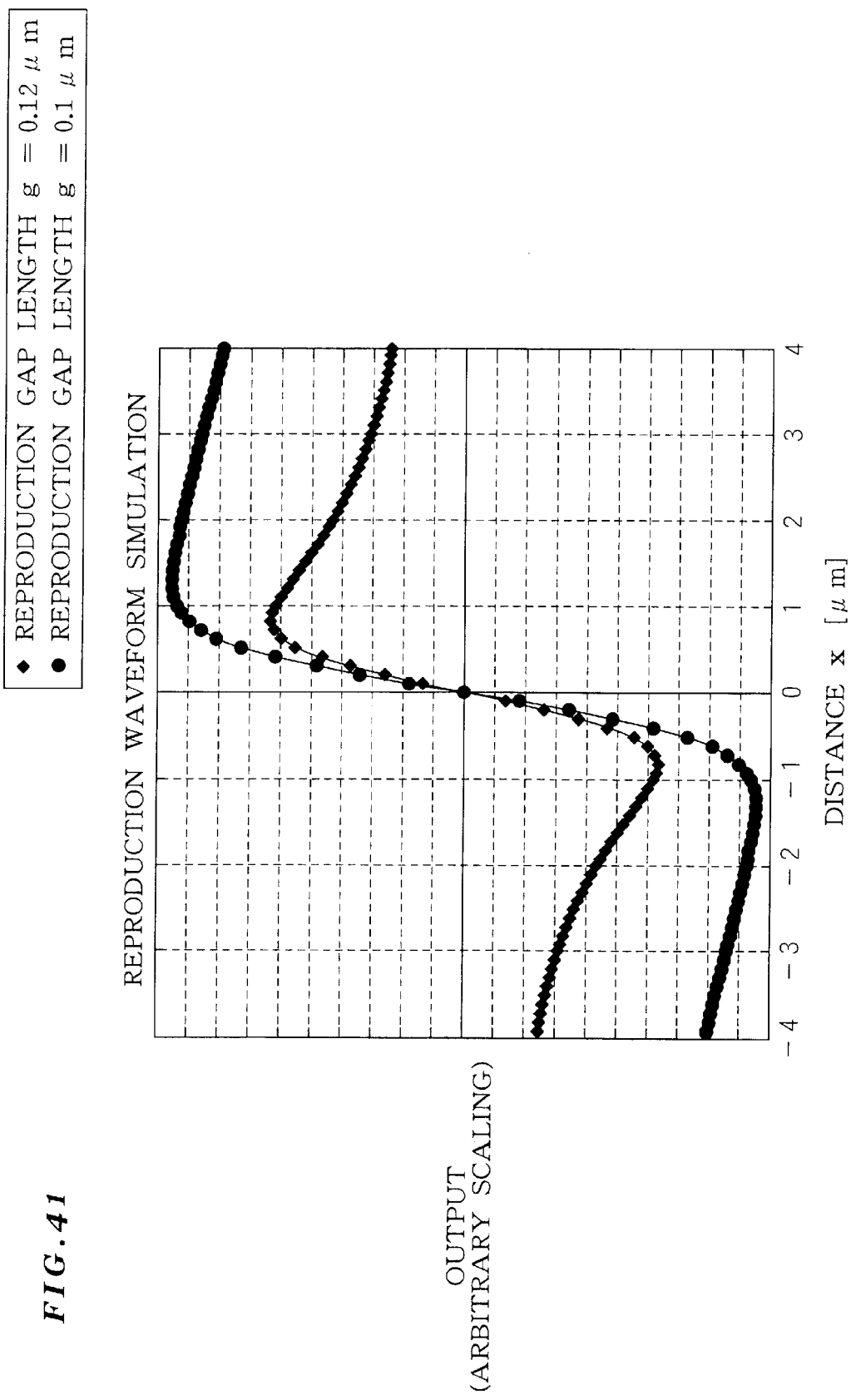
FIG. 41 is a graph showing a reproduction response simulation result in Example 13 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 41. An experiment on recording and reproduction was performed using the apparatuses of the present invention NN3 and NN4 constructed according to this expectation. The output dependence on the recording density is shown in FIG. 39. As is clear from this figure, when using the apparatuses of the present invention NN3 and NN4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.10 micrometers or below. Furthermore, a similar effect can be obtained even when the rare earth element Y of the perpendicular magnetization film is replaced by Ce, Sm, La, or Pr.

Thus, by using the apparatuses of the present invention NN3 and NN4, it is possible to realize an information storage based on the double layered perpendicular magnetic recording method of a super high recording density enabling reproduction at a super high recording density.

EXAMPLE 14

A perpendicular magnetic recording medium was prepared in the same way as Example 1 except for that the FeSiAl target was replaced by a FeSiAlTi target and the $Co_{77}Cr_{19}Tb_4$ (at %) target was replaced by a $CeCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied from 15 to 25 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention PP3, and an identical apparatus using the inductive MR composite head instead of the single pole type MR composite head will be referred to as an apparatus of the present invention PP4. Moreover, apparatuses produced in the same way as PP3 and PP4 except for that the magnetic spacing is 23 nm will be referred to as comparative apparatuses PP1 and PP2, respectively.

Figure 42:
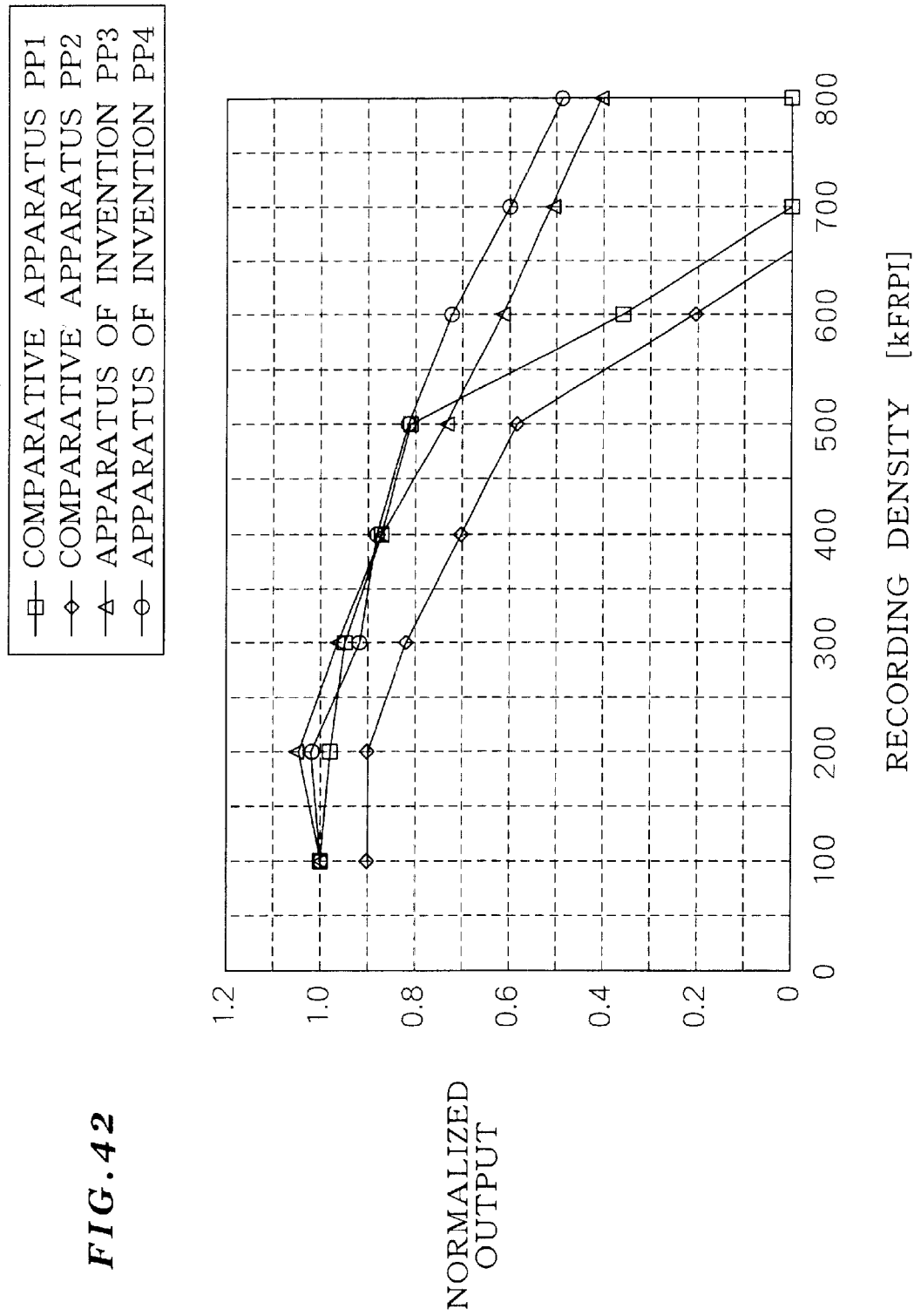
FIG. 42 is a graph showing output dependency on the recording density in Example 14 of the present invention.

An experiment on recording/reproduction was performed using the comparative apparatuses PP1 and PP2. FIG. 42 shows output dependency on the recording density. As can be seen from this figure, it is possible to obtain a reasonable reproduction output up to the recording density of 500 kFRPI but after the 500 kFRPI the reproduction output is abruptly decreased. FIG. 43 and [2] show recording magnetization patterns of recording states obtained at the recording density 600 kFRPI by the comparative apparatuses PP1 and PP2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses PP1 and PP2 are not caused by a recording state defect but by a reproduction resolution defect.

Figure 44:
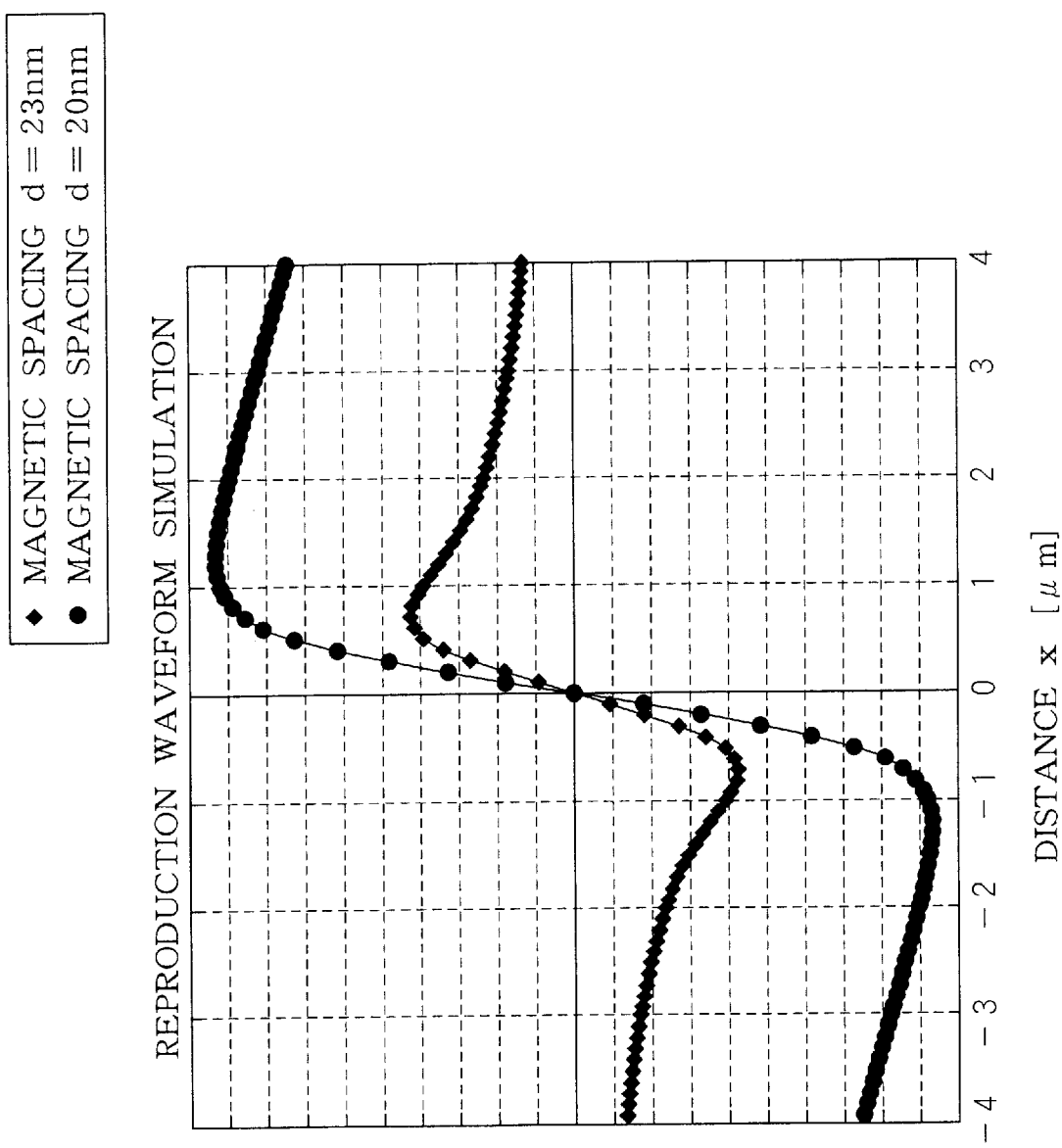
FIG. 44 is a graph showing a reproduction response simulation result in Example 14 of the present invention.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 44. An experiment on recording and reproduction was performed using the apparatuses of the present invention PP3 and PP4 constructed according to this expectation. The output dependence on the recording density is shown in FIG. 42. As is clear from this figure, when using the apparatuses of the present invention PP3 and PP4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved.

Accordingly, a similar effect can be obtained when the magnetic spacing is 20 nm or below. Furthermore, a similar effect can be obtained even when the rare earth element Ce of the perpendicular magnetization film is replaced by Y, Sm, La, or Pr.

Thus, by using the apparatuses of the present invention PP3 and PP4, it is possible to realize an information storage based on the double layered perpendicular magnetic recording method of a super high recording density enabling reproduction at a super high recording density.

EXAMPLE 15

A perpendicular magnetic recording medium was prepared in the same way as Example 1 except for that the FeSiAl target was replaced by a CoNiFe target and the $Co_{77}Cr_{19}Tb_4$ (at %) target was replaced by a $SmCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention QQ3, and an identical apparatus using the inductive MR composite head instead of the single pole type MR composite head will be referred to as an apparatus of the present invention QQ4. Moreover, apparatuses produced in the same way as QQ3 and QQ4 except for that the reproduction gap length is 0.12 micrometers nm will be referred to as comparative apparatuses QQ1 and QQ2, respectively.

Figure 45:
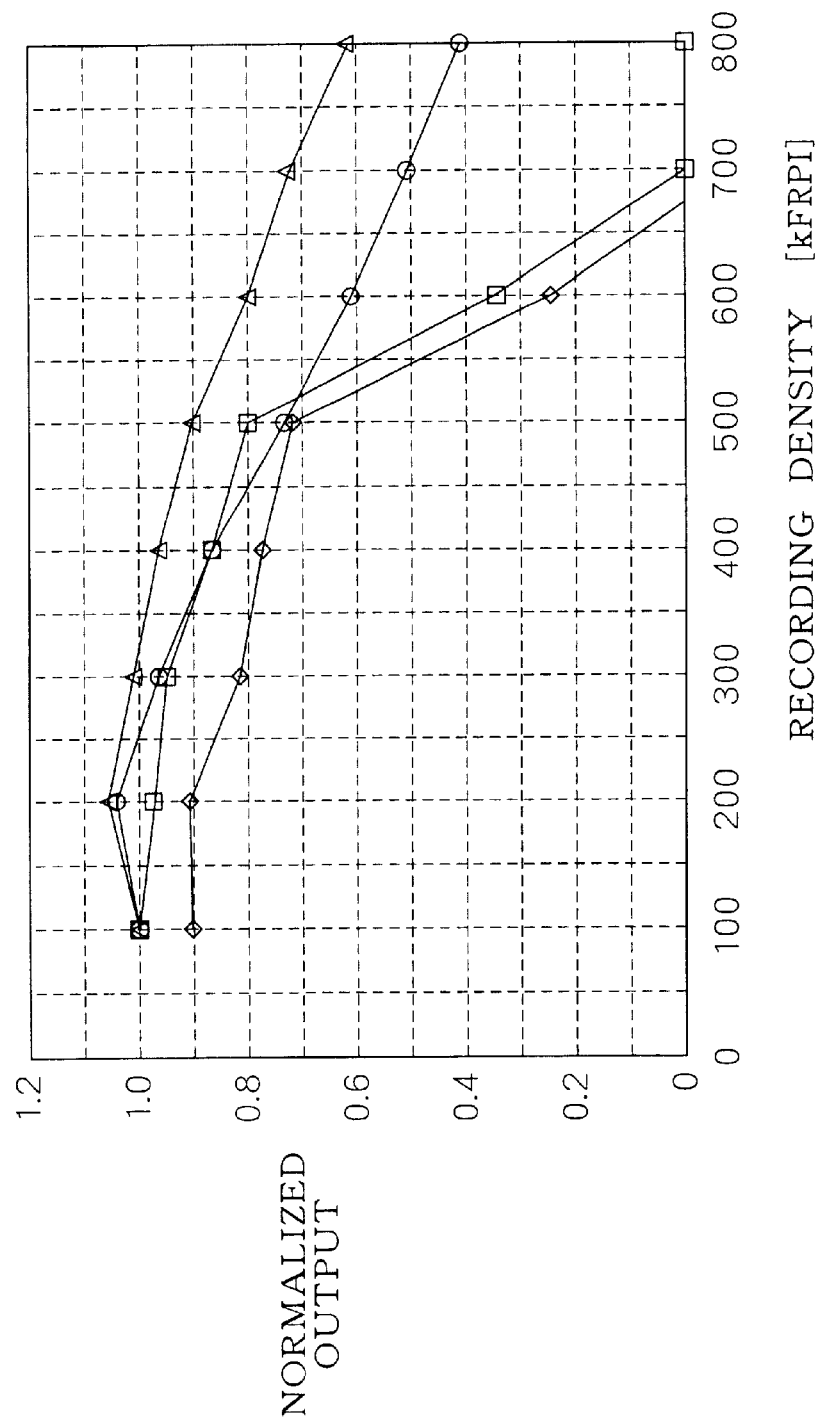
FIG. 45 is a graph showing output dependency on the recording density in Example 15 of the present invention.

An experiment on recording/reproduction was performed using the comparative apparatuses QQ1 and QQ2. FIG. 45 shows output dependency on the recording density. As can be seen from this figure, it is possible to obtain a reasonable reproduction output up to the recording density of 500 kFRPI but after the 500 kFRPI the reproduction output is abruptly decreased. FIG. 46 and [2] show recording magnetization patterns of recording states obtained at the recording density 600 kFRPI by the comparative apparatuses QQ1 and QQ2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses QQ1 and QQ2 are not caused by a recording state defect but by a reproduction resolution defect.

Figure 47:
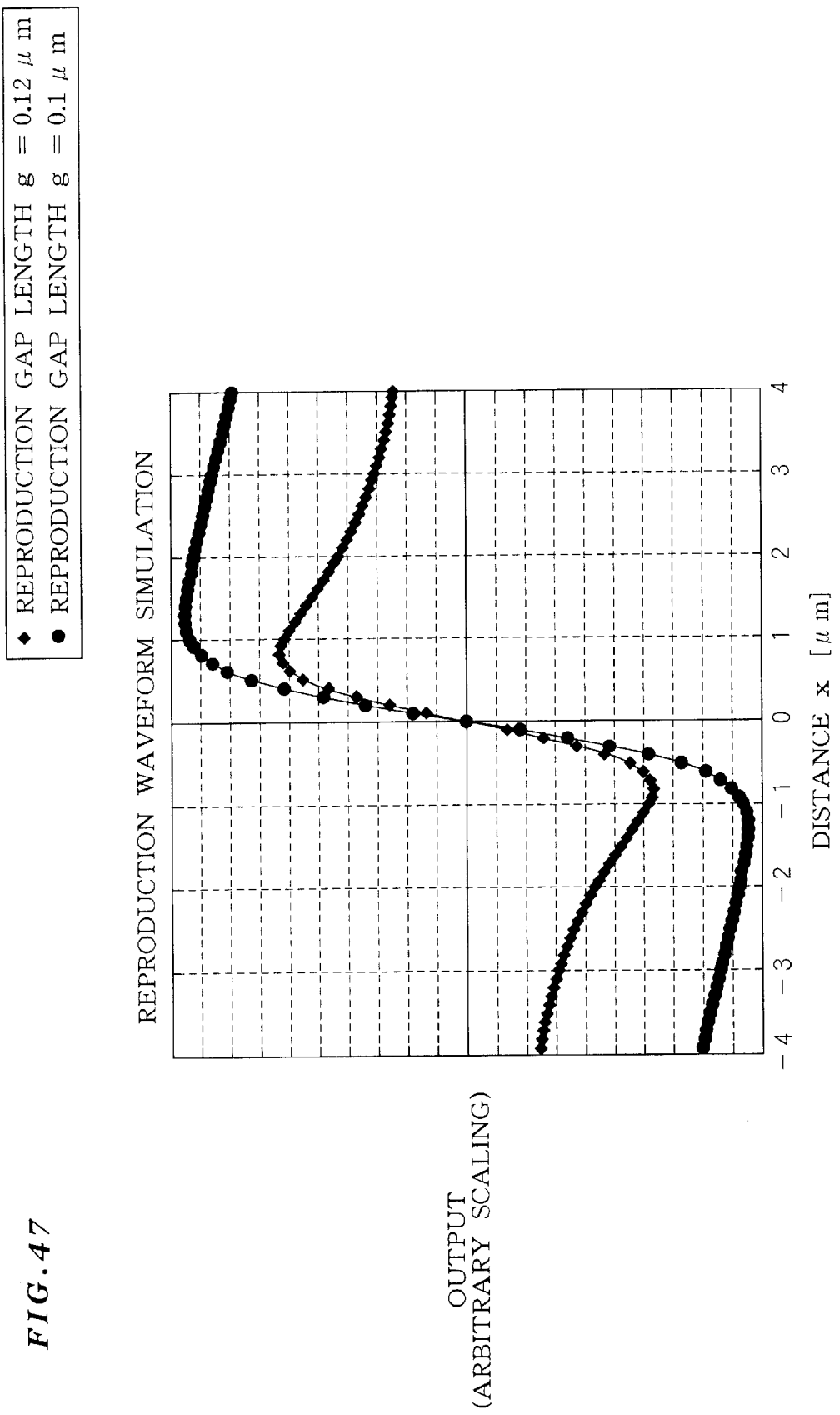
FIG. 47 is a graph showing a reproduction response simulation result in Example 15 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 47. An experiment on recording and reproduction was performed using the apparatuses of the present invention QQ3 and QQ4 constructed according to this expectation. The output dependence on the recording density is shown in FIG. 45. As is clear from this figure, when using the apparatuses of the present invention QQ3 and QQ4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.10 micrometers or below. Furthermore, a similar effect can be obtained even when the rare earth element Sm of the perpendicular magnetization film is replaced by Y, Ce, La, or Pr.

Thus, by using the apparatuses of the present invention QQ3 and QQ4, it is possible to realize an information storage based on the double layered perpendicular magnetic recording method of a super high recording density enabling reproduction at a super high recording density.

EXAMPLE 16

A perpendicular magnetic recording medium was prepared in the same way as Example 1 except for that the FeSiAl target was replaced by a CoNiFeTi target and the $Co_{77}Cr_{19}Tb_4$ (at %) target was replaced by a $LaCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied from 15 to 25 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention RR3, and an identical apparatus using the inductive MR composite head instead of the single pole type MR composite head will be referred to as an apparatus of the present invention RR4. Moreover, apparatuses produced in the same way as RR3 and RR4 except for that the magnetic spacing is 23 nm will be referred to as comparative apparatuses RR1 and RR2, respectively.

Figure 48:
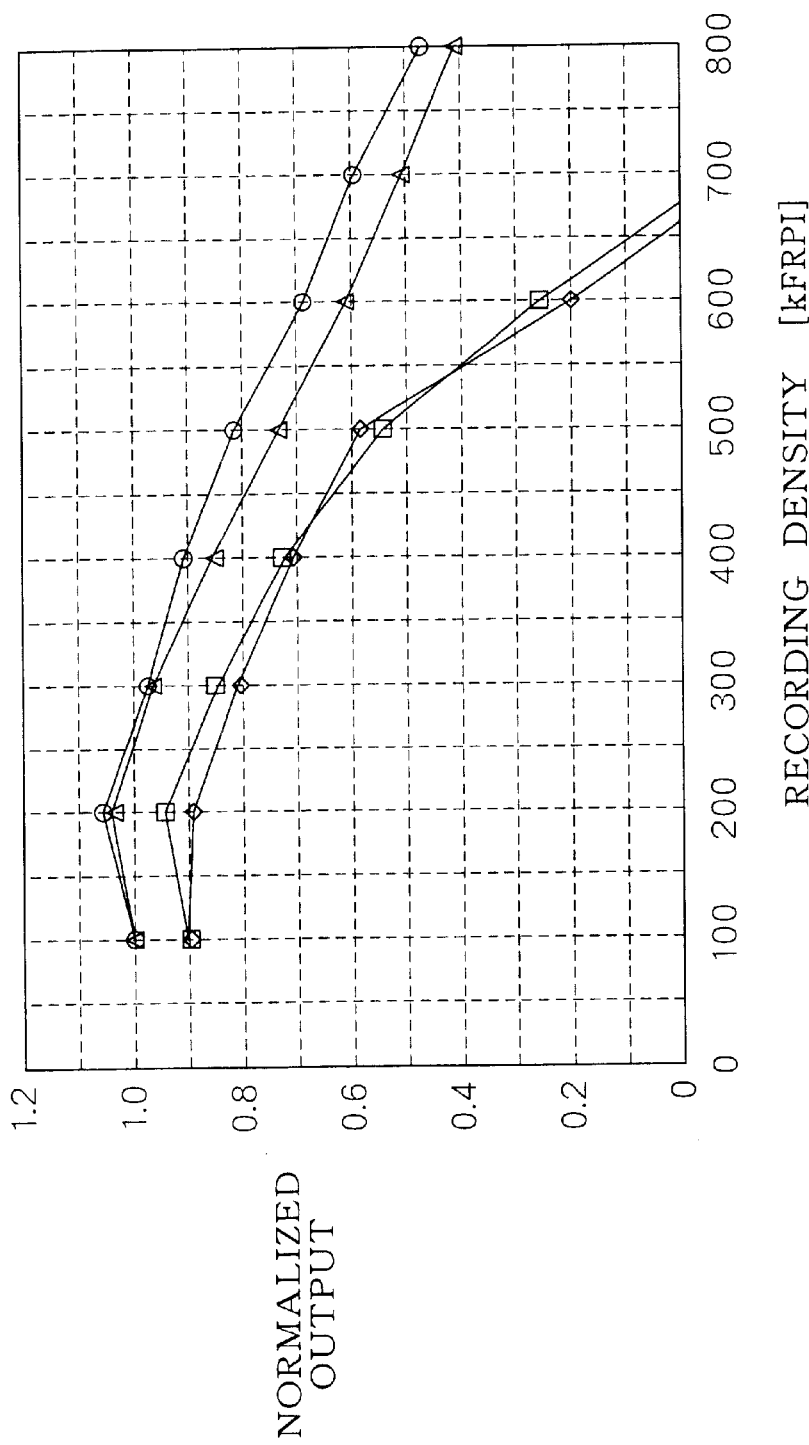
FIG. 48 is a graph showing output dependency on the recording density in Example 16 of the present invention.

An experiment on recording/reproduction was performed using the comparative apparatuses RR1 and RR2. FIG. 48 shows output dependency on the recording density. As can be seen from this figure, it is possible to obtain a reasonable reproduction output up to the recording density of 500 kFRPI but after the 500 kFRPI the reproduction output is abruptly decreased. FIG. 46 and [2] show recording magnetization patterns of recording states obtained at the recording density 600 kFRPI by the comparative apparatuses RR1 and RR2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses RR1 and RR2 are not caused by a recording state defect but by a reproduction resolution defect.

Figure 50:
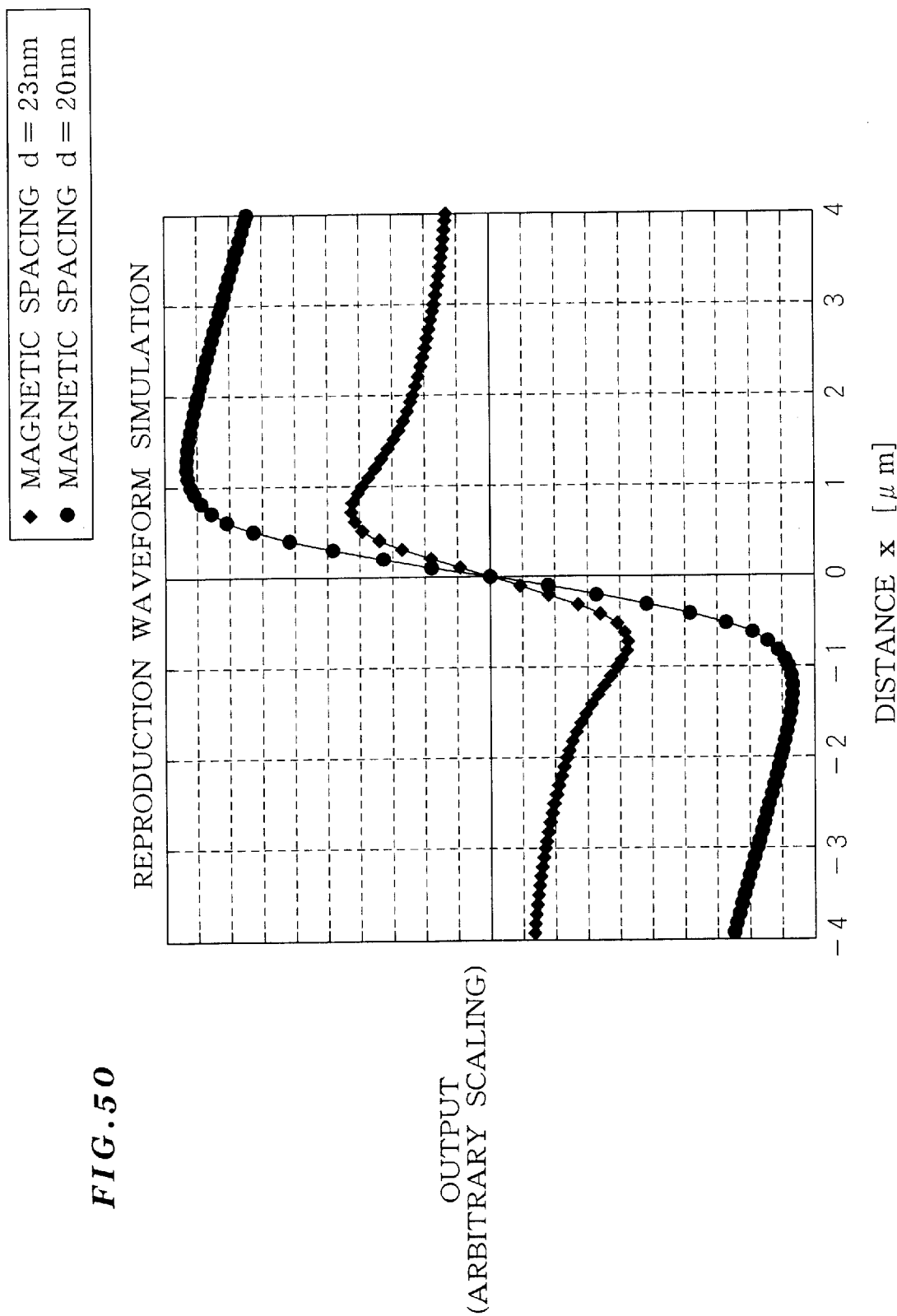
FIG. 50 is a graph showing a reproduction response simulation result in Example 16 of the present invention.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 50. An experiment on recording and reproduction was performed using the apparatuses of the present invention RR3 and RR4 constructed according to this expectation. The output dependence on the recording density is shown in FIG. 48. As is clear from this figure, when using the apparatuses of the present invention RR3 and RR4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved. Accordingly, a similar effect can be obtained when the magnetic spacing is 20 nm or below. Furthermore, a similar effect can be obtained even when the rare earth element La of the perpendicular magnetization film is replaced by Y, Ce, Sm, or Pr.

Thus, by using the apparatuses of the present invention RR3 and RR4, it is possible to realize an information storage based on the double layered perpendicular magnetic recording method of a super high recording density enabling reproduction at a super high recording density.

EXAMPLE 17

A perpendicular magnetic recording medium was prepared in the same way as Example 1 except for that the FeSiAl target was replaced by a CoZrTa target and the $Co_{77}Cr_{19}Tb_4$ (at %) target was replaced by a $PrCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention SS3, and an identical apparatus using the inductive MR composite head instead of the single pole type MR composite head will be referred to as an apparatus of the present invention SS4. Moreover, apparatuses produced in the same way as SS3 and SS4 except for that the reproduction gap length is 0.12 micrometers will be referred to as comparative apparatuses SS1 and SS2, respectively.

Figure 51:
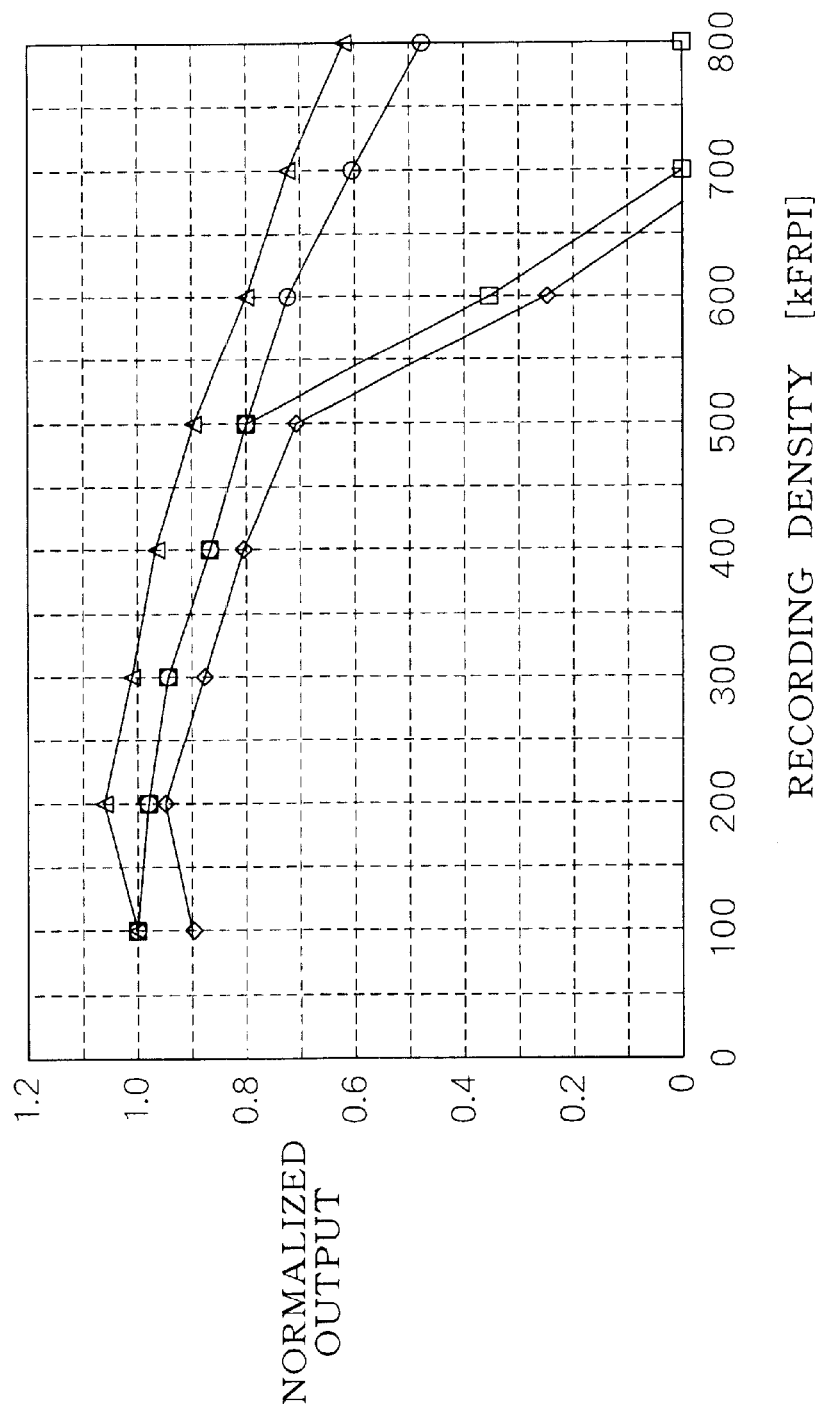
FIG. 51 is a graph showing output dependency on the recording density in Example 17 of the present invention.

An experiment on recording/reproduction was performed using the comparative apparatuses SS1 and SS2. FIG. 51 shows output dependency on the recording density. As can be seen from this figure, it is possible to obtain a reasonable reproduction output up to the recording density of 500 kFRPI but after the 500 kFRPI the reproduction output is abruptly decreased. FIG. 52 and [2] show recording magnetization patterns of recording states obtained at the recording density 600 kFRPI by the comparative apparatuses SS1 and SS2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses SS1 and SS2 are not caused by a recording state defect but by a reproduction resolution defect.

Figure 53:
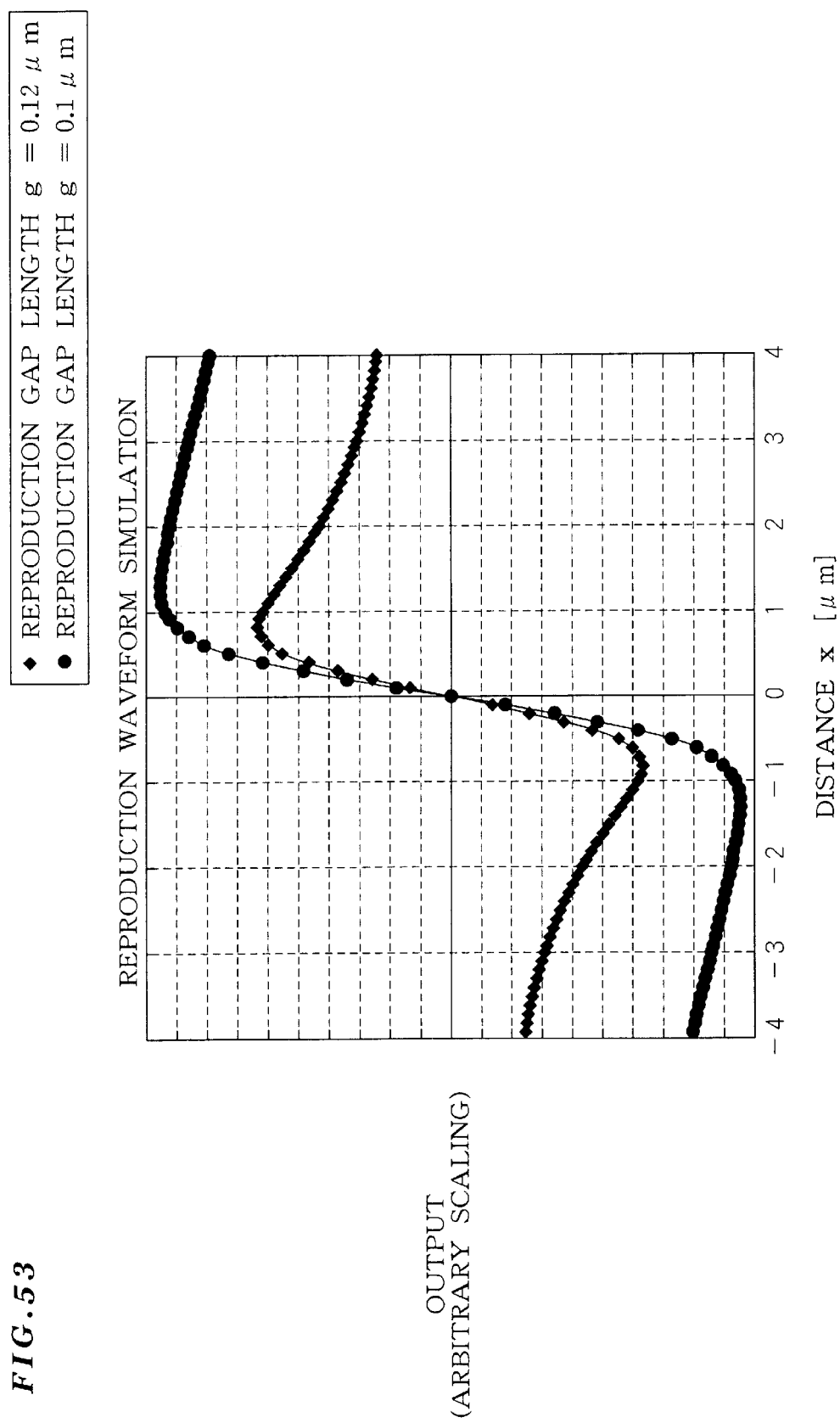
FIG. 53 is a graph showing a reproduction response simulation result in Example 17 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 53. An experiment on recording and reproduction was performed using the apparatuses of the present invention SS3 and SS4 constructed according to this expectation. The output dependence on the recording density is shown in FIG. 51. As is clear from this figure, when using the apparatuses of the present invention SS3 and SS4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.10 micrometers or below. Furthermore, a similar effect can be obtained even when the rare earth element Pr of the perpendicular magnetization film is replaced by Y, Ce, Sm, or La.

Thus, by using the apparatuses of the present invention SS3 and SS4, it is possible to realize an information storage based on the double layered perpendicular magnetic recording method of a super high recording density enabling reproduction at a super high recording density.

EXAMPLE 18

A perpendicular magnetic recording medium was prepared in the same way as Example 1 except for that the FeSiAl target was replaced by a CoZrNb target and the $Co_{77}Cr_{19}Tb_4$ (at %) target was replaced by a $SmCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied from 15 to 25 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention TT3, and an identical apparatus using the inductive MR composite head instead of the single pole type MR composite head will be referred to as an apparatus of the present invention TT4. Moreover, apparatuses produced in the same way as TT3 and TT4 except for that the magnetic spacing is 23 nm will be referred to as comparative apparatuses TT1 and TT2, respectively.

Figure 54:
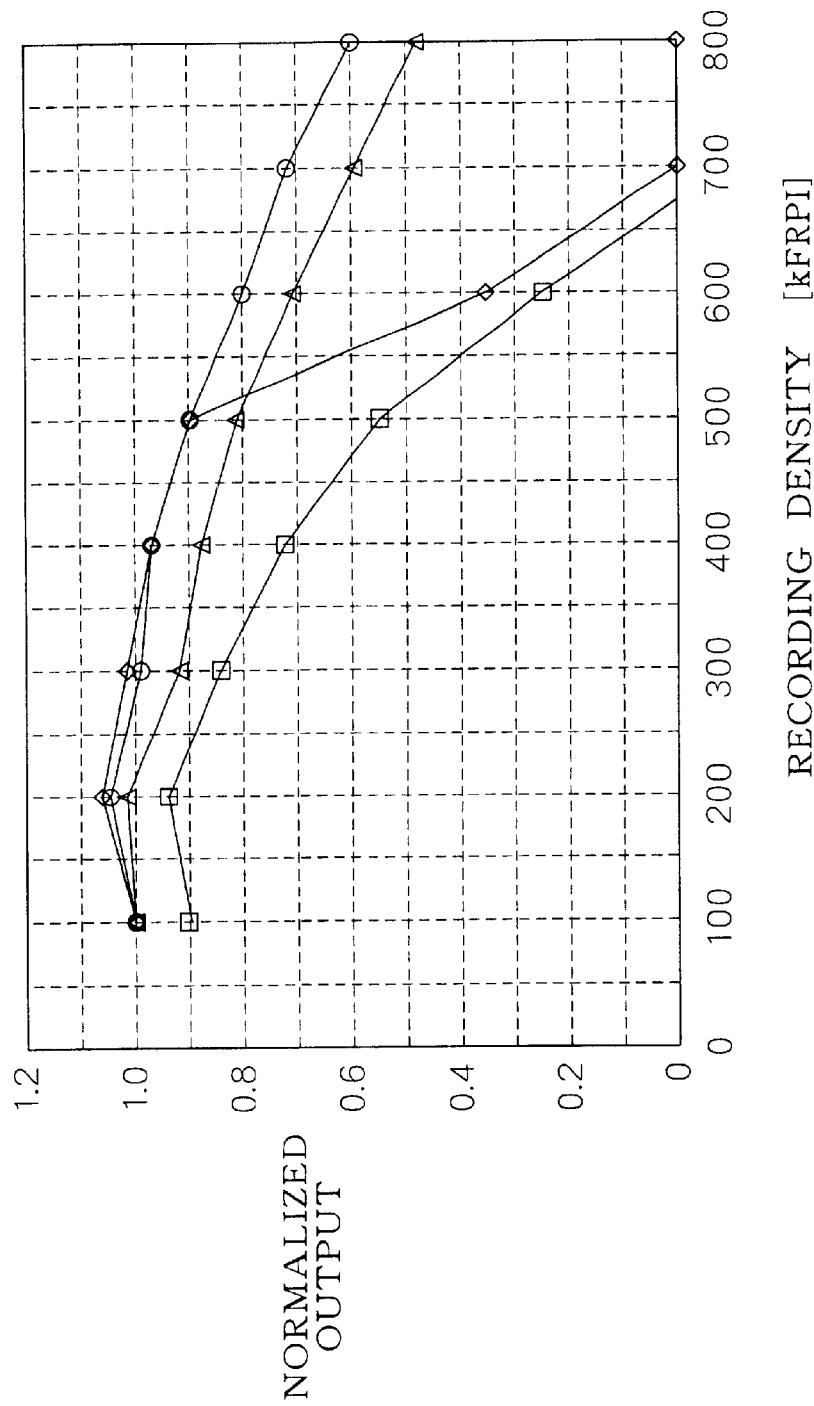
FIG. 54 is a graph showing output dependency on the recording density in Example 18 of the present invention.

An experiment on recording/reproduction was performed using the comparative apparatuses TT1 and TT2. FIG. 54 shows output dependency on the recording density. As can be seen from this figure, it is possible to obtain a reasonable reproduction output up to the recording density of 500 kFRPI but after the 500 kFRPI the reproduction output is abruptly decreased. FIG. 55 and [2] show recording magnetization patterns of recording states obtained at the recording density 600 kFRPI by the comparative apparatuses TT1 and TT2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses TT1 and TT2 are not caused by a recording state defect but by a reproduction resolution defect.

Figure 56:
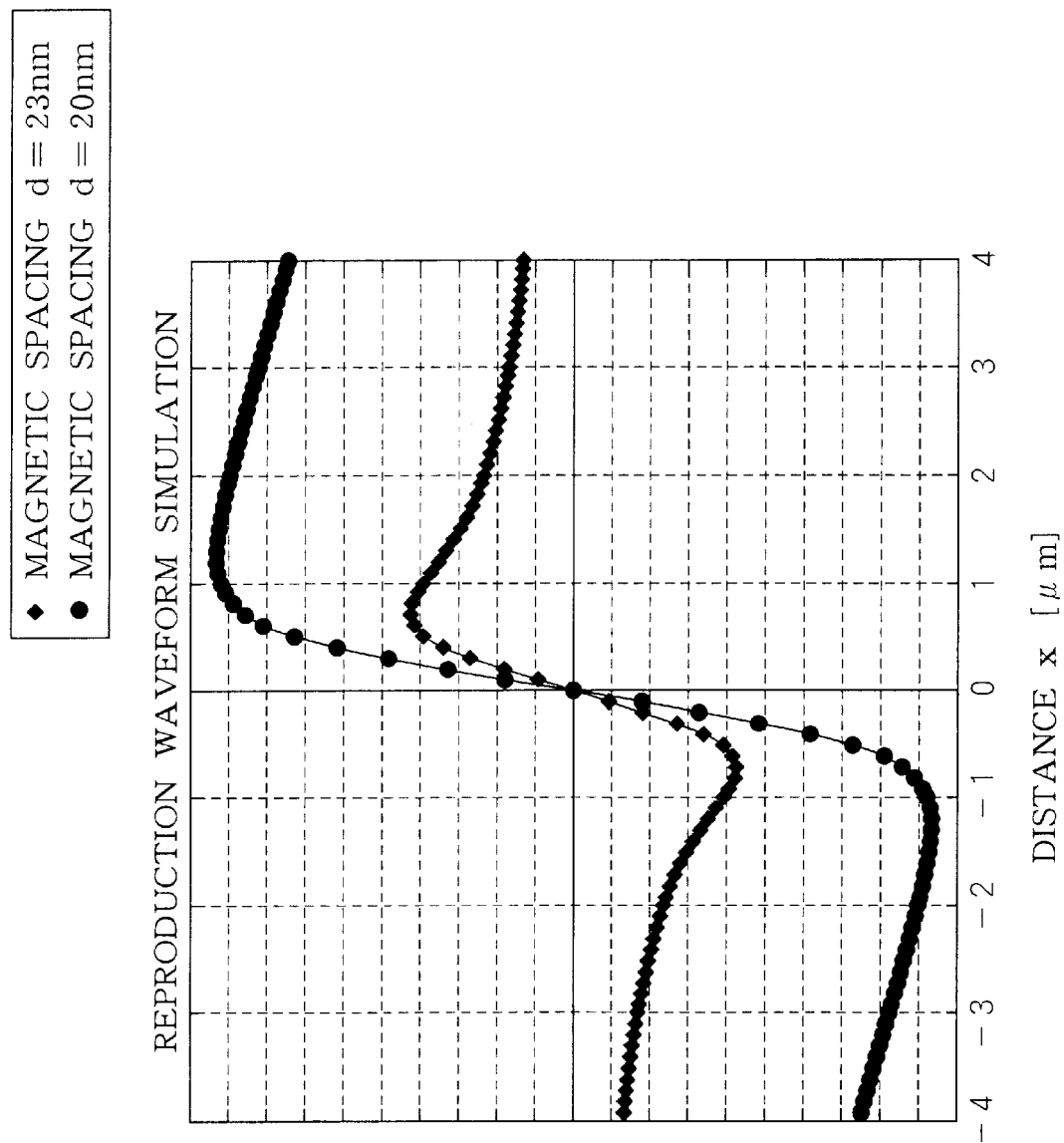
FIG. 56 is a graph showing a reproduction response simulation result in Example 18 of the present invention.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 56. An experiment on recording and reproduction was performed using the apparatuses of the present invention TT3 and TT4 constructed according to this expectation. The output dependence on the recording density is shown in FIG. 54. As is clear from this figure, when using the apparatuses of the present invention TT3 and TT4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved. Accordingly, a similar effect can be obtained when the magnetic spacing is 20 nm or below. Furthermore, a similar effect can be obtained even when the rare earth element Sm of the perpendicular magnetization film is replaced by Y, Ce, Pr, or La.

Thus, by using the apparatuses of the present invention TT3 and TT4, it is possible to realize an information storage based on the double layered perpendicular magnetic recording method of a super high recording density enabling reproduction at a super high recording density.

EXAMPLE 19

A perpendicular magnetic recording medium was prepared in the same way as Example 1 except for that the $Co_{77}Cr_{19}Tb_4$ (at %) target was replaced by a $Y_2Co_{17}$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention UU3, and an identical apparatus using the inductive MR composite head instead of the single pole type MR composite head will be referred to as an apparatus of the present invention UU4. Moreover, apparatuses produced in the same way as UU3 and UU4 except for that the magnetic spacing is 23 nm will be referred to as comparative apparatuses UU1 and UU2, respectively.

Figure 57:
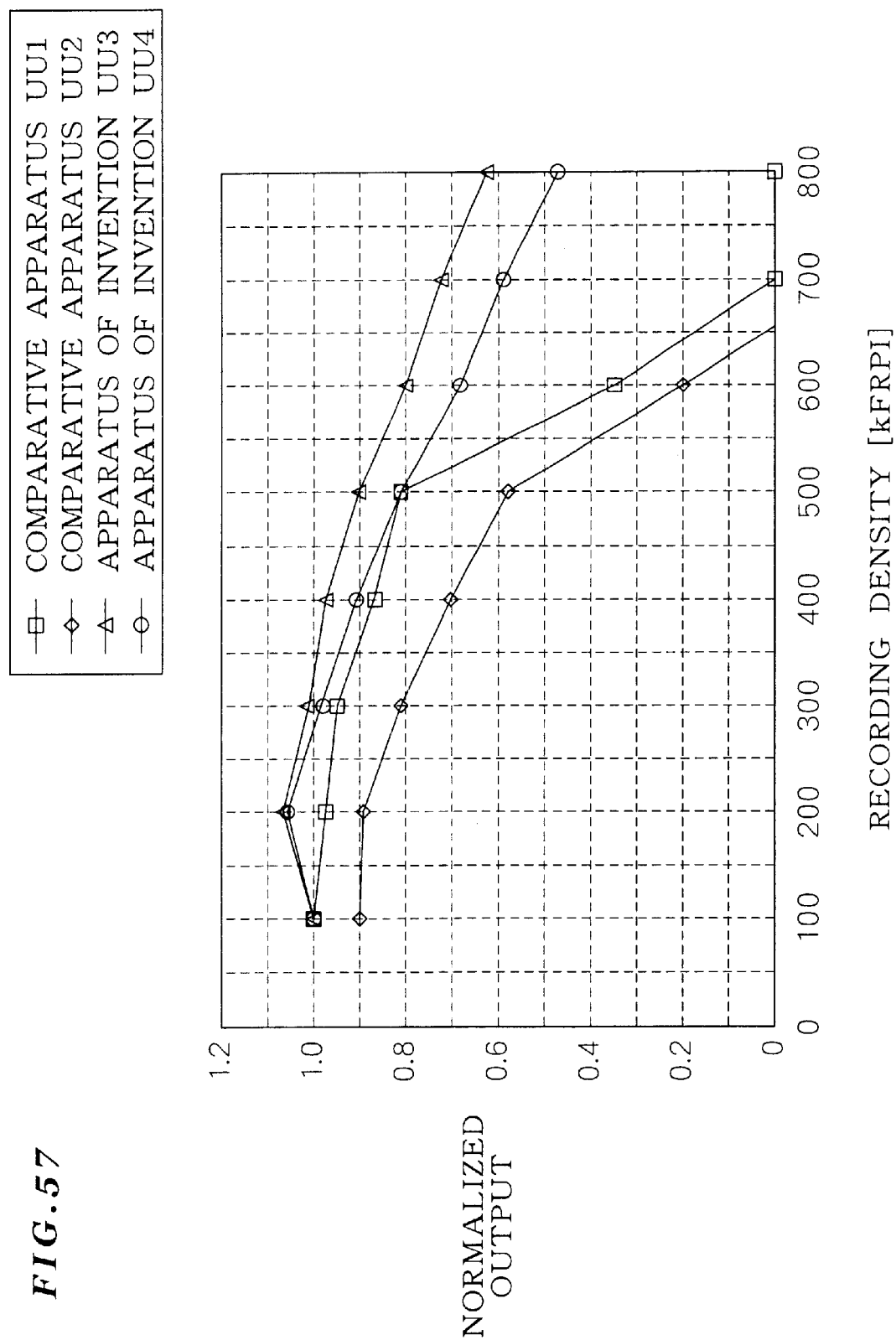
FIG. 57 is a graph showing output dependency on the recording density in Example 19 of the present invention.

An experiment on recording/reproduction was performed using the comparative apparatuses UU1 and UU2. FIG. 57 shows output dependency on the recording density. As can be seen from this figure, it is possible to obtain a reasonable reproduction output up to the recording density of 500 kFRPI but after the 500 kFRPI the reproduction output is abruptly decreased. FIG. 58 and [2] show recording magnetization patterns of recording states obtained at the recording density 600 kFRPI by the comparative apparatuses UU1 and UU2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses UU1 and UU2 are not caused by a recording state defect but by a reproduction resolution defect.

Figure 59:
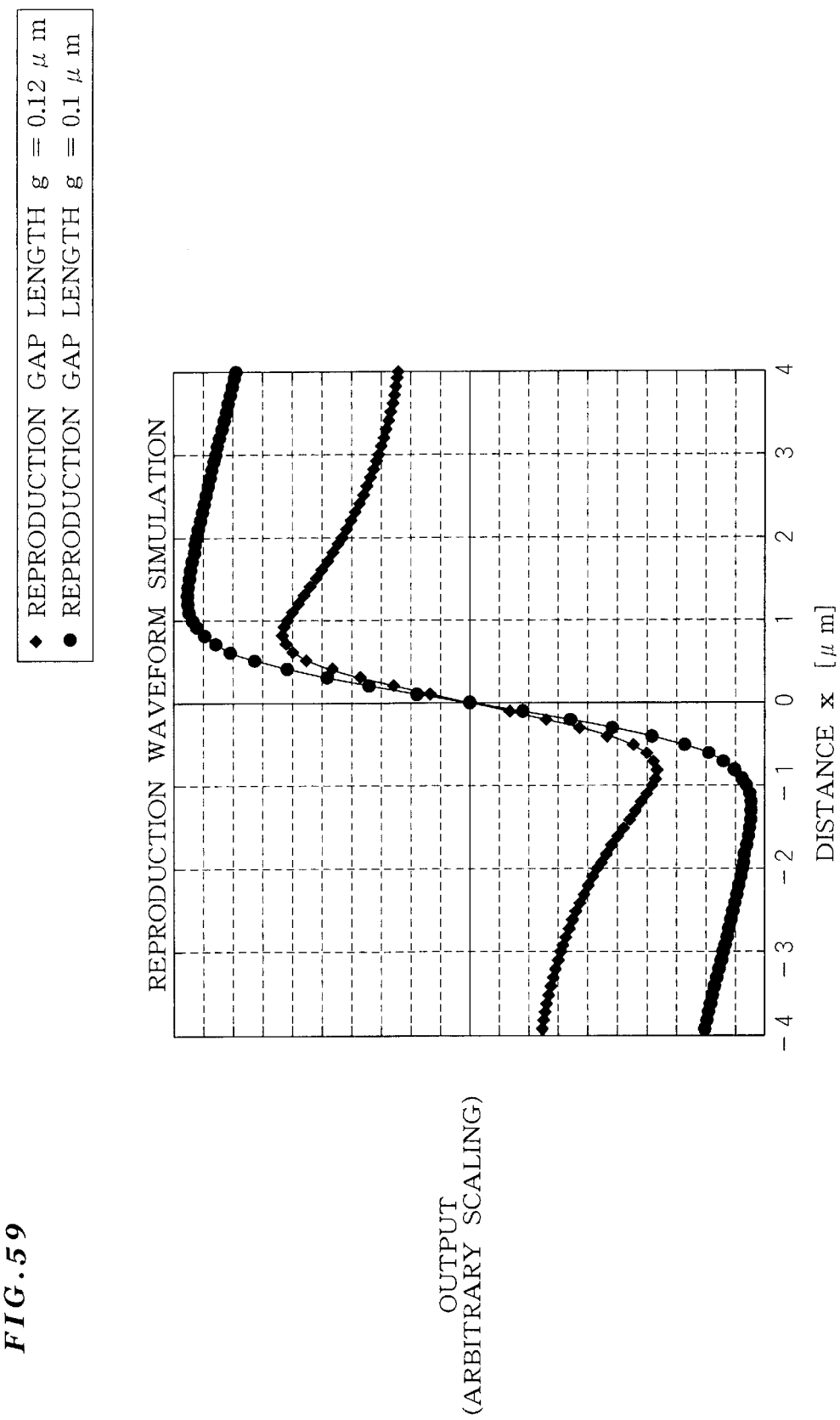
FIG. 59 is a graph showing a reproduction response simulation result in Example 19 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 59. An experiment on recording and reproduction was performed using the apparatuses of the present invention UU3 and UU4 constructed according to this expectation. The output dependence on the recording density is shown in FIG. 57. As is clear from this figure, when using the apparatuses of the present invention UU3 and UU4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.10 micrometers or below. Furthermore, a similar effect can be obtained even when the rare earth element Y of the perpendicular magnetization film is replaced by Ce, Sm, Pr, or La.

Thus, by using the apparatuses of the present invention UU3 and UU4, it is possible to realize an information storage based on the double layered perpendicular magnetic recording method of a super high recording density enabling reproduction at a super high recording density.

EXAMPLE 20

A perpendicular magnetic recording medium was prepared in the same way as Example 1 except for that the FeSiAl target was replaced by a FeSiAlTi target and the $Co_{77}Cr_{19}Tb_4$ (at %) target was replaced by a $CeCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied from 15 to 25 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention VV3, and an identical apparatus using the inductive MR composite head instead of the single pole type MR composite head will be referred to as an apparatus of the present invention VV4. Moreover, apparatuses produced in the same way as VV3 and VV4 except for that the magnetic spacing is 23 nm will be referred to as comparative apparatuses VV1 and VV2, respectively.

Figure 60:
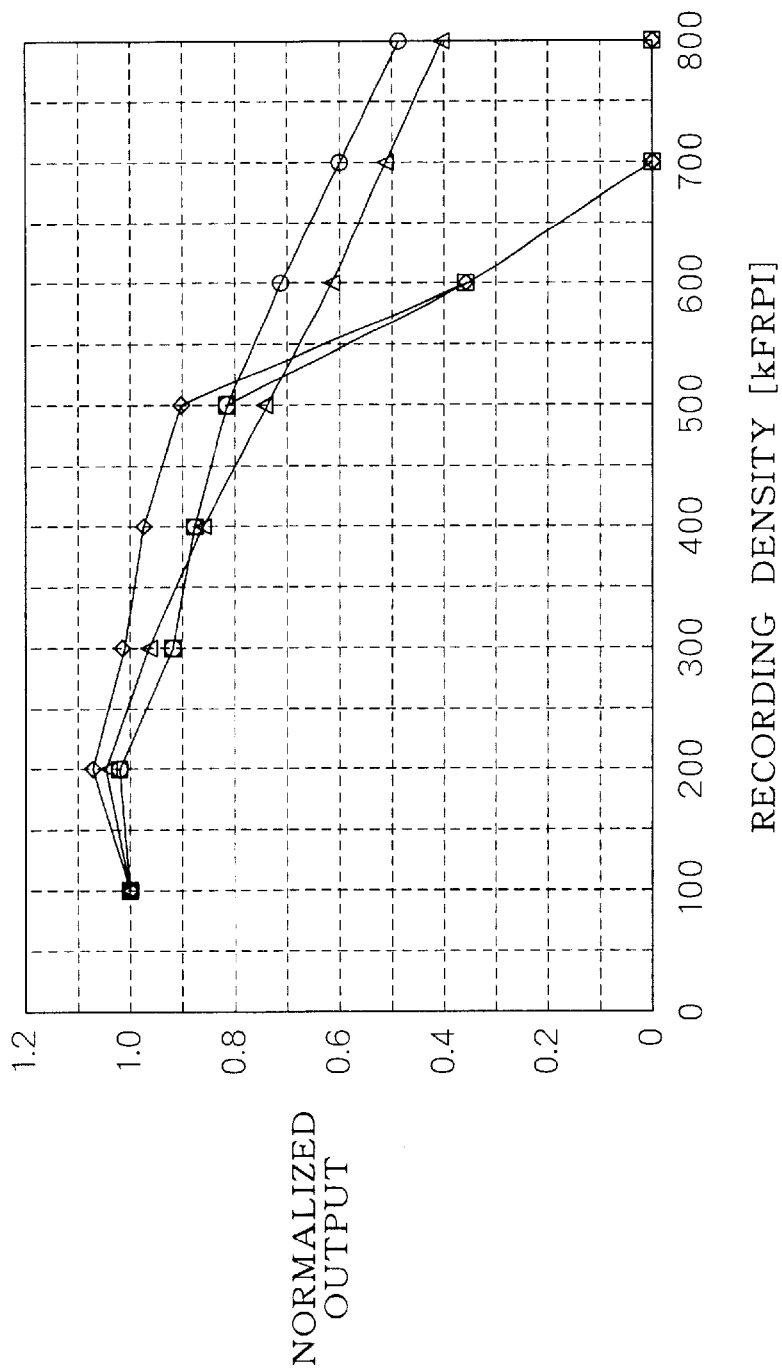
FIG. 60 is a graph showing output dependency on the recording density in Example 20 of the present invention.

An experiment on recording/reproduction was performed using the comparative apparatuses VV1 and VV2. FIG. 60 shows output dependency on the recording density. As can be seen from this figure, it is possible to obtain a reasonable reproduction output up to the recording density of 500 kFRPI but after the 500 kFRPI the reproduction output is abruptly decreased. FIG. 61 and [2] show recording magnetization patterns of recording states obtained at the recording density 600 kFRPI by the comparative apparatuses VV1 and VV2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses VV1 and VV2 are not caused by a recording state defect but by a reproduction resolution defect.

Figure 62:
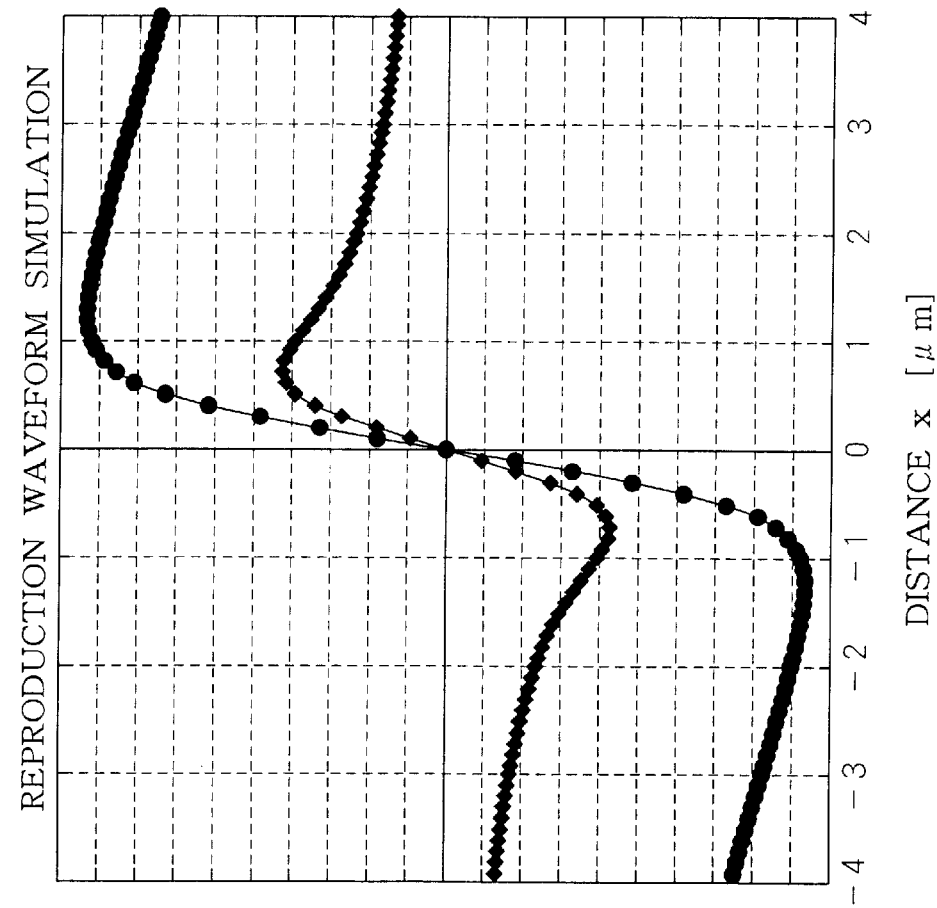
FIG. 62 is a graph showing a reproduction response simulation result in Example 20 of the present invention.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 62. An experiment on recording and reproduction was performed using the apparatuses of the present invention VV3 and VV4 constructed according to this expectation. The output dependence on the recording density is shown in FIG. 60. As is clear from this figure, when using the apparatuses of the present invention VV3 and VV4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved. Accordingly, a similar effect can be obtained when the magnetic spacing is 20 nm or below. Furthermore, a similar effect can be obtained even when the rare earth element Ce of the perpendicular magnetization film is replaced by Y, Sm, Pr, or La. Thus, by using the apparatuses of the present invention VV3 and VV4, it is possible to realize an information storage based on the double layered perpendicular magnetic recording method of a super high recording density enabling reproduction at a super high recording density.

EXAMPLE 21

A perpendicular magnetic recording medium was prepared in the same way as Example 1 except for that the FeSiAl target was replaced by a CoNiFe target and the $Co_{77}Cr_{19}Tb_4$ (at %) target was replaced by a $SeCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention WW3, and an identical apparatus using the inductive MR composite head instead of the single pole type MR composite head will be referred to as an apparatus of the present invention WW4. Moreover, apparatuses produced in the same way as WW3 and WW4 except for that the magnetic spacing is 23 nm will be referred to as comparative apparatuses WW1 and WW2, respectively.

Figure 63:
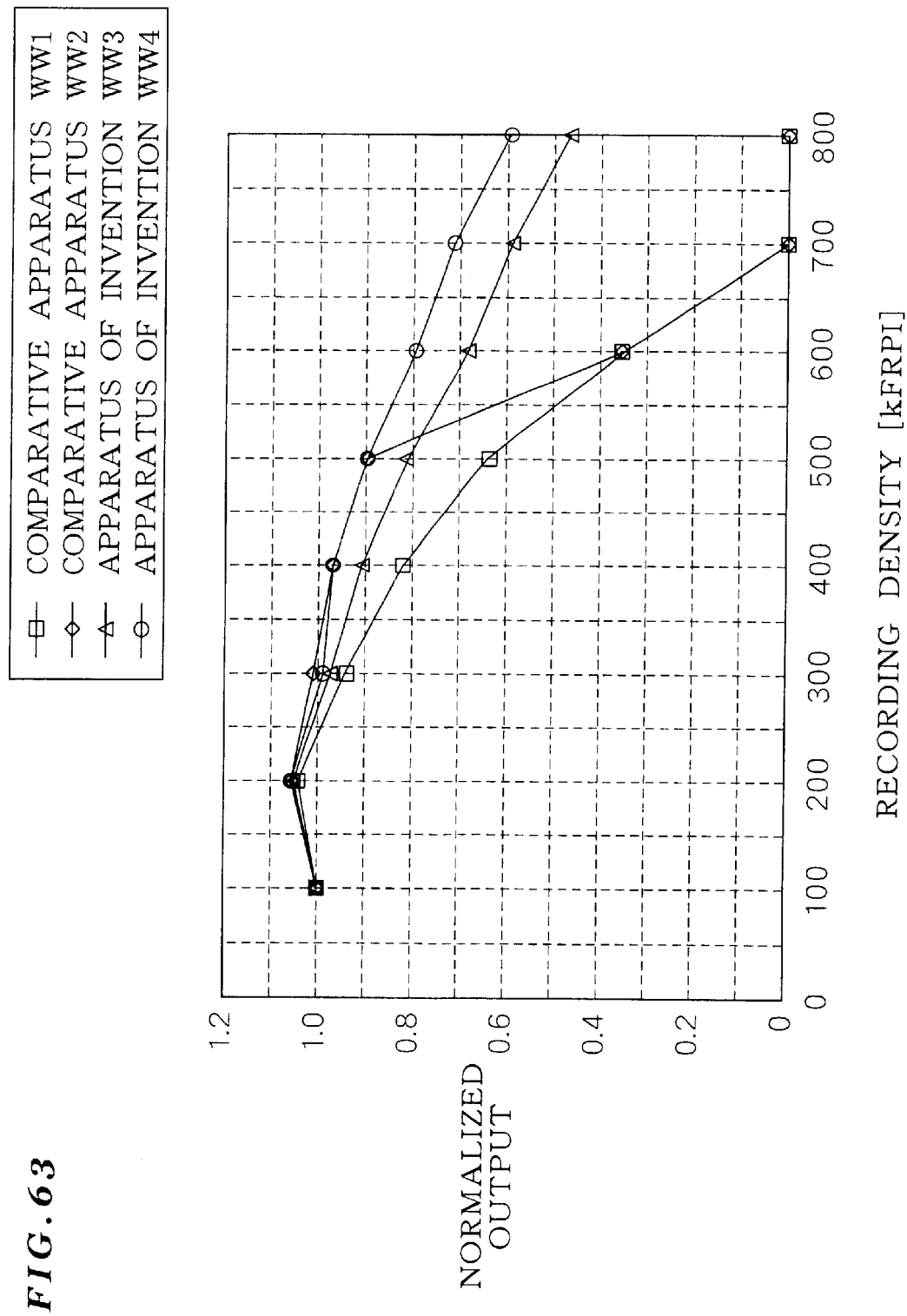
FIG. 63 is a graph showing output dependency on the recording density in Example 21 of the present invention.

An experiment on recording/reproduction was performed using the comparative apparatuses WW1 and WW2. FIG. 63 shows output dependency on the recording density. As can be seen from this figure, it is possible to obtain a reasonable reproduction output up to the recording density of 500 kFRPI but after the 500 kFRPI the reproduction output is abruptly decreased. FIG. 64 and [2] show recording magnetization patterns of recording states obtained at the recording density 600 kFRPI by the comparative apparatuses WW1 and WW2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses WW1 and WW2 are not caused by a recording state defect but by a reproduction resolution defect.

Figure 65:
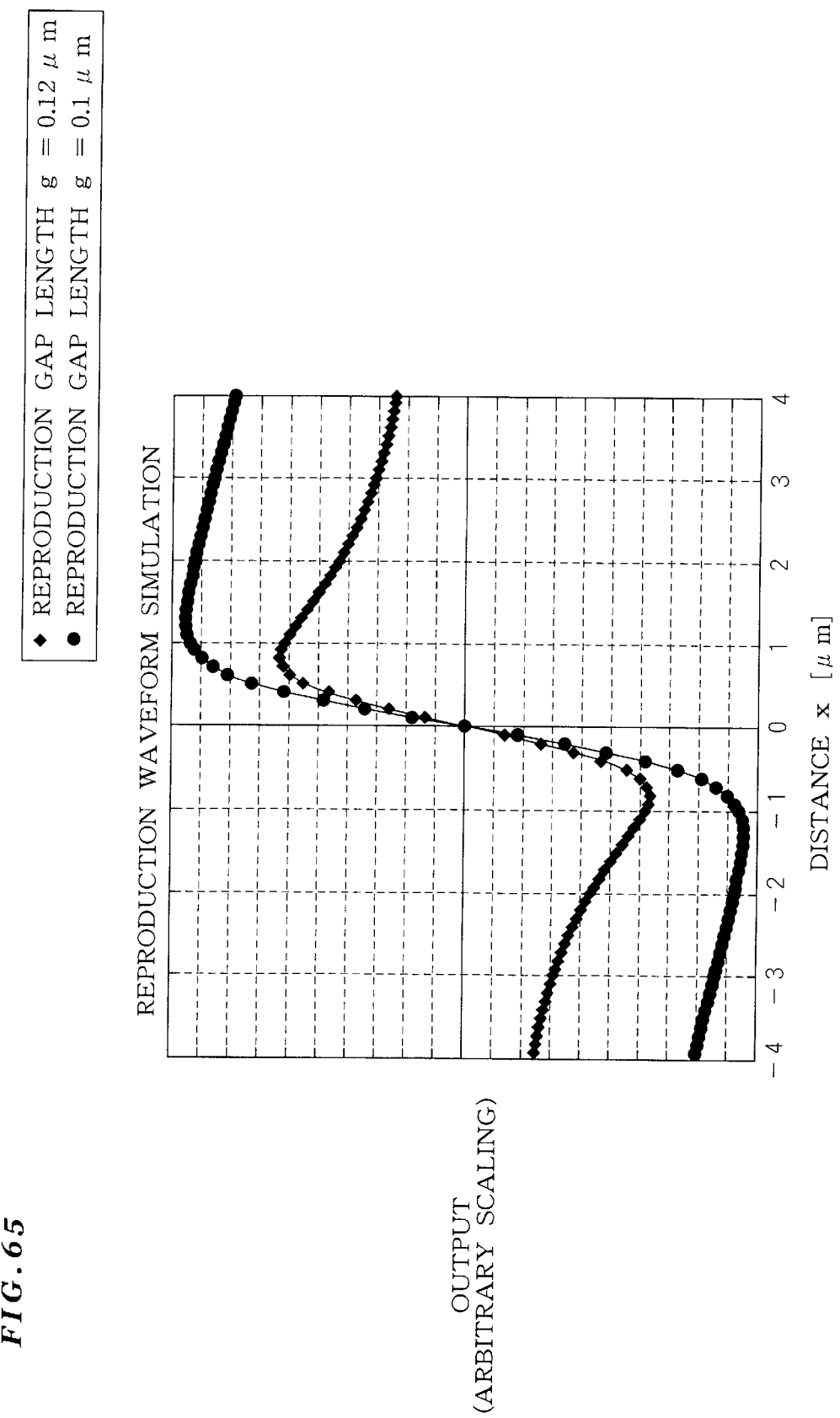
FIG. 65 is a graph showing a reproduction response simulation result in Example 21 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 65. An experiment on recording and reproduction was performed using the apparatuses of the present invention WW3 and WW4 constructed according to this expectation. The output dependence on the recording density is shown in FIG. 63. As is clear from this figure, when using the apparatuses of the present invention WW3 and WW4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.10 micrometers or below. Furthermore, a similar effect can be obtained even when the rare earth element Sm of the perpendicular magnetization film is replaced by Y, Ce, Pr, or La.

Thus, by using the apparatuses of the present invention WW3 and WW4, it is possible to realize an information storage based on the double layered perpendicular magnetic recording method of a super high recording density enabling reproduction at a super high recording density.

EXAMPLE 22

A perpendicular magnetic recording medium was prepared in the same way as Example 1 except for that the FeSiAl target was replaced by a CoNiFeTi target and the $Co_{77}Cr_{19}Tb_4$ (at %) target was replaced by a $LaCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing was varied from 15 to 25 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention XX3, and an identical apparatus using the inductive MR composite head instead of the single pole type MR composite head will be referred to as an apparatus of the present invention XX4. Moreover, apparatuses produced in the same way as XX3 and XX4 except for that the magnetic spacing is 23 nm will be referred to as comparative apparatuses XX1 and XX2, respectively.

Figure 66:
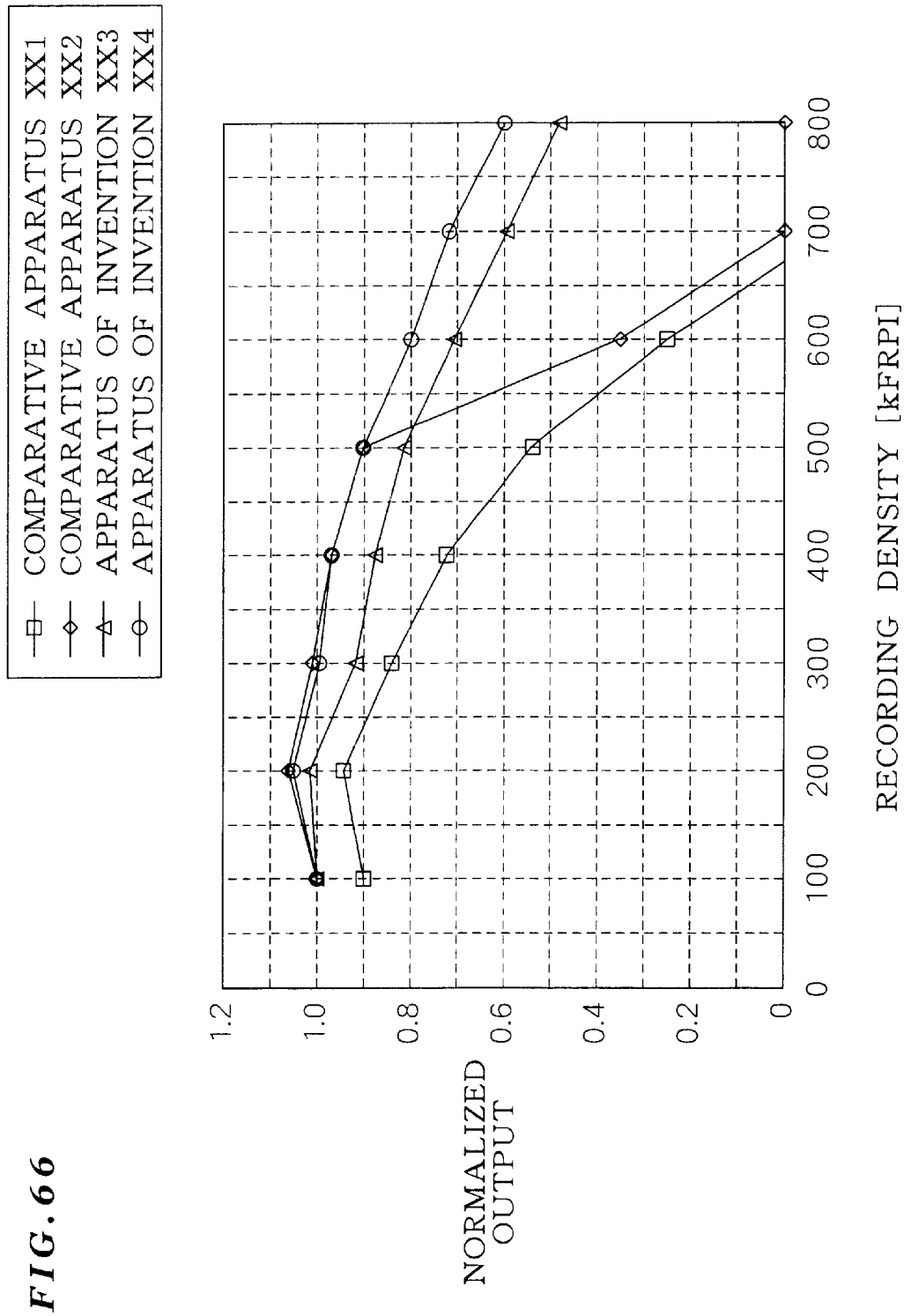
FIG. 66 is a graph showing output dependency on the recording density in Example 22 of the present invention.

An experiment on recording/reproduction was performed using the comparative apparatuses XX1 and XX2. FIG. 66 shows output dependency on the recording density. As can be seen from this figure, it is possible to obtain a reasonable reproduction output up to the recording density of 500 kFRPI but after the 500 kFRPI the reproduction output is abruptly decreased. FIG. 67 and [2] show recording magnetization patterns of recording states obtained at the recording density 600 kFRPI by the comparative apparatuses XX1 and XX2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses XX1 and XX2 are not caused by a recording state defect but by a reproduction resolution defect.

Figure 68:
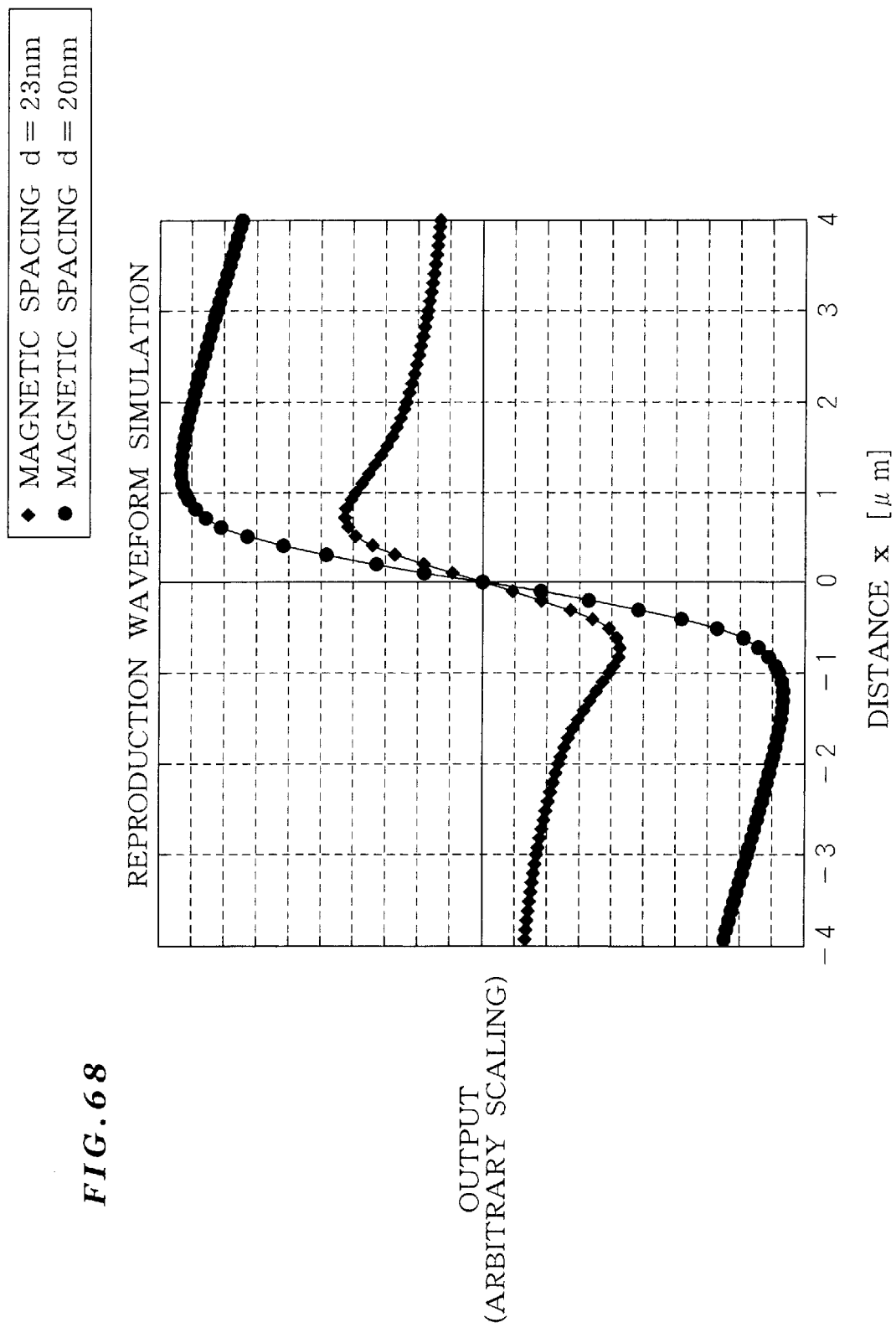
FIG. 68 is a graph showing a reproduction response simulation result in Example 23 of the present invention.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 68. An experiment on recording and reproduction was performed using the apparatuses of the present invention XX3 and XX4 constructed according to this expectation. The output dependence on the recording density is shown in FIG. 66. As is clear from this figure, when using the apparatuses of the present invention XX3 and XX4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved. Accordingly, a similar effect can be obtained when the magnetic spacing is 20 nm or below. Furthermore, a similar effect can be obtained even when the rare earth element La of the perpendicular magnetization film is replaced by Y, Ce, Sm, or Pr.

Thus, by using the apparatuses of the present invention XX3 and XX4, it is possible to realize an information storage based on the double layered perpendicular magnetic recording method of a super high recording density enabling reproduction at a super high recording density.

EXAMPLE 23

A perpendicular magnetic recording medium was prepared in the same way as Example 1 except for that the FeSiAl target was replaced by a CoZrTa target and the $Co_{77}Cr_{19}Tb_4$ (at %) target was replaced by a $PrCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was varied from 0.08 to 0.15 micrometers.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention YY3, and an identical apparatus using the inductive MR composite head instead of the single pole type MR composite head will be referred to as an apparatus of the present invention YY4. Moreover, apparatuses produced in the same way as YY3 and YY4 except for that the reproduction gap length is 0.12 micrometers will be referred to as comparative apparatuses YY1 and YY2, respectively.

Figure 69:
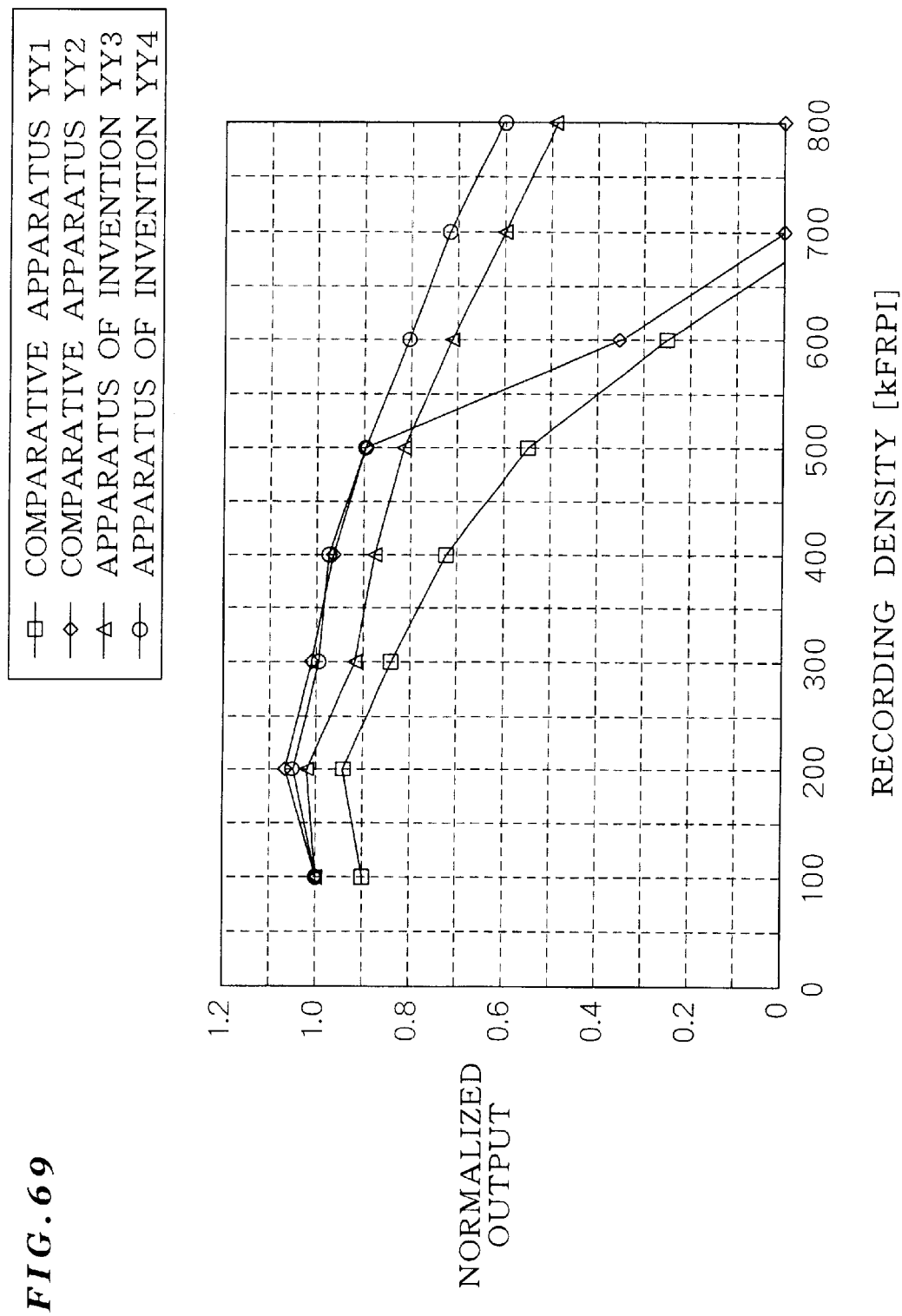
FIG. 69 is a graph showing output dependency on the recording density in Example 23 of the present invention.

An experiment on recording/reproduction was performed using the comparative apparatuses YY1 and YY2. FIG. 69 shows output dependency on the recording density. As can be seen from this figure, it is possible to obtain a reasonable reproduction output up to the recording density of 500 kFRPI but after the 500 kFRPI the reproduction output is abruptly decreased. FIG. 70 and [2] show recording magnetization patterns of recording states obtained at the recording density 600 kFRPI by the comparative apparatuses YY1 and YY2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses YY1 and YY2 are not caused by a recording state defect but by a reproduction resolution defect.

Figure 71:
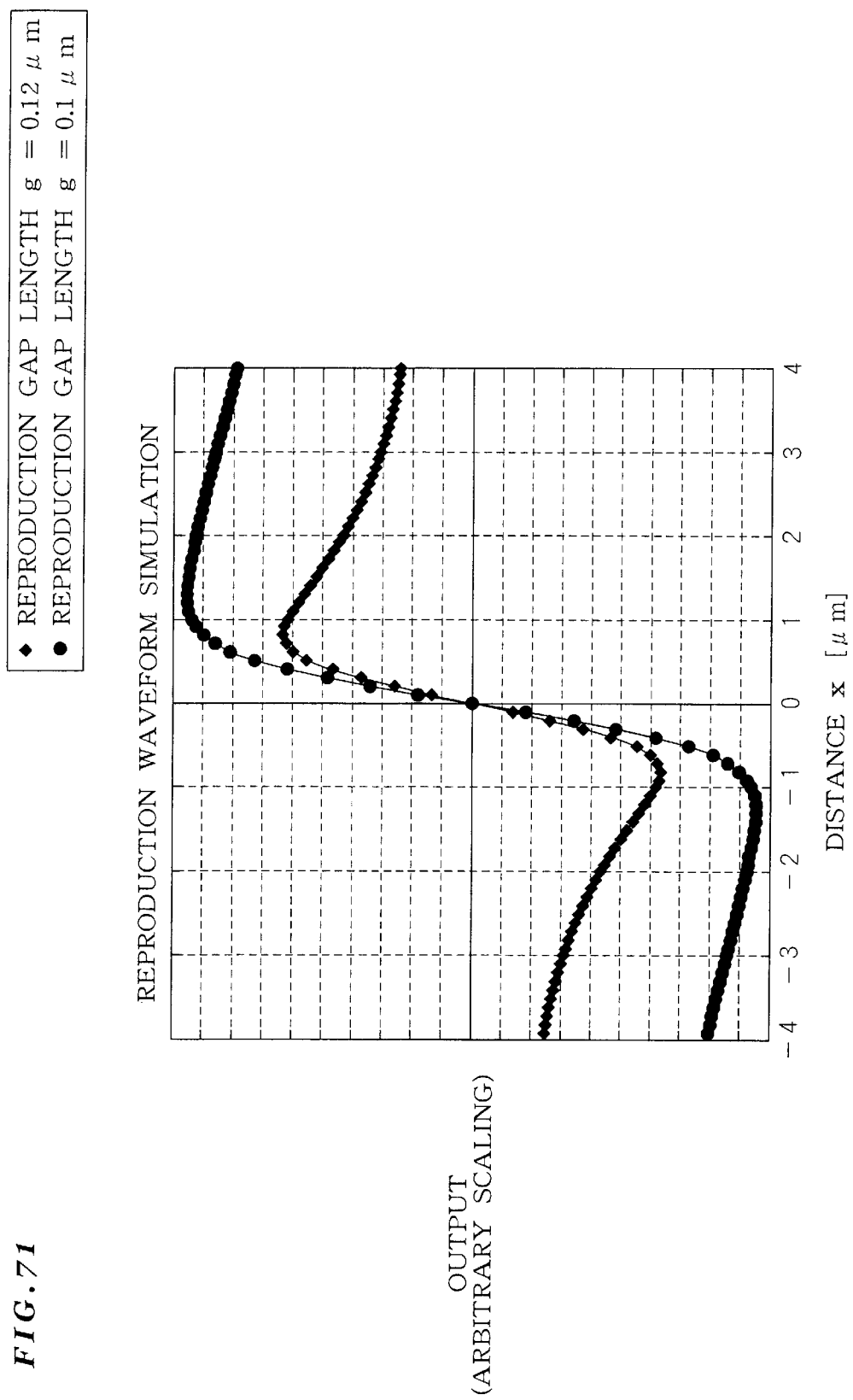
FIG. 71 is a graph showing a reproduction response simulation result in Example 23 of the present invention.

By simulation of the reproduction response of the double layered perpendicular magnetic recording medium, it has been expected that it is possible to improve the reproduction resolution by reducing the reproduction gap length by about 10% for the reproduction specifications of the comparative apparatuses. This is shown in FIG. 71. An experiment on recording and reproduction was performed using the apparatuses of the present invention YY3 and YY4 constructed according to this expectation. The output dependence on the recording density is shown in FIG. 69. As is clear from this figure, when using the apparatuses of the present invention YY3 and YY4, it is possible to obtain a sufficient reproduction output even when the recording density exceeds 500 kFRPI. This is because in the apparatuses of the present invention, the reproduction gap length is smaller than that of the comparative apparatuses and the reproduction resolution is improved. Accordingly, a similar effect can be obtained when the reproduction gap length is 0.10 micrometers or below. Furthermore, a similar effect can be obtained even when the rare earth element Pr of the perpendicular magnetization film is replaced by Y, Ce, Sm, or La.

Thus, by using the apparatuses of the present invention YY3 and YY4, it is possible to realize an information storage based on the double layered perpendicular magnetic recording method of a super high recording density enabling reproduction at a super high recording density.

EXAMPLE 24

A perpendicular magnetic recording medium was prepared in the same way as Example 1 except for that the FeSiAl target was replaced by a CoZrNb target and the $Co_{77}Cr_{19}Tb_4$ (at%) target was replaced by a $SmCo_5$ target. A magnetic disc apparatus was constructed by using this perpendicular magnetic recording medium and a single pole type MR composite head or an inductive MR composite head. The recording/reproduction condition was identical to that of Example 1 except for that the MR head reproduction gap length was set to 0.10 micrometers and the magnetic spacing varied from 15 to 25 nm.

A magnetic disc apparatus having an undercoat soft magnetic film thickness of 200 nm, a perpendicular magnetization film of 50 nm, a reproduction gap length of 0,10 micrometers, and a magnetic spacing of 20 nm, and using a single pole type MR composite head will be referred to as an apparatus of the present invention ZZ3, and an identical apparatus using the inductive MR composite head instead of the single pole type MR composite head will be referred to as an apparatus of the present invention ZZ4. Moreover, apparatuses produced in the same way as ZZ3 and ZZ4 except for that the magnetic spacing is 23 nm will be referred to as comparative apparatuses ZZ1 and ZZ2, respectively.

Figure 72:
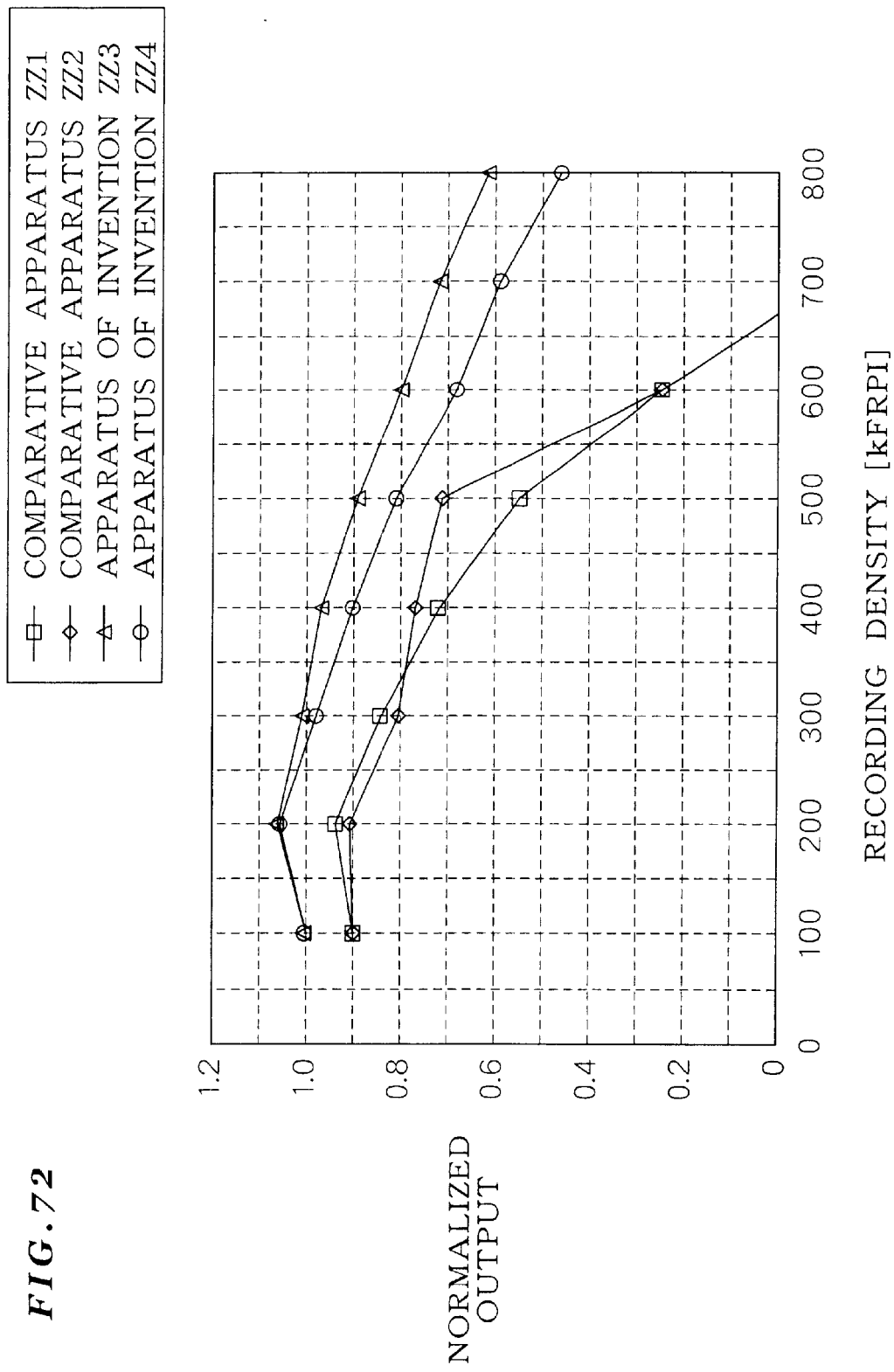
FIG. 72 is a graph showing output dependency on the recording density in Example 24 of the present invention.

An experiment on recording/reproduction was performed using the comparative apparatuses ZZ1 and ZZ2. FIG. 72 shows output dependency on the recording density. As can be seen from this figure, it is possible to obtain a reasonable reproduction output up to the recording density of 500 kFRPI but after the 500 kFRPI the reproduction output is abruptly decreased. FIG. 73 and [2] show recording magnetization patterns of recording states obtained at the recording density 600 kFRPI by the comparative apparatuses ZZ1 and ZZ2 observed through a magnetic force microscope (MFM). As is clear from these figures, a signal is clearly recorded on the perpendicular magnetic recording medium. From this, it can be understood that the abrupt decrease of the reproduction output at the recording density exceeding 500 kFRPI in the comparative apparatuses ZZ1 and ZZ2 are not caused by a recording state defect but by a reproduction resolution defect.

Figure 74:
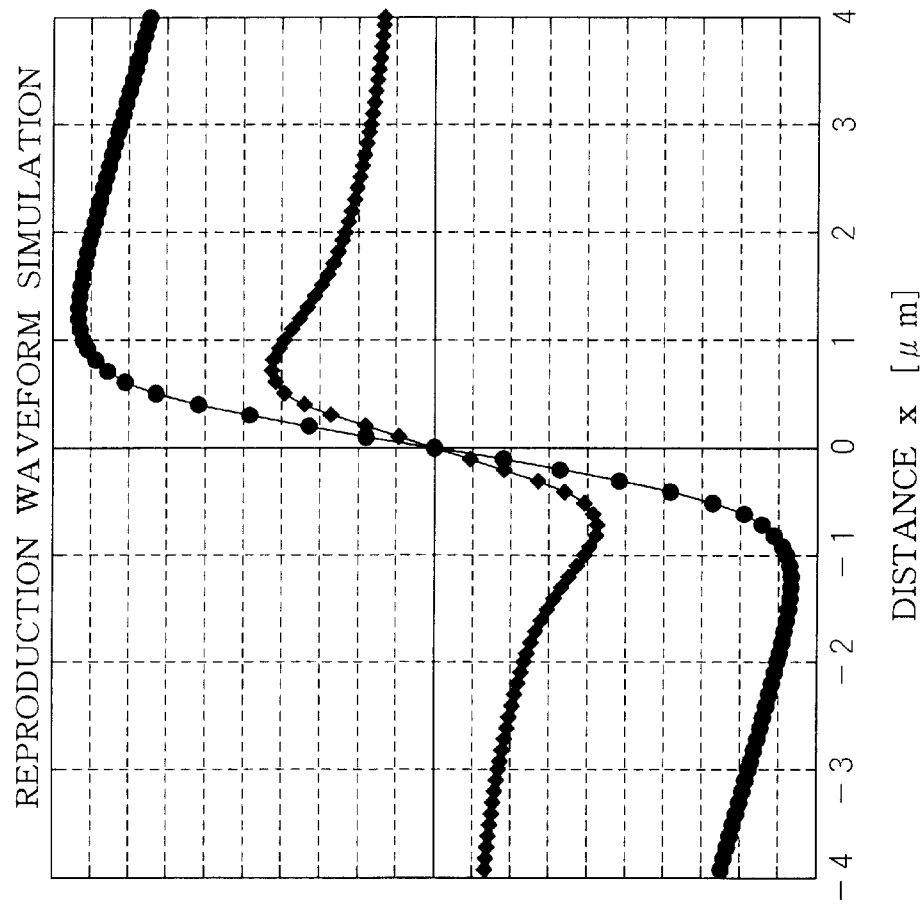
FIG. 74 is a graph showing a reproduction response simulation result in Example 24 of the present invention.
Figure 75:
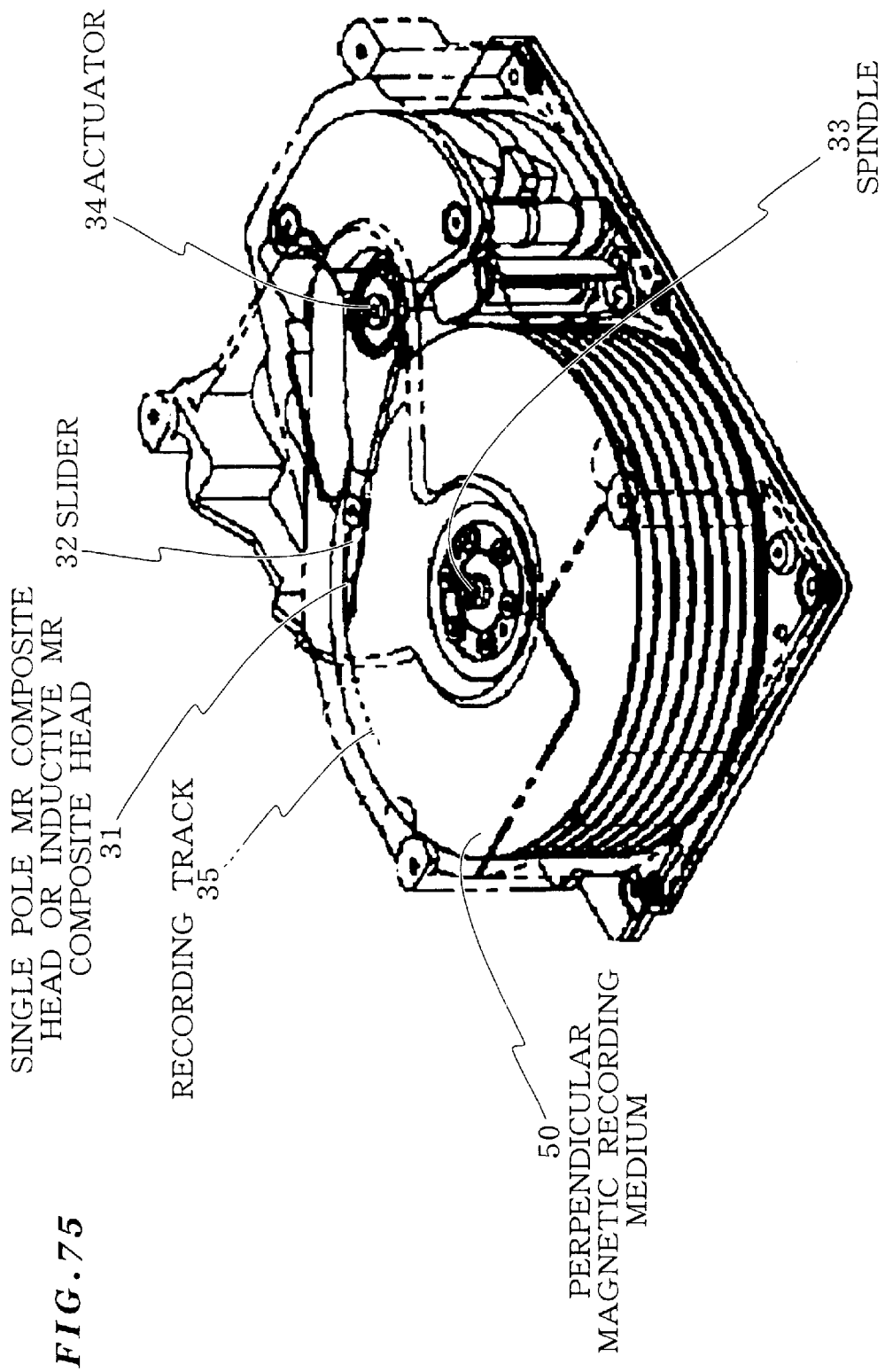
FIG. 75 is an external perspective view of a conventional magnetic disc apparatus.

By simulation of the reproduction response of the double layered perpendicular magnetic recording medium, it has been expected that it is possible to improve the reproduction resolution by reducing the magnetic spacing by about 10% for the reproduction specifications of the comparative apparatuses. This is shown in FIG. 74. An experiment on recording and reproduction was performed using the apparatuses of the present invention ZZ3 and ZZ4 constructed according to this expectation. The output dependence on the recording density is shown in FIG. 72. As is clear from this figure, when using the apparatuses of the present invention ZZ3 and ZZ4, it is possible to obtain a sufficient reproduction output even when the recording density exceeds 500 kFRPI. This is because in the apparatuses of the present invention, the magnetic spacing is smaller than that of the comparative apparatuses and the reproduction resolution is improved. Accordingly, a similar effect can be obtained when the magnetic spacing is 20 nm or below. Furthermore, a similar effect can be obtained even when the rare earth element Sm of the perpendicular magnetization film is replaced Y, Ce, Pr, or La.

Thus, by using the apparatuses of the present invention ZZ3 and ZZ4, it is possible to realize an information storage based on the double layered perpendicular magnetic recording method of a super high recording density enabling reproduction at a super high recording density.

According to the magnetic disc apparatus according to the present invention, unlike the double layered perpendicular magnetic recording method which has been designed using the balance relationship between a reproduction gap length, a magnetic spacing, and a medium film thickness of the longitudinal magnetic recording method, the reproduction system is designed by simulation of the MR head reproduction response of the double layered perpendicular magnetic recording method. Accordingly, as compared to a magnetic disc apparatus of the conventional double layered perpendicular magnetic recording method, the present invention enables to by far improve the reproduction resolution, which in turn by far facilitates reproduction at a high recording density.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-257138 (Filed on Sep. $10^{th}$, 1999) including specification, claims, drawings and summary are incorporated herein by reference in its entirety.

What is claimed is:

1. A magnetic disc apparatus comprising: a perpendicular magnetic recording medium having an undercoat soft magnetic film and a perpendicular magnetization film; and a magnetic recording/reproduction system having a single pole MR composite head consisting of a single pole head for recording and an MR head for reproduction, wherein a reproduction gap length as a space between a pair of magnetic shield layers sandwiching said MR head for reproduction is greater than zero but not greater than up to 0.1 micrometers and wherein when information is reproduced with respect to the perpendicular magnetic recording medium using the single pole MR composite head, a magnetic spacing as a space between the single pole MR composite head and the perpendicular magnetic recording medium is greater than zero but not greater than 20 nm.

2. A magnetic disc apparatus as claimed in claim 1, wherein the perpendicular magnetization film has a film thickness greater than zero not greater than 50 nm.

3. A magnetic disc apparatus as claimed in claim 2, wherein the undercoat soft magnetic film has a film thickness greater than zero not greater than 200 nm.

4. A magnetic disc apparatus as claimed in claim 1, wherein the undercoat soft magnetic film is made from FeSiAl.

5. A magnetic disc apparatus as claimed in claim 1, wherein the undercoat soft magnetic film is made from a FeSiAl-containing alloy.

6. A magnetic disc apparatus as claimed in claim 1, wherein the undercoat soft magnetic film is made from CoNiFe.

7. A magnetic disc apparatus as claimed in claim 1, wherein the undercoat soft magnetic film is made from a CoNiFe-containing alloy.

8. A magnetic disc apparatus as claimed in claim 1, wherein the undercoat soft magnetic film is made from CoZrTa.

9. A magnetic disc apparatus as claimed in claim 1, wherein the undercoat soft magnetic film is made from a CoZrNb alloy.

10. A magnetic disc apparatus as claimed in claim 1, wherein the perpendicular magnetization film is made from a CoCrM alloy, M being Tb, Dy, Ho, Er, or Tm.

11. A magnetic disc apparatus as claimed in claim 1, wherein the perpendicular magnetization film is made from a FePt alloy.

12. A magnetic disc apparatus as claimed in claim 1, wherein the perpendicular magnetization film is made from a FePt-containing alloy.

13. A magnetic disc apparatus as claimed in claim 1, wherein the perpendicular magnetization film is made from $RCO_5$ (wherein R=Y, Ce, Sm, La, or Pr).

14. A magnetic disc apparatus as claimed in claim 1, wherein the perpendicular magnetization film is made from $R_2Co_{17}$, (wherein R=Y, Ce, Sm, La, or Pr).

15. A magnetic disc apparatus comprising: a perpendicular magnetic recording medium having an undercoat soft magnetic film and a perpendicular magnetization film; and a magnetic recording/reproduction system having an inductive (ID) MR composite head consisting of an inductive (ID) head for recording and an MR head for reproduction, wherein a reproduction gap length as a space between a pair of magnetic shield layers sandwiching said MR head for reproduction is greater than zero but not greater than 0.1 micrometers and wherein when an information is reproduced with respect to the perpendicular magnetic recording medium using the single pole MR composite head, a magnetic spacing as a space between the single pole MR composite head and the perpendicular magnetic recording medium is greater than zero not greater than 20 nm.

16. A magnetic disc apparatus as claimed in claim 15, wherein the perpendicular magnetization film has a film thickness greater than zero not greater than 50 nm.

17. A magnetic disc apparatus as claimed in claim 16, wherein the undercoat soft magnetic film has a film thickness greater than zero not greater than 200 nm.

18. A magnetic disc apparatus as claimed in claim 15, wherein the undercoat soft magnetic film is made from FeSiAl.

19. A magnetic disc apparatus as claimed in claim 13, wherein the undercoat soft magnetic film is made from a FeSiAl-containing alloy.

20. A magnetic disc apparatus as claimed in claim 15, wherein the undercoat soft magnetic film is made from CoNiFe.

21. A magnetic disc apparatus as claimed in claim 15, wherein the undercoat soft magnetic film is made from a CoNiFe-containing alloy.

22. A magnetic disc apparatus as claimed in claim 15, wherein the undercoat soft magnetic film is made from CoZrTa.

23. A magnetic disc apparatus as claimed in claim 15, wherein the undercoat soft magnetic film is made from a CoZrNb alloy.

24. A magnetic disc apparatus as claimed in claim 15, wherein the perpendicular magnetization film is made from a CoCrM alloy, M being Tb, Dy, Ho, Er, or Tm.

25. A magnetic disc apparatus as claimed in claim 15, wherein the perpendicular magnetization film is made from a FePt alloy.

26. A magnetic disc apparatus as claimed in claim 15, wherein the perpendicular magnetization film is made from a FePt-containing alloy.

27. A magnetic disc apparatus as claimed in claim 15, wherein the perpendicular magnetization film is made from $RCo_5$ (wherein R=Y, Ce, Sm, La, or Pr).

28. A magnetic disc apparatus as claimed in claim 15, wherein the perpendicular magnetization film is made from $R_2Co_{17}$ (wherein R=Y, Ce, Sm, La, or Pr).

* * * * *